US012704994B2

(12) United States Patent
Tang et al.

(10) Patent No.: US 12,704,994 B2
(45) Date of Patent: Aug. 11, 2026

(54) MEMORY DEVICE FOR READ VOLTAGE DETERMINATION, AND RELATED MEMORY SYSTEM AND MEMORY CONTROLLER

(71) Applicant: YANGTZE MEMORY TECHNOLOGIES CO., LTD., Wuhan (CN)

(72) Inventors: Xingwei Tang, Wuhan (CN); Guangchang Ye, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 7 days.

(21) Appl. No.: 18/807,611

(22) Filed: Aug. 16, 2024

(65) Prior Publication Data

US 2025/0265010 A1 Aug. 21, 2025

Related U.S. Application Data

(63) Continuation of application No. PCT/CN2024/077820, filed on Feb. 20, 2024.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0604; G06F 3/0655; G06F 3/0679
See application file for complete search history.

(56) References Cited

U.S. PATENT DOCUMENTS

2018/0173447 A1* 6/2018 Chin .................... G06F 3/0619
2021/0005268 A1 1/2021 Kim et al.
2023/0066469 A1* 3/2023 Goode ................. G06F 3/0679

FOREIGN PATENT DOCUMENTS

CN 110364197 A 10/2019
CN 113327640 A 8/2021
CN 114038494 A 2/2022
CN 115497540 A 12/2022

* cited by examiner

*Primary Examiner* — Jared I Rutz
(74) *Attorney, Agent, or Firm* — BAYES PLLC

(57) ABSTRACT

Examples of the present disclosure disclose a memory device, a memory system, a memory controller, and a method. The memory device may include a memory cell array with a plurality of memory cells. The memory device may include peripheral circuit coupled with the memory cell array and configured to: perform M first adjustments on a target read voltage of at least one code word with a first step, and acquire M first results corresponding to M read voltages obtained after the M first adjustments respectively; take the minimum first result in the M first results as an inflection point value; perform N second adjustments on the inflection point voltage with a second step, and acquire N first results corresponding to N read voltages obtained after the N second adjustments respectively; and determine a target valley bottom voltage according to the acquired N first results.

20 Claims, 27 Drawing Sheets

MEMORY DEVICE FOR READ VOLTAGE DETERMINATION, AND RELATED MEMORY SYSTEM AND MEMORY CONTROLLER

CROSS-REFERENCE TO RELATED APPLICATIONS

The present application is a continuation of International Application No. PCT/CN2024/077820, filed on Feb. 20, 2024, which is hereby incorporated by reference in its entirety.

TECHNICAL FIELD

The present disclosure relates to, but is not limited to, a memory device, a memory system, a memory controller, and an operation method.

BACKGROUND

With the development of science and technology, the market size of the integrated circuit industry is getting bigger and bigger, and the process and technology of non-volatile memory devices in the whole integrated circuit industry have been developed by leaps and bounds in recent years, among which, the application of NAND type memories is particularly widespread. NAND type memories achieve the function of data storage by capturing and storing charges in the gate dielectric layer of the memory cells contained therein. However, as the usage time increases, the charges stored in the memory cells vary with increased usage time, repeated read operations, cross temperature, etc., thus affecting the accuracy of data reading.

SUMMARY

According to one aspect of the present disclosure, a memory device is provided. The memory device may include a memory cell array. The memory cell array may include a plurality of memory cells. A preset number of the memory cells may form a code word. The memory device may include a peripheral circuit coupled with the memory cell array. The peripheral circuit may be configured to perform M first adjustments on a target read voltage of at least one code word with a first step, and acquire M first results corresponding to M read voltages obtained after the M first adjustments, respectively. Each of the first results may indicate the number of flipped bits of the at least one code word in two read results corresponding to a first read voltage and a second read voltage. A difference between the first read voltage and the second read voltage may be less than a preset voltage. The peripheral circuit may be configured to take the minimum first result in the M first results as an inflection point value. A read voltage may correspond to the inflection point value is an inflection point voltage. The peripheral circuit may be configured to perform N second adjustments on the inflection point voltage with a second step, and acquire N first results corresponding to N read voltages obtained after the N second adjustments, respectively. The second step may be less than the first step. The peripheral circuit may be configured to determine a target valley bottom voltage according to the acquired N first results. The target valley bottom voltage may be taken as a read voltage for a read operation performed on the at least one code word. M and N may both be positive integers greater than 1.

In some implementations, the peripheral circuit may be configured to, before performing the M first adjustments on the target read voltage of the at least one code word with the first step, determine a near-valley threshold according to a first result corresponding to the at least one code word at an initial target read voltage. In some implementations, the near-valley threshold may indicate the maximum of the corresponding first results near the target valley bottom voltage. In some implementations, the peripheral circuit may be configured to, before performing the M first adjustments on the target read voltage of the at least one code word with the first step, perform a plurality of adjustments on the initial target read voltage, until a first result corresponding to an adjusted target read voltage is less than the near-valley threshold. In some implementations, the peripheral circuit may be configured to, take the adjusted target read voltage corresponding to the first result less than the near-valley threshold as the target read voltage, and perform the M first adjustments on the target read voltage with the first step.

In some implementations, the peripheral circuit may be configured to, before performing the M first adjustments on the target read voltage of the at least one code word with the first step, during the plurality of adjustments on the initial target read voltage, when the first result corresponding to the adjusted target read voltage is greater than or equal to the near-valley threshold, acquire a target read voltage after a next adjustment based on a first result corresponding to a target read voltage after a previous adjustment. In some implementations, the peripheral circuit may be configured to, take the adjusted target read voltage corresponding to a first result being less than the near-valley threshold for a first time among a plurality of first results corresponding to the adjusted target read voltages as a near-valley point voltage. In some implementations, the peripheral circuit may be configured to, during the M first adjustments on the target read voltage with the first step, perform adjustments with the first step in two opposite directions respectively starting from the near-valley point voltage, until first results corresponding to adjusted read voltages in the two directions are both greater than the near-valley threshold.

In some implementations, the peripheral circuit may be configured to, during the M first adjustments on the near-valley point voltage with the first step, perform adjustments with the first step in a first direction starting from the near-valley point voltage, until a first result corresponding to an adjusted target read voltage in the first direction is greater than the near-valley threshold. In some implementations, the peripheral circuit may be configured to, perform adjustments with the first step in a second direction opposite to the first direction starting from the near-valley point voltage, until a first result corresponding to an adjusted target read voltage in the second direction is greater than the near-valley threshold.

In some implementations, the peripheral circuit may be configured to acquire the near-valley threshold according to the first result corresponding to the target read voltage and a first mapping function. In some implementations, the first mapping function may indicate a relationship between the near-valley threshold and the first result corresponding to the target read voltage. In some implementations, the peripheral circuit may be configured to, acquire the target read voltage after the next adjustment according to the first result corresponding to the target read voltage after the previous adjustment and a second mapping function. In some implementations, the second mapping function may indicate a relationship between the first result corresponding to the target read voltage after the previous adjustment and a predicted read voltage after the next adjustment.

In some implementations, the peripheral circuit may be configured to, during the N second adjustments on the inflection point voltage with the second step, perform adjustments with the second step in two opposite directions respectively starting from the inflection point voltage. In some implementations, the peripheral circuit may be configured to, during adjustments in each direction, perform a count of upward trends when a first result corresponding to a target read voltage after a next adjustment is greater than a first result corresponding to a target read voltage after a previous adjustment, and determine a first boundary voltage and a second boundary voltage according to a total count is greater than or equal to a preset count. In some implementations, the peripheral circuit may be configured to, during the adjustments in the two directions, if a first result corresponding to a target read voltage after one adjustment is lower than a preset threshold, or the minimum first result in a plurality of first results corresponding to target read voltages after a plurality of adjustments is taken as a reference value, when the number of first results, among the remaining plurality of first results, having a difference from the reference value that is less than a preset difference is greater than a preset number, stop the adjustments and take an adjusted target read voltage corresponding to the minimum first result in the plurality of first results as the target valley bottom voltage.

In some implementations, the peripheral circuit may be configured to, during the N second adjustments on the inflection point voltage with the second step, perform adjustments with the second step in a first direction starting from the inflection point voltage, until a total count of upward trends during the adjustments in the first direction is equal to the preset count. In some implementations, the peripheral circuit may be configured to perform adjustments with the second step in a second direction opposite to the first direction starting from the inflection point voltage, until a total count of upward trends during the adjustments in the second direction is equal to the preset count.

In some implementations, the peripheral circuit may be configured to, during the adjustments in the first direction, take an adjusted target read voltage when the total count of upward trends is equal to the preset count as the first boundary voltage, and during the adjustments in the second direction, take an adjusted target read voltage when the total count of upward trends is equal to the preset count as the second boundary voltage. In some implementations, the peripheral circuit may be configured to, during the adjustments in the two directions, if the first boundary voltage and the second boundary voltage are determined, acquire a first result corresponding to a read voltage of a last adjustment. In some implementations, the read voltage of the last adjustment may be an average of the first boundary voltage and the second boundary voltage. In some implementations, the peripheral circuit may be configured to take a read voltage corresponding to the minimum first result in a plurality of first results corresponding to all adjusted read voltages as the target valley bottom voltage.

In some implementations, the memory cell array may include memory cells with a plurality of memory bits. In some implementations, the plurality of memory bits may correspond to a plurality of pages respectively, and at least one of the pages corresponds to a plurality of orders. In some implementations, the peripheral circuit may be configured to, after determining a target valley bottom voltage of the at least one code word at a target order, determine target valley bottom voltages of other orders in the plurality of orders than the target order, respectively.

In some implementations, the plurality of orders may include a first order and a second order, and a read voltage of the second order may be less than a read voltage of the first order. In some implementations, the peripheral circuit may be configured to, when an order corresponding to the determined target valley bottom voltage belongs to the first order, acquire at least one of a predicted valley bottom voltage of the second order in the plurality of orders or predicted valley bottom voltages of other first orders with lower read voltages according to the determined target valley bottom voltage.

In some implementations, the peripheral circuit may be configured to read data stored in the at least one code word with the first read voltage to obtain a second result. In some implementations, the peripheral circuit may be configured to perform a third adjustment on the first read voltage with a third step to obtain the second read voltage, and read data stored in the at least one code word with the second read voltage to obtain a third result. In some implementations, the peripheral circuit may be configured to perform a logic operation on the second result and the third result to obtain a fourth result. In some implementations, the peripheral circuit may be configured to count the number of bits in the fourth result that indicate flips of the third result compared to the second result to obtain the first result.

In some implementations, the peripheral circuit may include a first latch configured to store the second result. In some implementations, the peripheral circuit may include a second latch configured to store the third result. In some implementations, the peripheral circuit may include a third latch configured to store the fourth result.

According to another aspect of the present disclosure, a memory system is provided. The memory system may include one or more memory devices. Each of the one or more memory devices may include a memory cell array with a plurality of memory cells. A preset number of the memory cells may form a code word. The memory system may include a peripheral circuit coupled with the memory cell array. The peripheral circuit may be configured to perform M first adjustments on a target read voltage of at least one code word with a first step, and acquire M first results corresponding to M read voltages obtained after the M first adjustments, respectively. Each of the first results indicates the number of flipped bits of the at least one code word in two read results corresponding to a first read voltage and a second read voltage, and a difference between the first read voltage and the second read voltage is less than a preset voltage. The peripheral circuit may be configured to take the minimum first result in the M first results as an inflection point value. A read voltage corresponding to the inflection point value may be an inflection point voltage. The peripheral circuit may be configured to perform N second adjustments on the inflection point voltage with a second step, and acquire N first results corresponding to N read voltages obtained after the N second adjustments, respectively. The second step may be less than the first step. The peripheral circuit may be configured to determine a target valley bottom voltage according to the acquired N first results. The target valley bottom voltage may be taken as a read voltage for a read operation performed on the at least one code word. M and N may both be positive integers greater than 1. The memory system may include a memory controller coupled with the one or more memory devices and configured to control the one or more memory devices.

In some implementations, the memory controller may be configured to send a data acquisition instruction. In some implementations, the data acquisition instruction may be to instruct acquisition of the target valley bottom voltage. In some implementations, the memory device may be configured to receive the data acquisition instruction, acquire the target valley bottom voltage, and send information comprising the target valley bottom voltage to the memory controller. In some implementations, the memory controller may be further configured to: perform a read operation on data stored in the memory device according to the target valley bottom voltage in the information.

In some implementations, the memory controller may be further configured to perform an error correction code decoding operation on a read result of the read operation.

According to a further aspect of the present disclosure, a memory controller is provided. The memory controller may include a control unit. The control unit may be configured to perform M first adjustments on a target read voltage of at least one code word with a first step, and acquire M first results corresponding to M read voltages obtained after the M first adjustments, respectively. Each of the first results may indicate a number of flipped bits of the at least one code word in two read results corresponding to a first read voltage and a second read voltage. A difference between the first read voltage and the second read voltage may be less than a preset voltage. The memory controller may be coupled with at least one memory device. The memory device may include a plurality of memory cells. A preset number of the memory cells may form a code word. The control unit may be configured to take the minimum first result in the M first results as an inflection point value. A read voltage corresponding to the inflection point value may be an inflection point voltage. The control unit may be configured to perform N second adjustments on the inflection point voltage with a second step, and acquire N first results corresponding to N read voltages obtained after the N second adjustments, respectively. The second step may be less than the first step. The control unit may be configured to determine a target valley bottom voltage according to the acquired N first results. The target valley bottom voltage may be taken as a read voltage for a read operation performed on the at least one code word. M and N may both be positive integers greater than 1.

The control unit may be configured to, before performing the M first adjustments on the target read voltage of the at least one code word with the first step, determine a near-valley threshold according to a first result corresponding to an initial target read voltage of the at least one code word. In some implementations, the near-valley threshold may indicate the maximum of the corresponding first results near the target valley bottom voltage. The control unit may be configured to before performing the M first adjustments on the target read voltage of the at least one code word with the first step, perform a plurality of adjustments on the initial target read voltage, until a first result corresponding to an adjusted target read voltage is less than the near-valley threshold. The control unit may be configured to take the adjusted target read voltage corresponding to the first result less than the near-valley threshold as the target read voltage, and perform the M first adjustments on the target read voltage with the first step.

The control unit may be configured to, before performing the M first adjustments on the target read voltage of the at least one code word with the first step, during the plurality of adjustments on the initial target read voltage, when the first result corresponding to the adjusted target read voltage is greater than or equal to the near-valley threshold, acquire a target read voltage after a next adjustment based on a first result corresponding to a target read voltage after a previous adjustment. The control unit may be configured to take the adjusted target read voltage corresponding to a first result being less than the near-valley threshold for a first time among a plurality of first results corresponding to the adjusted target read voltages as a near-valley point voltage. The control unit may be configured to, during the M first adjustments on the target read voltage with the first step, perform adjustments with the first step in two opposite directions respectively starting from the near-valley point voltage, until first results corresponding to adjusted read voltages in the two directions are both greater than the near-valley threshold.

The control unit may be configured to, during the M first adjustments on the near-valley point voltage with the first step, perform adjustments with the first step in a first direction starting from the near-valley point voltage, until a first result corresponding to an adjusted target read voltage in the first direction is greater than the near-valley threshold. The control unit may be configured to perform adjustments with the first step in a second direction opposite to the first direction starting from the near-valley point voltage, until a first result corresponding to an adjusted target read voltage in the second direction is greater than the near-valley threshold.

The control unit may be configured to acquire the near-valley threshold according to the first result corresponding to the target read voltage and a first mapping function. The first mapping function may indicate a relationship between the near-valley threshold and the first result corresponding to the target read voltage. The control unit may be configured to acquire the target read voltage after the next adjustment according to the first result corresponding to the target read voltage after the previous adjustment and a second mapping function. In some implementations, the second mapping function may indicate a relationship between the first result corresponding to the target read voltage after the previous adjustment and a predicted read voltage after the next adjustment.

The control unit may be configured to, during the N second adjustments on the inflection point voltage with the second step, perform adjustments with the second step in two opposite directions respectively starting from the inflection point voltage. The control unit may be configured to, during adjustments in each direction, perform a count of upward trends when a first result corresponding to a target read voltage after a next adjustment is greater than a first result corresponding to a target read voltage after a previous adjustment, and determine a first boundary voltage and a second boundary voltage according to a total count is greater than or equal to a preset count. The control unit may be configured to, during the adjustments in the two directions, if a first result corresponding to a target read voltage after one adjustment is lower than a preset threshold, or the minimum first result in a plurality of first results corresponding to target read voltages after a plurality of adjustments is taken as a reference value, when the number of first results, among the remaining plurality of first results, having a difference from the reference value that is less than a preset difference is greater than a preset number, stop the adjustments and take an adjusted target read voltage corresponding to the minimum first result in the plurality of first results as the target valley bottom voltage.

The control unit may be configured to, during the N second adjustments on the inflection point voltage with the second step, perform adjustments with the second step in a first direction starting from the inflection point voltage, until a total count of upward trends during the adjustments in the first direction is equal to the preset count. The control unit may be configured to perform adjustments with the second step in a second direction opposite to the first direction starting from the inflection point voltage, until a total count of upward trends during the adjustments in the second direction is equal to the preset count.

The control unit may be configured to, during the adjustments in the first direction, take an adjusted target read voltage when the total count of upward trends is equal to the preset count as the first boundary voltage, and during the adjustments in the second direction, take an adjusted target read voltage when the total count of upward trends is equal to the preset count as the second boundary voltage. The control unit may be configured to, during the adjustments in the two directions, if the first boundary voltage and the second boundary voltage are determined, acquire a first result corresponding to a read voltage of a last adjustment. In some implementations, the read voltage of the last adjustment is an average of the first boundary voltage and the second boundary voltage. The control unit may be configured to take a read voltage corresponding to the minimum first result in a plurality of first results corresponding to all adjusted read voltages as the target valley bottom voltage.

In some implementations, the plurality of memory cells may include memory cells with a plurality of memory bits. In some implementations, the plurality of memory bits may correspond to a plurality of pages respectively, and at least one of the pages may correspond to a plurality of orders. The control unit may be configured to, after determining a target valley bottom voltage of the at least one code word at a target order, determine target valley bottom voltages of other orders in the plurality of orders than the target order, respectively.

In some implementations, the plurality of orders may include a first order and a second order, and a read voltage of the second order may be less than a read voltage of the first order, and The control unit may be configured to, when an order corresponding to the determined target valley bottom voltage belongs to the first order, generate at least one of a predicted valley bottom voltage of the second order in the plurality of orders or predicted valley bottom voltages of other first orders with lower read voltages according to the determined target valley bottom voltage.

According to yet another aspect of the present disclosure, a method of operating a memory device is provided. The method may include performing M first adjustments on a target read voltage of at least one code word with a first step, and acquiring M first results corresponding to M read voltages obtained after the M first adjustments, respectively. Each of the first results indicates a number of flipped bits of a code word in two read results corresponding to a first read voltage and a second read voltage, and a difference between the first read voltage and the second read voltage may be less than a preset voltage. The code word may be formed by a preset number of memory cells in at least one memory device. The method may include taking the minimum first result in the M first results as an inflection point value. A read voltage corresponding to the inflection point value may be an inflection point voltage. The method may include performing N second adjustments on the inflection point voltage with a second step, and acquiring N first results corresponding to N read voltages obtained after the N second adjustments, respectively. The second step may be less than the first step. The method may include determining a target valley bottom voltage according to the acquired N first results. The target valley bottom voltage may be taken as a read voltage for a read operation performed on the at least one code word. M and N may both be positive integers greater than 1.

According to still a further aspect of the present disclosure, a method of operating a memory system is provided. The method may include sending, by a memory controller in the memory system, a data acquisition instruction. The data acquisition instruction may be to instruct acquisition of a target valley bottom voltage. The method may include receiving, by a memory device in the memory system, the data acquisition instruction, acquiring the target valley bottom voltage according to a method of operating a memory device, and sending information comprising the target valley bottom voltage to the memory controller. The method may include performing M first adjustments on a target read voltage of at least one code word with a first step, and acquiring M first results corresponding to M read voltages obtained after the M first adjustments, respectively. Each of the first results may indicate a number of flipped bits of a code word in two read results corresponding to a first read voltage and a second read voltage, and a difference between the first read voltage and the second read voltage is less than a preset voltage. The code word may be formed by a preset number of memory cells in at least one memory device. The method may include taking the minimum first result in the M first results as an inflection point value. A read voltage corresponding to the inflection point value may be an inflection point voltage. The method may include performing N second adjustments on the inflection point voltage with a second step, and acquiring N first results corresponding to N read voltages obtained after the N second adjustments, respectively. The second step may be less than the first step. The method may include determining a target valley bottom voltage according to the acquired N first results. The target valley bottom voltage may be taken as a read voltage for a read operation performed on the at least one code word. M and N may both be positive integers greater than 1. The method may include performing, by the memory controller, a read operation on data stored in the memory device according to the target valley bottom voltage in the information.

According to yet another aspect of the present disclosure, a method of operating a memory controller is provided. The method may include performing M first adjustments on a target read voltage of at least one code word with a first step, and acquiring M first results corresponding to M read voltages obtained after the M first adjustments, respectively. Each of the first results may indicate a number of flipped bits of a code word in two read results corresponding to a first read voltage and a second read voltage, and a difference between the first read voltage and the second read voltage may be less than a preset voltage. The code word may be formed by a preset number of memory cells in a memory device of at least one memory system. The method may include taking the minimum first result in the M first results as an inflection point value. A read voltage corresponding to the inflection point value may be an inflection point voltage. The method may include performing N second adjustments on the inflection point voltage with a second step, and acquiring N first results corresponding to N read voltages obtained after the N second adjustments, respectively. The second step may be less than the first step. The method may include determining a target valley bottom voltage according to the acquired N first results. The target valley bottom voltage may be taken as a read voltage for a read operation performed on the at least one code word. M and N may both be positive integers greater than 1.

According to still another aspect of the present disclosure a non-transitory computer-readable medium having an executable instruction stored thereon that, when executed, can implement operations of a memory device is provided. The operations may include performing M first adjustments on a target read voltage of at least one code word with a first step, and acquiring M first results corresponding to M read voltages obtained after the M first adjustments, respectively. Each of the first results may indicate a number of flipped bits of a code word in two read results corresponding to a first read voltage and a second read voltage, and a difference between the first read voltage and the second read voltage may be less than a preset voltage. The code word may be formed by a preset number of memory cells in at least one memory device. The method may include taking the minimum first result in the M first results as an inflection point value. A read voltage corresponding to the inflection point value may be an inflection point voltage. The method may include performing N second adjustments on the inflection point voltage with a second step, and acquiring N first results corresponding to N read voltages obtained after the N second adjustments, respectively. The second step may be less than the first step. The method may include determining a target valley bottom voltage according to the acquired N first results. The target valley bottom voltage may be taken as a read voltage for a read operation performed on the at least one code word. M and N may both be positive integers greater than 1.

According to still another aspect of the present disclosure a non-transitory computer-readable medium having an executable instruction stored thereon that, when executed, can implement operations of a memory system is provided. The operations may include sending, by a memory controller in the memory system, a data acquisition instruction. The data acquisition instruction may be to instruct acquisition of a target valley bottom voltage. The operations may include receiving, by a memory device in the memory system, the data acquisition instruction, acquiring the target valley bottom voltage according to a method of operating a memory device. The operations may include performing M first adjustments on a target read voltage of at least one code word with a first step, and acquiring M first results corresponding to M read voltages obtained after the M first adjustments, respectively. Each of the first results may indicate a number of flipped bits of a code word in two read results corresponding to a first read voltage and a second read voltage, and a difference between the first read voltage and the second read voltage may be less than a preset voltage. The code word may be formed by a preset number of memory cells in at least one memory device. The operations may include taking the minimum first result in the M first results as an inflection point value. A read voltage corresponding to the inflection point value may be an inflection point voltage. The operations may include performing N second adjustments on the inflection point voltage with a second step, and acquiring N first results corresponding to N read voltages obtained after the N second adjustments, respectively. The second step may be less than the first step. The operations may include determining a target valley bottom voltage according to the acquired N first results. The target valley bottom voltage may be taken as a read voltage for a read operation performed on the at least one code word. M and N may both be positive integers greater than 1. The operations may include performing, by the memory controller, a read operation on data stored in the memory device according to the target valley bottom voltage in the information.

According to still another aspect of the present disclosure a non-transitory computer-readable medium having an executable instruction stored thereon that, when executed, can implement operations of a memory controller is provided. The operations may include performing M first adjustments on a target read voltage of at least one code word with a first step, and acquiring M first results corresponding to M read voltages obtained after the M first adjustments, respectively. Each of the first results may indicate a number of flipped bits of a code word in two read results corresponding to a first read voltage and a second read voltage, and a difference between the first read voltage and the second read voltage may be less than a preset voltage. The code word may be formed by a preset number of memory cells in a memory device of at least one memory system. The operations may include taking the minimum first result in the M first results as an inflection point value. A read voltage corresponding to the inflection point value may be an inflection point voltage. The operations may include performing N second adjustments on the inflection point voltage with a second step, and acquiring N first results corresponding to N read voltages obtained after the N second adjustments, respectively. The second step may be less than the first step. The operations may include determining a target valley bottom voltage according to the acquired N first results. The target valley bottom voltage may be taken as a read voltage for a read operation performed on the at least one code word. M and N may both be positive integers greater than 1.

BRIEF DESCRIPTION OF THE DRAWINGS

In the drawings, unless otherwise stated, same reference numerals denote same or like components or elements throughout a plurality of drawings. These drawings are not necessarily drawn to scale. It is to be understood that the drawings depict only some examples disclosed in the present disclosure, which are not to be considered as limitations on the scope of the present disclosure.

DETAILED DESCRIPTION

Figure 1:
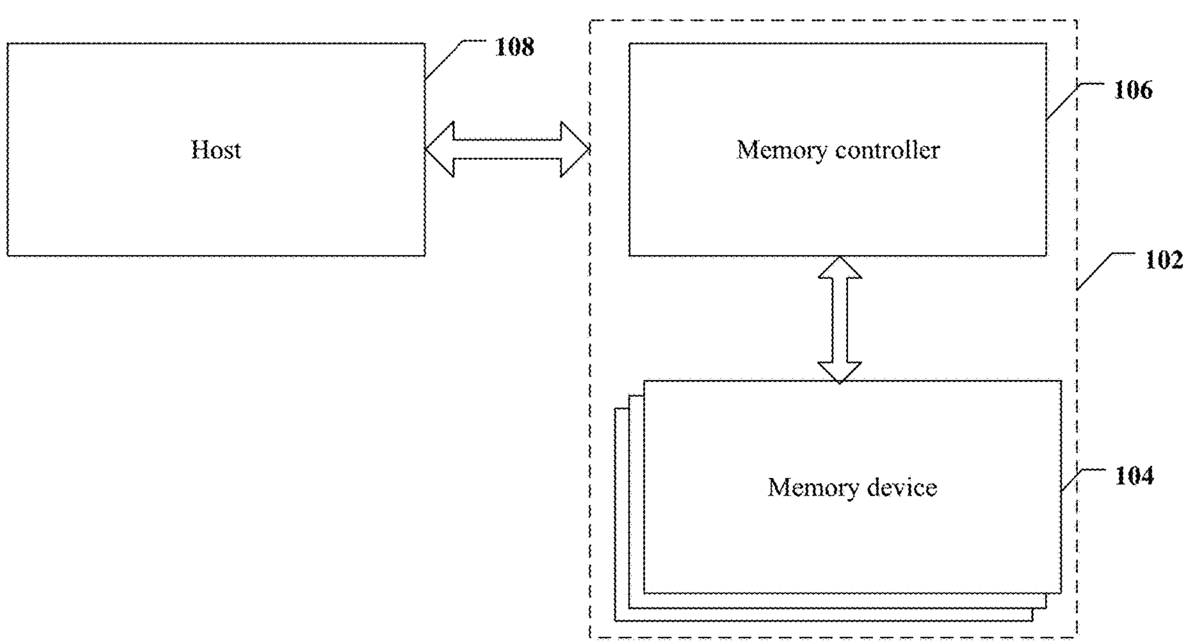
FIG. 1 is a schematic diagram of an example system having a memory system according to an example of the present disclosure.

Examples of the present disclosure will be described in more detail below with reference to the accompanying drawings. Although examples of the present disclosure are shown in the drawings, it should be understood that the present disclosure may be implemented in various ways and should not be limited to the DETAILED DESCRIPTION set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other examples, some technical features well-known in the art are not described to avoid confusion with the present disclosure; that is, not all features of the actual example are described here, and well-known functions and structures are not described in detail.

Furthermore, the drawings are merely schematic illustrations of the present disclosure and are not necessarily drawn to scale. Same reference numerals denote same or like parts, and thus repeated descriptions thereof are omitted. Some block diagrams shown in the drawings are functional entities and do not necessarily correspond to physically or logically separate entities. These functional entities may be implemented in software, or implemented in one or more hardware modules or integrated circuits, or implemented in at least one of different networks or processor devices or microcontroller devices.

The flow diagram in the drawings is merely an example illustration and does not necessarily comprise all the operations. For example, some operations may be divided, and some operations may be combined or partially combined, so that an actual order of execution may vary depending on actual situations.

The terminology used herein is for the purpose of describing particular examples only and is not to be taken as a limitation of the present disclosure. As used herein, "a", "an" and "said/the" in singular forms are intended to include the plural forms as well, unless the context clearly dictates otherwise. It should also be understood that at least one of the terms "consists of" or "comprising", when used in this specification, identify the presence of at least one of stated features, integers, operations, elements or components, but do not exclude presence of at least one of one or more other features, integers, operations, elements, components or groups. As used herein, the term "at least one of . . . " includes any and all combinations of the associated listed items.

The memory device in the examples of the present disclosure includes but is not limited to a three-dimensional NAND type memory, and for ease of understanding, a three-dimensional NAND type memory is used as an example for illustration.

FIG. 1 illustrates a block diagram of an example system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory devices 104 and a memory controller 106. The host 108 can be a processing unit of an electronic device, such as a central processing unit (CPU), or a system-on-chip (SoC), such as an application processor (AP). The host 108 can be configured to send or receive data to or from the memory device 104.

The memory controller 106 is coupled to the memory device 104 and the host 108 and is configured to control the memory device 104, according to some examples. The memory controller 106 can manage the data stored in the memory device 104 and communicate with the host 108. In some examples, the memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc.

In some examples, the memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays.

The memory controller 106 can be configured to control operations of the memory device 104, such as read, erase, and program operations. The memory controller 106 can also be configured to manage various functions with respect to the data stored or to be stored in the memory device 104 including, but not limited to bad-block management, garbage collection, logical-to-physical address conversion, wear leveling, etc. In some examples, the memory controller 106 is further configured to process error correction codes with respect to the data read from or written to the memory device 104.

Any other suitable functions may be performed by the memory controller 106 as well, for example, formatting the memory device 104. The memory controller 106 can communicate with an external device (e.g., the host 108) according to a particular communication protocol. For example, the memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

The memory controller 106 and one or more memory devices 104 can be integrated into various types of storage devices, for example, be included in the same package, such as a universal Flash storage (UFS) package or an eMMC package. That is, the memory system 102 can be implemented and packaged into different types of end electronic products.

Figure 2A:
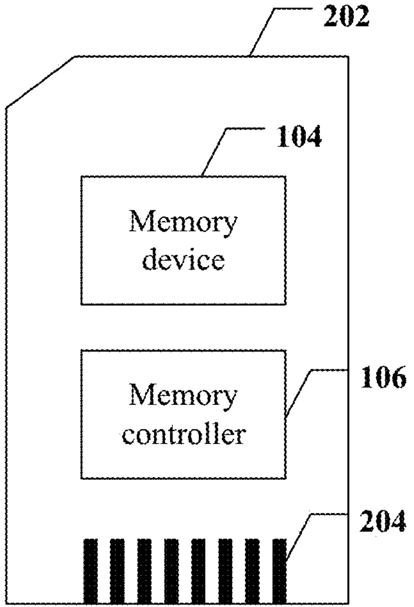
FIG. 2A is a schematic diagram of an example memory card having a memory system according to an example of the present disclosure.

In one example as shown in FIG. 2A, the memory controller 106 and a single memory device 104 may be integrated into a memory card 202. The memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 can further include a memory card connector 204 coupling the memory card 202 with a host (e.g., the host 108 in FIG. 1).

Figure 2B:
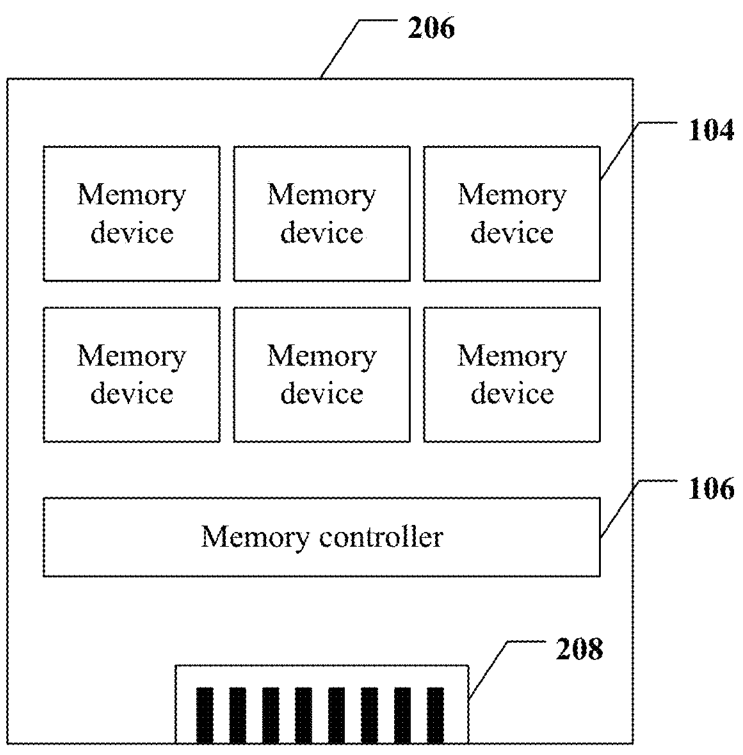
FIG. 2B is a schematic diagram of an example solid-state drive having a memory system according to an example of the present disclosure.

In another example as shown in FIG. 2B, the memory controller 106 and multiple memory devices 104 may be integrated into an SSD 206. The SSD 206 can further include an SSD connector 208 coupling the SSD 206 with a host (e.g., the host 108 in FIG. 1). In some examples, at least one of the storage capacity or the operation speed of the SSD 206 is greater than those of the memory card 202.

In some examples, each memory block may be coupled with a plurality of word lines, and a plurality of memory cells coupled with each word line constitute a physical page.

Figure 3:
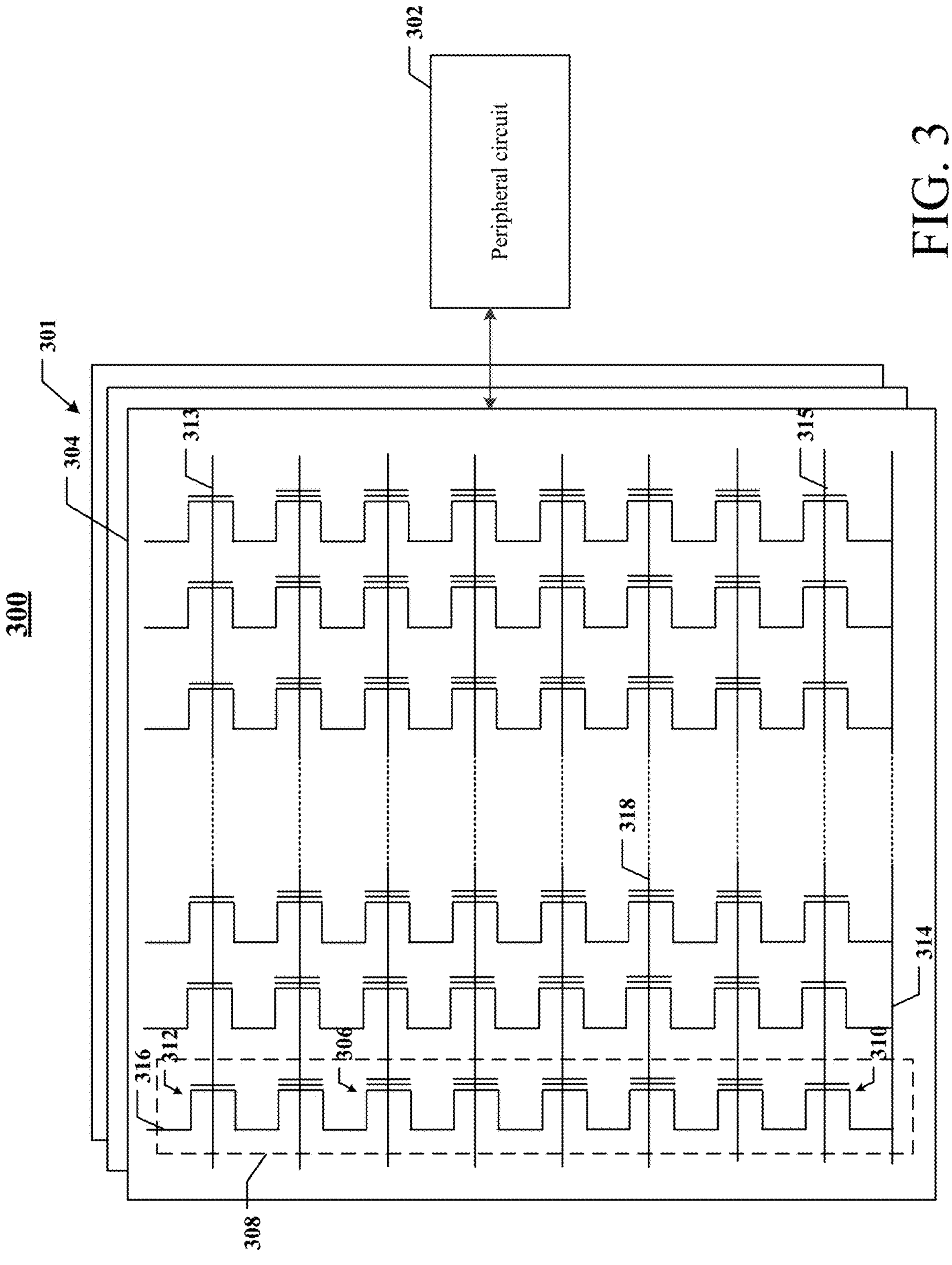
FIG. 3 is a schematic diagram of an example memory comprising a peripheral circuit according to an example of the present disclosure.

FIG. 3 illustrates a schematic circuit diagram of an example memory device 300 including a peripheral circuit, according to some aspects of the present disclosure. The memory device 300 can be an example of the memory device 104 in FIG. 1. The memory device 300 can include a memory cell array 301 and a peripheral circuit 302 coupled to the memory cell array 301. The memory cell array 301 is illustrated as an example of a three-dimensional NAND type memory cell array, in which memory cells 306 are NAND type memory cells and are provided in the form of an array of memory strings 308 each extending vertically above a substrate (not shown). In some examples, each memory string 308 includes a plurality of memory cells 306 coupled in series and stacked vertically. Each memory cell 306 can hold a continuous, analog value, such as an electrical voltage or charge, that depends on the number of electrons trapped within a region of the memory cells 306. Each memory cell 306 can be either a floating gate type of memory cell including a floating-gate transistor or a charge trap type of memory cell including a charge-trap transistor.

In some examples, each memory cell 306 is a single-level cell (SLC) that has two possible memory states and thus, can store one bit of data. For example, the first memory state "0" can correspond to a first range of voltages, and the second memory state "1" can correspond to a second range of voltages. In some examples, each memory cell 306 is a multi-level cell (MLC) that is capable of storing more than a single bit of data in more than four memory states. For example, the MLC can store two bits per cell (also known as Double-Level Cell), three bits per cell (also known as Trinary-Level cell (TLC)), four bits per cell (also known as a Quad-Level cell (QLC)), five bits per cell (also known as a Penta-Level cell (PLC)) or more than five bits per cell. Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

It is to be noted that the memory state mentioned herein is also the storage state of the memory cell referred to in the present disclosure. Different memory cells have different numbers of storage states. For example, an SLC type memory cell has 2 storage states (e.g., two memory states), where the 2 storage states include: one programmed state and one erased state. For another example, an MLC type memory cell has 4 storage states, where the 4 storage states include: one erased state and three programmed states. For still another example, a TLC type memory cell has 8 storage states, where the 8 storage states include: one erased state and seven programmed states. In some examples, a QLC type memory cell has 16 storage states, where the 16 storage states include: one erased state and fifteen programmed states.

As shown in FIG. 3, each memory string 308 can include a bottom selective transistor (BSG) 310 (also referred to as a source side selective transistor) at its source end and a top selective transistor (TSG) 312 (also known as a drain side selective transistor) at its drain end. BSG 310 and TSG 312 can be configured to activate selected memory strings 308 during read and program operations. In some examples, the sources of memory strings 308 in the same memory block 304 are coupled through the same source line (SL) 314, e.g., a common SL. In other words, all memory strings 308 in the same memory block 304 have an array common source (ACS), according to some examples. TSG 312 of each memory string 308 is coupled to a respective bit line (BL) 316 from which data can be read or written via an output bus (not shown), according to some examples. In some examples, each memory string 308 is configured to be selected or deselected by at least one of: applying a select voltage (e.g., above the threshold voltage of the transistor having TSG 312) or a deselect voltage (e.g., 0 V) to respective TSG 312 through one or more TSG lines 313 or applying a select voltage (e.g., above the threshold voltage of the transistor having BSG 310) or a deselect voltage (e.g., 0 V) to respective BSG 310 through one or more BSG lines 315.

As shown in FIG. 3, the memory strings 308 can be organized into multiple memory blocks 304, each of which can have a common source line 314, e.g., coupled to the ground. In some examples, each memory block 304 is the basic data unit for erase operations, e.g., all memory cells 306 on the same memory block 304 are erased at the same time. To erase memory cells 306 in a selected memory block 304, source lines 314 coupled to the selected memory block 304 as well as unselected memory blocks 304 in the same plane as the selected memory block 304 can be biased with an erase voltage (Vers), such as a high positive voltage (e.g., 20 V or more). It is understood that in some examples, the erase operation may be performed at a half-memory block level, a quarter-memory block level, or a level having any suitable number of memory blocks or any suitable fractions of a memory block. Memory cells 306 of adjacent memory strings 308 can be coupled through word lines 318 that select which row of memory cells 306 is affected by read and program operations.

Referring to FIG. 3, each memory cell 306 of the plurality of memory cells is coupled to respective word lines 318, and each memory string 308 is coupled to respective bit lines 316 via a respective selective transistor (such as top selective transistor (TSG) 312).

Figure 4:
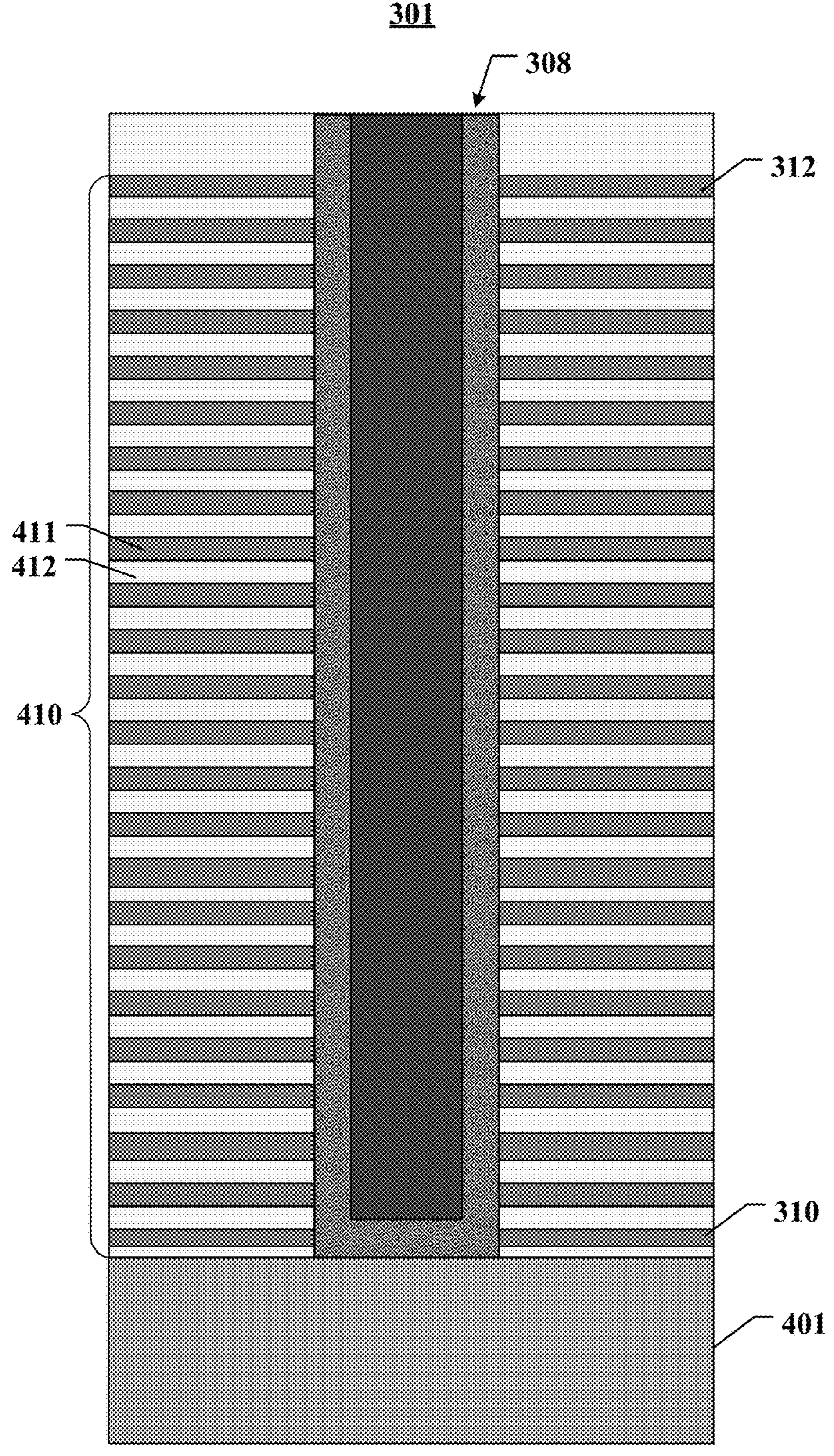
FIG. 4 is a schematic cross-sectional view of a memory cell array comprising a NAND type memory string according to an example of the present disclosure.

FIG. 4 shows a schematic cross-sectional view of an example memory cell array 301 including memory strings 308, exemplified by NAND, in accordance with aspects of the present disclosure. As shown in FIG. 4, the NAND memory cell array 301 may include a stacked structure 410, which includes a plurality of gate layers 411 and a plurality of insulating layers 412 alternately stacked in sequence, and a channel structure penetrating vertically through the gate layers 411 and the insulating layers 412. The channel structure is coupled with each gate layer to form a memory cell, and the channel structure is coupled with multiple gate layers in the stacked structure 410 to form a memory string 308. The gate layer 411 and the insulating layer 412 can be stacked alternately, and two adjacent gate layers 411 are separated by an insulating layer 412.

The constituent material of the gate layer 411 may include a conductive material. The conductive material may include but is not limited to tungsten (W), cobalt (Co), Copper (Cu), aluminum (Al), polysilicon, doped silicon, silicide, or any combination thereof. In some examples, each gate layer 411 may include a metal layer, e.g., a tungsten layer. In some examples, each gate layer 411 includes a doped polysilicon layer. Each gate layer 411 may include a control gate surrounding the memory cell. The gate layer 411 at the top of the stacked structure 410 may extend laterally as a top selective gate line, the gate layer 411 at the bottom of the stacked structure 410 may extend laterally as a bottom selective gate line, and the gate layer 411 extending laterally between the top selective gate line and the bottom selective gate line may be used as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable material.

In some examples, the memory string 308 includes a channel structure extending vertically through the stacked structure 410. In some examples, the channel structure includes a channel hole filled with semiconductor material(s) (e.g., as a semiconductor channel) and dielectric material(s) (e.g., as a memory film). In some examples, the semiconductor channel includes silicon, e.g., polysilicon. In some examples, the memory film is a composite dielectric layer including a tunneling layer, a storage layer (also referred to as a "charge trap/storage layer"), and a blocking layer. The channel structure may have a cylindrical shape (e.g., a pillar shape). According to some examples, the semiconductor channel, the tunneling layer, the storage layer and the blocking layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
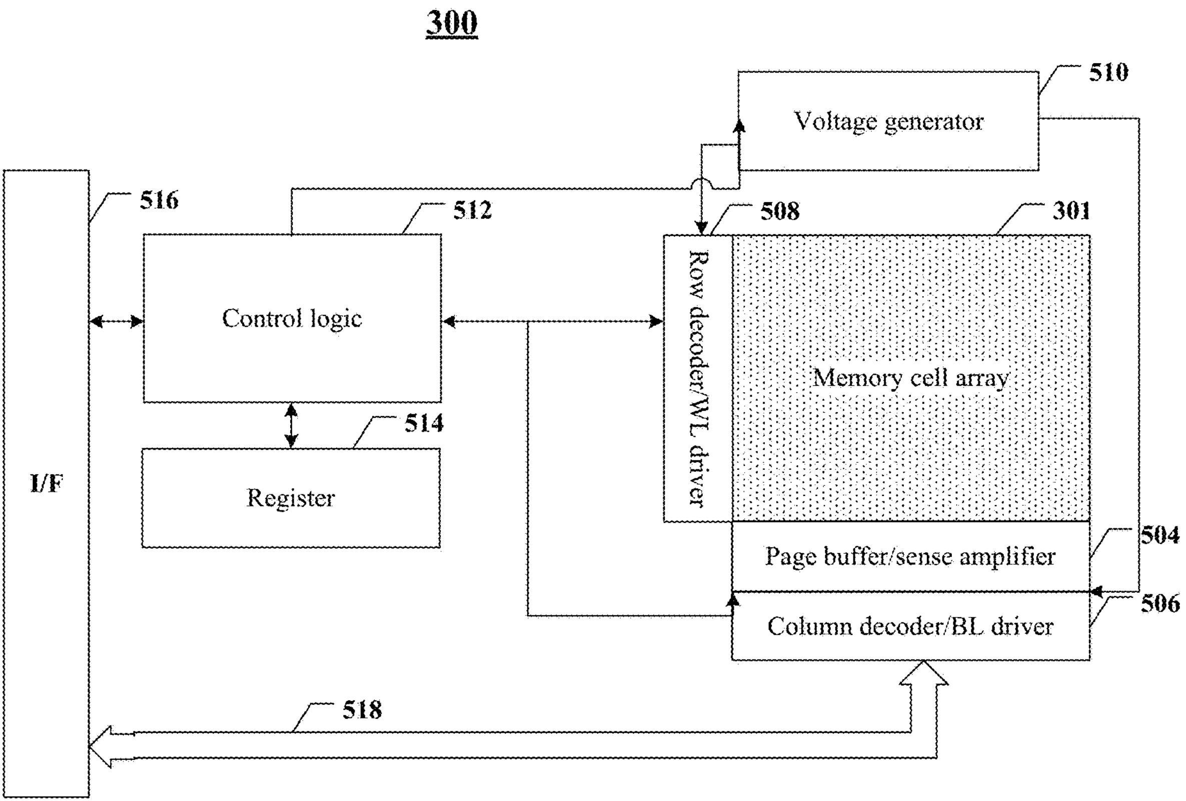
FIG. 5 is a schematic diagram of an example memory device comprising a memory cell array and a peripheral circuit according to an example of the present disclosure.

Referring back to FIG. 3, the peripheral circuit 302 can be coupled to the memory cell array 301 through bit lines 316, word lines 318, source lines 314, BSG lines 315, and TSG lines 313. The peripheral circuit 302 can include any suitable analog, digital, and mixed-signal circuits for facilitating the operations of the memory cell array 301 by applying and sensing at least one of voltage signals or current signals to and from each target memory cell 306 through bit lines 316, word lines 318, source lines 314, BSG lines 315, and TSG lines 313. The peripheral circuit 302 can include various types of peripheral circuits formed using metal-oxide-semiconductor (MOS) technologies. For example, FIG. 5 illustrates some example peripheral circuits, the peripheral circuit including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5 may be included as well.

The page buffer/sense amplifier 504 can be configured to read and program (write) data from and to the memory cell array 301 according to the control signals from the control logic 512. In one example, the page buffer/sense amplifier 504 may store program data (write data) to be programmed into the memory cell array 301. In another example, the page buffer/sense amplifier 504 may perform program verify operations to ensure that the data has been properly programmed into memory cells 306 coupled to selected word lines 318. In still another example, the page buffer/sense amplifier 504 may also sense the low power signals from the bit line 316 that represent data bits stored in the memory cells 306 and amplify the small voltage swing to recognizable logic levels in a read operation. The column decoder/bit line driver 506 can be configured to be controlled by the control logic 512 and select one or more memory strings 308 by applying bit line voltages generated from the voltage generator 510.

The row decoder/word line driver 508 can be configured to be controlled by the control logic 512 and select/deselect memory blocks 304 of the memory cell array 301 and select/deselect word lines 318 of memory blocks 304. The row decoder/word line driver 508 can be further configured to drive word lines 318 using word line voltages generated from the voltage generator 510. In some examples, the row decoder/word line driver 508 can also select/deselect and drive BSG lines 315 and TSG lines 313 as well. As described below in detail, the row decoder/word line driver 508 is configured to perform program operations on the memory cells 306 coupled to the selected word line(s) 318. The voltage generator 510 can be configured to be controlled by the control logic 512 and generate the word line voltages (e.g., read voltage, program voltage, pass voltage, channel boost voltage, verification voltage, etc.), bit line voltages, and source line voltages to be supplied to the memory cell array 301.

The control logic 512 may be coupled to each other as part of the peripheral circuit described above and configured to control the operation of each other part of the peripheral circuit. Registers 514 can be coupled to the control logic 512 and include status registers, command registers, and address registers for storing status information, command operation codes (OP codes), and command addresses for controlling the operations of each peripheral circuit. The interface 516 may be coupled to the control logic 512 and act as a control buffer to buffer and relay control commands received from a host (not shown) to the control logic 512, and to buffer and relay status information received from the control logic 512 to the host. The interface 516 may further be coupled to the column decoder/bit line driver 506 via the data bus 518 and act as a data I/O interface and data buffer to buffer and relay data to or from the memory cell array 301.

A basic principle of the three-dimensional NAND type memory is that carriers (electrons or holes) cross a charge barrier and inject a certain amount of charges into a memory cell to complete a data write process, and then stored data can be read according to a threshold voltage when the memory cell is turned on. Therefore, in order to read data correctly, an error correction algorithm with strong error correction capability and high efficiency is typically introduced at the time of data reading.

However, as the usage time increases, the charges stored in the memory cells vary with increased usage time, repeated read operations, cross temperature, etc., thus affecting the accuracy of data reading. When the threshold voltage is shifted upwardly or downwardly more significantly, the possibility of a read error occurring when the original read voltage is used to read the data from the memory cell can be very high, and when the read error exceeds the error correction capability, it can also lead to a failure to read the data from the memory cell.

Figure 6:
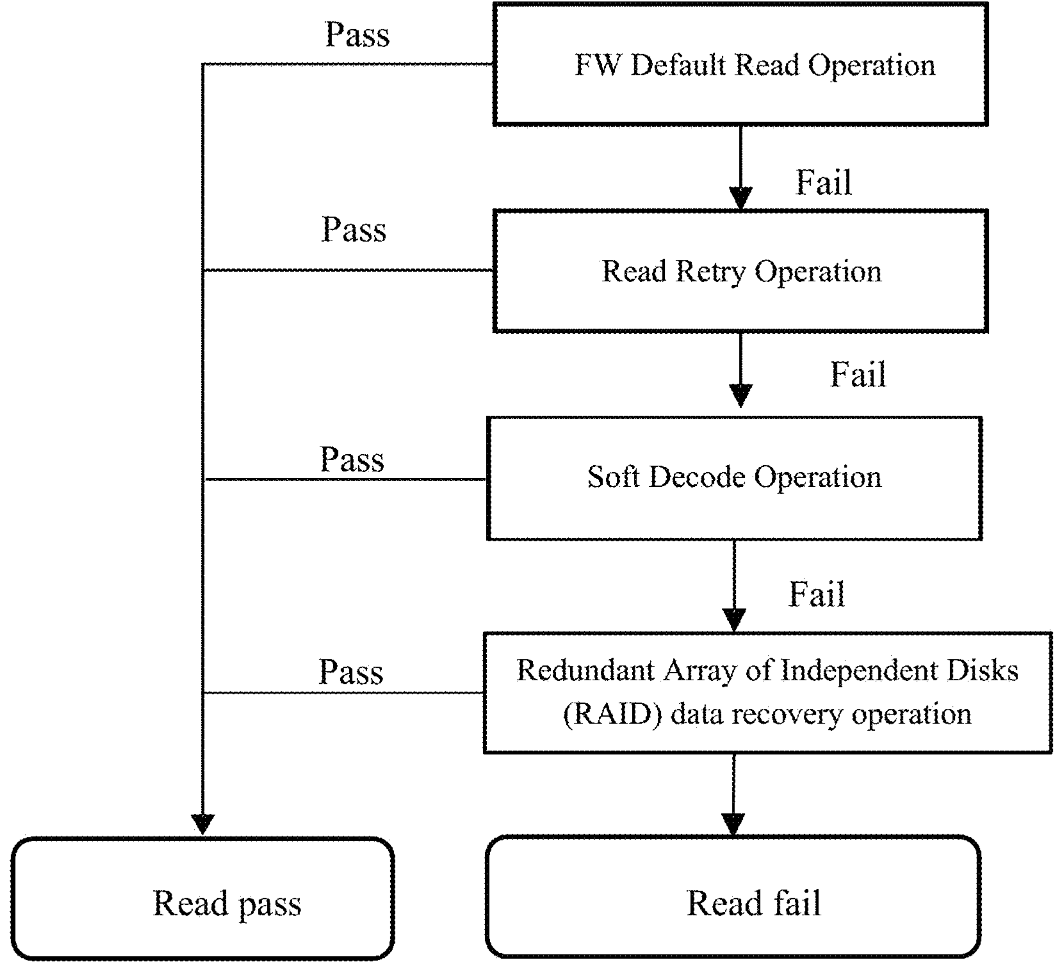
FIG. 6 is a flow diagram of an example read operation of a memory system according to an example of the present disclosure.

FIG. 6 is a flow diagram of an example read operation of a memory system. Referring to FIG. 6, when the memory controller controls the memory device to perform the read operation, a firmware (FW) default read operation is first performed on a memory cell with a corresponding physical address; a read-retry operation is performed after the FW default read operation fails; a soft decode operation is performed after the read-retry operation fails; a Redundant Array of Independent Disks (RAID) data recovery operation is performed after the soft decode operation fails. After the RAID operation fails, the read operation stops and fails due to the inability to correct errors, and the memory controller sends a read fail signal to the host 108. The read-retry operation and the FW default read operation are applicable to hard decode.

In some examples, the read-retry operation typically may be performed through querying a read-retry table (or referred to as a trial and error table) provided by a manufacturer. The essence of the read-retry operation is an error correction mechanism, where the read-retry table may provide reference voltages for data reading. Through querying the read-retry table, attempts are made to re-read each memory cell with a read voltage deviating from the normal threshold voltage and in conjunction with error correction using the error correction algorithm, attempts are made to read the data correctly. Stop querying the read-retry table if the data with read error is corrected. The read-retry table is queried until the entire read-retry table is traversed if the data with read error is not corrected.

The above read-retry operation method includes querying the read-retry table entry-by-entry, which inevitably increases the number of trial and error attempts, causing the read-retry operation to have an undesirable duration. In addition, the read-retry table provided by the manufacturer is a table of reference values in some specific environments, while the real use scenarios are ever-changing, so the read-retry table provided by the manufacturer cannot cover many of them. As such, data may not be corrected even by traversing the read-retry table, resulting in undue command-processing time. In summary, the method of performing the read-retry operation through repeated querying the read-retry table is associated with a undesirable duration, affecting the response time of subsequent commands, thus affecting the performance of the device.

Based on one or more of the above problems, in a first aspect, examples of the present disclosure provide a memory device.

Figure 7:
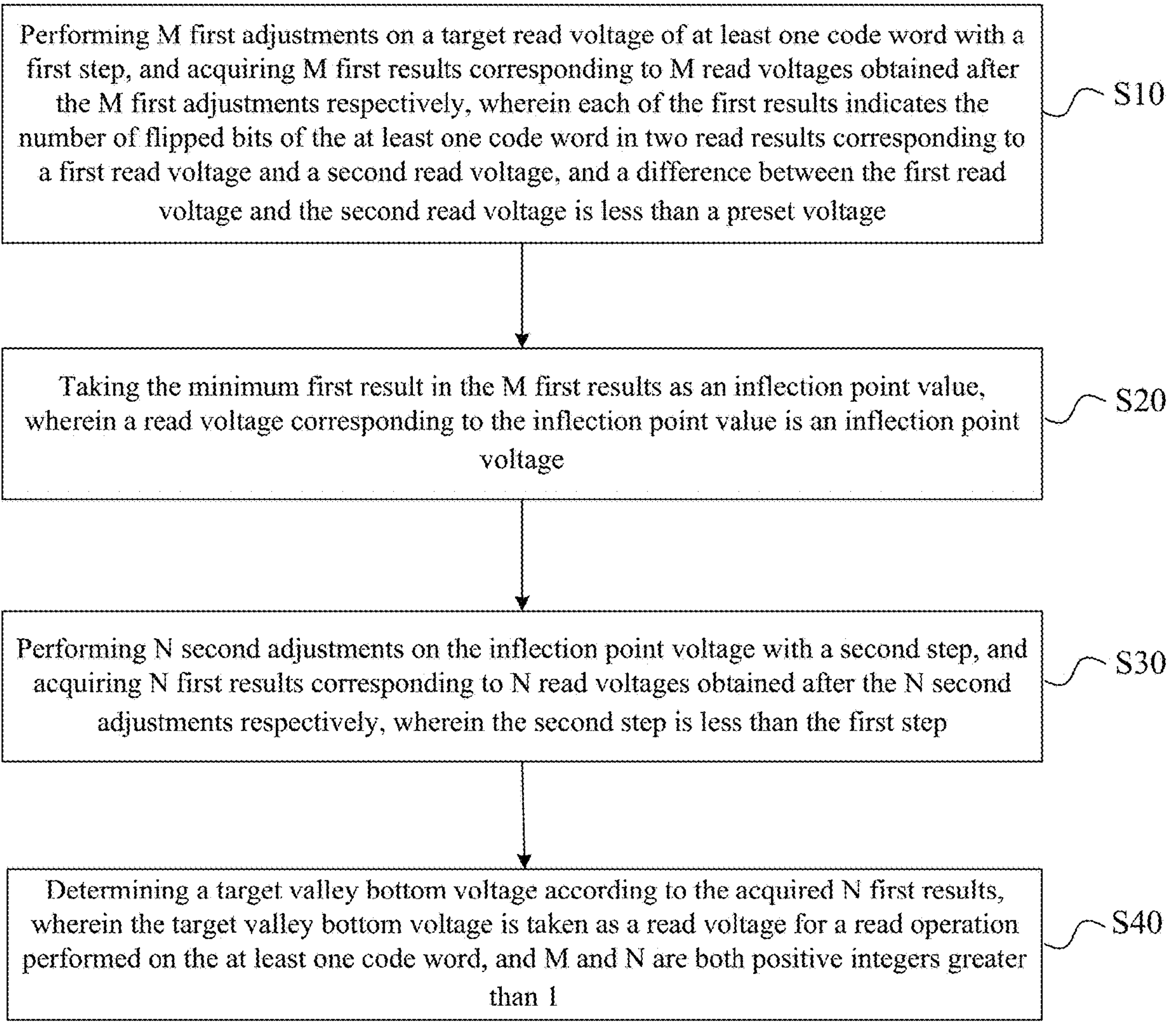
FIG. 7 is a flow diagram of implementing an operation method configured to be executed by a peripheral circuit of a memory device according to an example of the present disclosure.

As shown in FIG. 7, the memory device includes: a memory cell array including a plurality of memory cells, where a preset number of the memory cells form a code word; and a peripheral circuit coupled with the memory cell array and configured to perform the following operations:

Operation S10: performing M first adjustments on a target read voltage of at least one code word with a first step, and acquiring M first results corresponding to M read voltages obtained after the M first adjustments respectively, where each of the first results indicates the number of flipped bits of the at least one code word in two read results corresponding to a first read voltage and a second read voltage, and a difference between the first read voltage and the second read voltage is less than a preset voltage;

Operation S20: taking the minimum first result in the M first results as an inflection point value, where a read voltage corresponding to the inflection point value is an inflection point voltage;

Operation S30: performing N second adjustments on the inflection point voltage with a second step, and acquiring N first results corresponding to N read voltages obtained after the N second adjustments respectively, where the second step is less than the first step; and Operation S40: determining a target valley bottom voltage according to the acquired N first results, where the target valley bottom voltage is taken as a read voltage for a read operation performed on the at least one code word, and M and N are both positive integers greater than 1.

In some examples, the memory device includes a memory cell array including a plurality of memory blocks, each memory block including a plurality of word lines and a plurality of memory cells coupled with each word line. All the memory cells coupled with one word line form a physical page. A preset number of memory cells form one code word (CW). One physical page includes one or more code words.

In some examples, the number of memory cells included in one code word is the same as the number of memory cells included in one time of coding or decoding during error correction coding or decoding. In some examples, the number of memory cells included in one code word may be less than or equal to the number of memory cells coupled with one physical page, for example, the number of memory cells included in one code word is ¼ of the number of memory cells coupled with one physical page. In some examples, the code word may include $2^4$ to $2^{12}$ memory cells. In an example, the code word may include $2^4$, $2^8$, or $2^{12}$ memory cells.

Overall, different memory systems may choose different sizes of code words to meet various performance, reliability, and storage demands. Memory cells (such as the MLC, the TLC, or the QLC) in different types of memory devices may store different numbers of bits. It may be understood that the code word may include a plurality of memory cells, and the number of memory cells included in the code word may be adjusted according to an actual situation.

It is to be noted that the code word may have some additional reserved spaces for management and error correction in practice, and thus, the number of memory cells required in practice may slightly exceed the above calculation.

Here, the target valley bottom voltage is taken as the read voltage for the read operation on the at least one code word. In the process of determining the target valley bottom voltage, first adjustments may be understood as large-step adjustments, or referred to as coarse adjustments. Second adjustments may be understood as small-step adjustments, or referred to as fine adjustments. That is, a core idea of the adjustment solution is performing the coarse adjustments followed by the fine adjustments. As such, the number of cyclic iterations can be reduced, to determine the target valley bottom voltage more quickly.

Here, the first step is greater than the second step. The first step may be a larger step. In some examples, the first step may range from 50 mV to 150 mV, and in an example, the first step may include 50 mV, 80 mV, 100 mV, 120 mV, or 150 mV. The second step may be a smaller step. In some examples, the second step may range from 20 mV to 40 mV, and in an example, the second step may include 20 mV, 30 mV, or 40 mV.

Here, a read voltage obtained after each adjustment is used as a horizontal coordinate, a corresponding first result corresponding to the adjusted target read voltage is used as a vertical coordinate, and the horizontal coordinate and the vertical coordinate form a point. An inflection point may be understood as a point close to a valley bottom. A point at the valley bottom is a point corresponding to the target valley bottom voltage used as a horizontal coordinate. The inflection point value is a vertical coordinate of the inflection point, and the inflection point voltage is a horizontal coordinate of the inflection point.

The meaning of the first result and a method for acquiring the first result are described below.

Here, the first result indicates the number of flipped bits of the code word on which the read operation is to be performed in two read results corresponding to a respective read voltage and a voltage adjacent to the respective read voltage.

In some examples, during a process of reading the memory device, one read operation may read data of one physical page. When the number of memory cells included in one code word may be less than the number of memory cells coupled with one physical page, the code word may be a unit executed for acquiring the first result, without excluding the case of a plurality of code words. In other words, the first result of at least one code word corresponding to a current read voltage may be acquired here. For example, one physical page may correspond to 4 code words, a page buffer hardware operation may count respective Fail Bit Counts (FBCs) of the 4 code words at one time, and then the FBCs of the four code words are summed to obtain an FBC of one physical page. A sum value is used in subsequent calculation. It may be understood that the first result here may be data based on one physical page, and one physical page may include a plurality of code words.

Here, the first read voltage and the second read voltage are both generalized concepts, and the difference between the first read voltage and the second read voltage is less than the preset voltage. In some examples, the second read voltage is greater than the first read voltage, and the difference between the first read voltage and the second read voltage is set to a range from 5 mV to 20 mV, and in an example, the difference between the first read voltage and the second read voltage may include 5 mV, 10 mV, 15 mV, or 20 mV. In some other particular examples, the second read voltage is less than the first read voltage, and the difference between the first read voltage and the second read voltage is set to a range from −5 mV to −20 mV, and in an example, the difference between the first read voltage and the second read voltage may include −5 mV, −10 mV, −15 mV, or −20 mV.

In some examples, the peripheral circuit is configured to: read data stored in the code word with the first read voltage to obtain a second result; perform a third adjustment on the first read voltage with a third step to obtain the second read voltage, and read data stored in the code word with the second read voltage to obtain a third result; perform a logic operation on the second result and the third result to obtain a fourth result; and count the number of bits in the fourth result that indicate flips of the third result compared to the second result to obtain the first result.

In some examples, the peripheral circuit includes: a first latch configured to store the second result; a second latch configured to store the third result; and a third latch configured to store the fourth result.

Here, the first read voltage and the second read voltage are associated backwards and forwards, that is, the second read voltage is obtained after the third adjustment on the first read voltage. Accordingly, the voltage difference between the first read voltage and the second read voltage is the third step. The second step is greater than the third step, e.g., the third step may be a smaller step. In some examples, the third step ranges from 5 mV to 20 mV, and in an example, the third step may include 5 mV, 10 mV, 15 mV, or 20 mV. The preset voltage is related to the third step and may be a voltage slightly greater than the third step. In some examples, the preset voltage is set to a range from 6 mV to 21 mV, and in an example, the preset voltage may include 6 mV, 11 mV, 16 mV, or 21 mV. In some other particular examples, the preset voltage is set to a range from −6 mV to −21 mV, and in an example, the preset voltage may include −6 mV, −10 mV, −16 mV, or −21 mV.

As set forth above, the first read voltage and the second read voltage are both generalized concepts, the target read voltage and a read voltage obtained after an adjustment on the target read voltage each can be referred to as the first read voltage, and a read voltage obtained after the third adjustment on the first read voltage may be referred to as the second read voltage. In the examples of the present disclosure, the first result corresponding to a particular voltage may be understood as follows: upon the third adjustment on the particular voltage, the number of flipped bits of the code word on which the read operation is to be performed in two read results corresponding to the particular voltage and a voltage obtained after the third adjustment on the particular voltage may be taken as the first result corresponding to the particular voltage.

In some examples, prior to acquiring the first result of the at least one code word corresponding to the respective target read voltage, a read mode of the memory device is set to a Single Level Read (SLR) mode, where the SLR mode includes reading at least one bit of data stored in the memory cell with one level of read voltage. Multi-level read voltages will be detailed herein below.

In some examples, the memory device is configured to: enter a single level read mode in response to a mode setting command; and acquire a first result of the at least one code word corresponding to a target read voltage at a first target order in the single level read mode.

Figure 8:
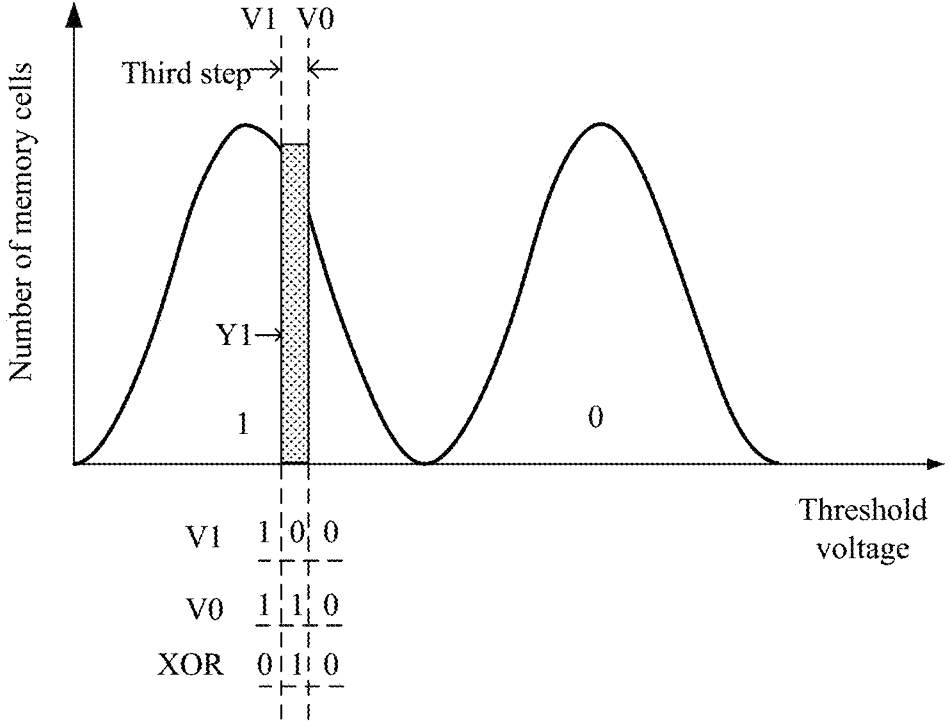
FIG. 8 is a schematic diagram of a threshold voltage distribution of memory cells during acquisition of first results according to an example of the present disclosure.

In some examples, the data stored in the code word is read with the first read voltage to obtain the second result, and the second result is stored in the first latch of the memory device. In an example, as shown in FIG. 8, the data stored in at least one the code word is read with the first read voltage V0 to obtain the second result. In an example, a memory cell with a threshold voltage less than the target read voltage V0 is labeled as bit 1, and a memory cell with a threshold voltage greater than the target read voltage V0 is labeled as bit 0 to obtain the second result; the second result is stored in the first latch of the memory device.

Next, the third adjustment is performed on the first read voltage to obtain the second read voltage, and the data stored in the code word is read with the second read voltage to obtain the third result; the third result is stored in the second latch of the memory device. In an example, as shown in FIG. 8, the third adjustment is performed on the first read voltage V0, and the data stored in the code word is read with the second read voltage V1 obtained after the adjustment to obtain the third result. In an example, a memory cell with a threshold voltage less than the second read voltage V1 is labeled as bit 1, and a memory cell with a threshold voltage greater than the second read voltage V1 is labeled as bit 0 to obtain the third result; the third result is stored in the second latch of the memory device.

Next, the logic operation is performed on the second result and the third result to obtain the fourth result; the fourth result is stored in the third latch of the memory device. In an example, as shown in FIG. 8, an exclusive-OR operation is performed on the second result and the third result to obtain the fourth result; the fourth result is stored in the third latch of the memory device. It is to be noted that the exclusive-OR operation is one of basic logic operations. In binary, if two binary numbers at the same location are identical, the result is "0", and if two binary numbers at the same location are different, the result is "1" (e.g., identical binary numbers result in 0, and different binary numbers result in 1).

Next, count the number of bits in the fourth result that indicate flips of the third result compared to the second result to obtain the first result. In an example, as shown in FIG. 8, a portion in the fourth result in which the bit is 1 indicates the number of memory cells each having different threshold voltages between the first read voltage V0 and the second read voltage V1. That is, the portion in the fourth result in which the bit 1 indicates the number of flipped bits of the code word in the two read results corresponding to the first read voltage V0 and the second read voltage V1, and the number is denoted as the first result Y1 corresponding to the first read voltage.

It is to be noted that the first result is also referred to as FBC in the examples of the present disclosure.

To reduce the number of cyclic iterations, a point at a better location (e.g., closer to the valley) may be determined first before the coarse adjustment, and the point is used for subsequent coarse and fine adjustments.

In some examples, the peripheral circuit is configured to: before performing the M first adjustments on the target read voltage of the at least one code word with the first step, determine a near-valley threshold according to a first result corresponding to an initial target read voltage of the at least one code word, where the near-valley threshold indicates the maximum of the corresponding first results near the target valley bottom voltage; before performing the M first adjustments on the target read voltage of the at least one code word with the first step, perform a plurality of adjustments on the initial target read voltage, until a first result corresponding to an adjusted target read voltage is less than the near-valley threshold; and take the adjusted target read voltage corresponding to the first result less than the near-valley threshold as the target read voltage, and perform the M first adjustments on the target read voltage with the first step.

Here, the initial target read voltage may be a read voltage in the case where the threshold voltage of the memory cell has not been shifted, such as a read voltage corresponding to the time when the write operation has just been carried out, in which case a corresponding offset is 0. In the examples of the present disclosure, the first result of the at least one code word corresponding to the initial target read voltage may be acquired through the above method of acquiring the first result, e.g., acquiring the corresponding first result by taking the initial target read voltage as the first read voltage.

The near-valley threshold indicates the maximum of the corresponding first results near the target valley bottom voltage. In some examples, the peripheral circuit is configured to: acquire the near-valley threshold according to the first result corresponding to the target read voltage and a first mapping function, where the first mapping function indicates a relationship between the near-valley threshold and the first result corresponding to the target read voltage.

Here, the first mapping function is related to characteristics of the memory device, and the first mapping function may be obtained by fitting many experimental results before the memory device leaves the factory and stored in the memory device.

The plurality of adjustments are performed on the initial target read voltage before performing the M first adjustments on the target read voltage of the at least one code word with the first step. In some examples, the plurality of adjustments here may be blind adjustments.

In some other particular examples, the peripheral circuit is configured to: before performing the M first adjustments on the target read voltage of the at least one code word with the first step, during the plurality of adjustments on the initial target read voltage, when the first result corresponding to the adjusted target read voltage is greater than or equal to the near-valley threshold, acquire a target read voltage after a next adjustment based on a first result corresponding to a target read voltage after a previous adjustment; take the adjusted target read voltage corresponding to a first result being less than the near-valley point threshold for the first time among the plurality of first results corresponding to the adjusted target read voltages as a near-valley point voltage; and during the M first adjustments on the target read voltage with the first step, perform adjustments with the first step in two opposite directions respectively starting from the near-valley point voltage, until first results corresponding to adjusted read voltages in the two directions are both greater than the near-valley threshold.

Here, each of the plurality of adjustments is acquiring the target read voltage after the next adjustment according to a situation of the previous adjustment. In some examples, the peripheral circuit is configured to: acquire the target read voltage after the next adjustment according to the first result corresponding to the target read voltage after the previous adjustment and a second mapping function, where the second mapping function indicates a relationship between the first result corresponding to the target read voltage after the previous adjustment and a predicted read voltage after the next adjustment.

Here, the second mapping function is related to the characteristics of the memory device, and the second mapping function may be obtained by fitting many experimental results before the memory device leaves the factory and stored in the memory device. However, the second mapping function is different from the first mapping function. While the first mapping function supports only one computation, the second mapping function allows for a plurality of iterations.

In some examples, the near-valley threshold may be acquired by substituting the first result corresponding to the initial target read voltage into the first mapping function, and then the first result corresponding to the initial target read voltage (acting as the target read voltage after the previous adjustment) may be substituted into the second mapping function to obtain an adjusted target read voltage. If the first result corresponding to the adjusted target read voltage currently obtained is less than the near-valley threshold, a point corresponding to the adjusted target read voltage may be used directly as an object for the subsequent first adjustment. If the first result corresponding to the adjusted target read voltage currently obtained is greater than or equal to the near-valley threshold, then the first result corresponding to the adjusted target read voltage may be substituted into the second mapping function again to obtain a new adjusted target read voltage, and the first result corresponding to the newly obtained target read voltage is compared with the near-valley threshold. As such, the cyclic iterations are performed using the second mapping function, until obtaining an adjusted target read voltage corresponding to a first result being less than the near-valley point threshold for the first time. The adjusted target read voltage corresponding to a first result being less than the near-valley point threshold for the first time is taken as the near-valley point voltage. A point corresponding to the near-valley point voltage is a near-valley point.

In some examples, the peripheral circuit is configured to: during the M first adjustments on the near-valley point voltage with the first step, perform adjustments with the first step in a first direction starting from the near-valley point voltage, until a first result corresponding to an adjusted target read voltage in the first direction is greater than the near-valley threshold; and perform adjustments with the first step in a second direction opposite to the first direction starting from the near-valley point voltage, until a first result corresponding to an adjusted target read voltage in the second direction is greater than the near-valley threshold.

Here, the first adjustments need to be performed in two directions. The first direction may be a leftward direction (or referred to as a negative direction), and the second direction may be a rightward direction (or referred to as a positive direction); alternatively, the first direction may be a rightward direction (or referred to as a positive direction), and the second direction may be a leftward direction (or referred to as a negative direction). During the M first adjustments, an adjustment order of the first direction and the second direction may be adjusted according to the actual demands.

In some other examples, the first adjustments may also be performed in one direction. It is to be noted that, in the case that an application scenario is determined, and an offset direction of the threshold voltage can be inferred, the first adjustments may be performed in only one direction. For example, in the case that an application scenario is determined for data retention, and it can be inferred that a threshold voltage distribution of the memory cell is offset leftward, the first adjustments may also be performed in only the leftward direction (or referred to as the negative direction).

Figure 9A:
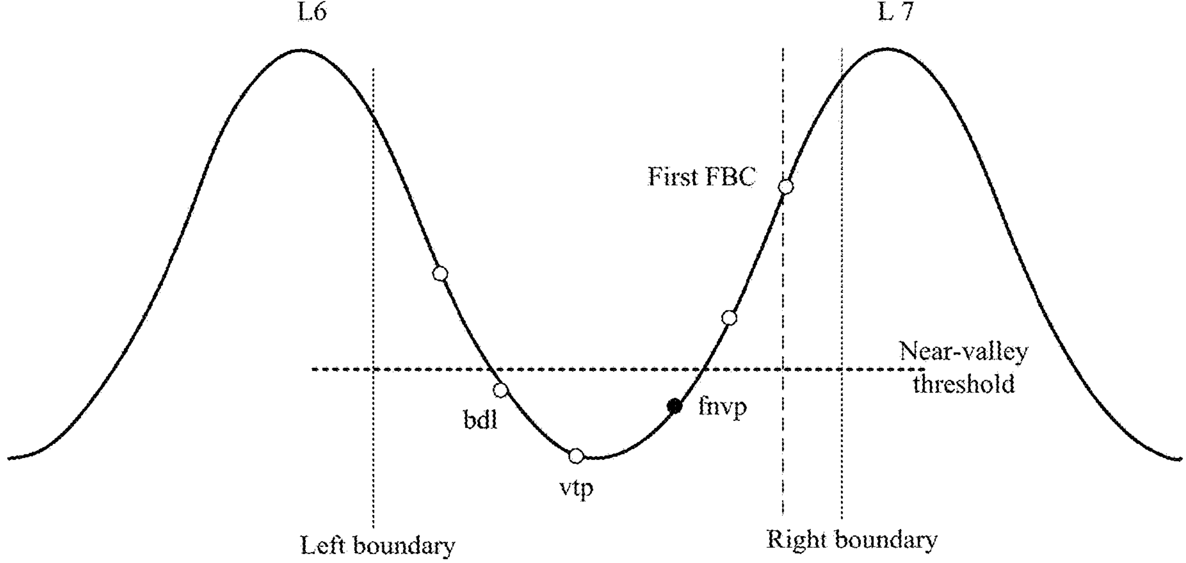
FIG. 9A is a schematic diagram of a distribution of a near-valley point and a near-valley threshold according to an example of the present disclosure.

In an example, as shown in FIG. 9A, the first result corresponding to the initial target read voltage is a first FBC, the near-valley threshold is acquired according to the first FBC and the first mapping function, and the near-valley point fnvp is found according to the first FBC and the second mapping function (in one or more iterations). The adjustments are performed with the first step respectively in the leftward direction and the rightward direction (or referred to as the positive direction) starting from the near-valley point, until first results corresponding to adjusted read voltages in the two directions are both greater than the near-valley threshold.

In some examples, the peripheral circuit is configured to: during the N second adjustments on the inflection point voltage with the second step, perform adjustments with the second step in two opposite directions respectively starting from the inflection point voltage; during adjustments in each direction, perform a count of upward trends when a first result corresponding to a target read voltage after a next adjustment is greater than a first result corresponding to a target read voltage after a previous adjustment, and determine a first boundary voltage and a second boundary voltage according to a total count is greater than or equal to a preset count; and during the adjustments in the two directions, if a first result corresponding to a target read voltage after one adjustment is lower than a preset threshold, or the minimum first result in a plurality of first results corresponding to target read voltages after a plurality of adjustments is taken as a reference value, when the number of first results, among the remaining plurality of first results, having a difference from the reference value that is less than a preset difference is greater than a preset number, stop the adjustments and take an adjusted target read voltage corresponding to the minimum first result in the plurality of first results as the target valley bottom voltage.

Here, the target read voltage after the previous adjustment and the target read voltage after the next adjustment are both generalized concepts. In any two adjacent ones of the second adjustments, the previous adjustment is an adjustment at an earlier adjustment moment, and the next adjustment is an adjustment at a later adjustment moment.

Here, the preset count indicates a degree to which the inflection point is raised, and the preset count may be adjusted according to the actual situation. In some examples, the preset count includes 3, 4, 5, 6, or 7, and in an example, the preset count may include 3, 5, or 7.

During the adjustments in each direction, if the first result corresponding to the target read voltage after the next adjustment is greater than the first result corresponding to the target read voltage after the previous adjustment, it indicates that the first result corresponding to the target read voltage after the next adjustment presents an upward trend compared to the first result corresponding to the target read voltage after the previous adjustment, in which case the count of upward trends is performed. If the first result corresponding to the target read voltage after the next adjustment is less than or equal to the first result corresponding to the target read voltage after the previous adjustment, it indicates that the first result corresponding to the target read voltage after the next adjustment presents a downward or constant trend compared to the first result corresponding to the target read voltage after the previous adjustment, in which case the count of upward trends is not performed. In other words, the count data of upward trends remains unchanged when the count is performed at this time.

Here, the preset threshold indicates the maximum in a range of predicted effective valley bottom voltages. The preset threshold may be determined according to the first result corresponding to the initial target read voltage. It may be understood that during the read operation, the further the threshold voltage of the memory cell is offset from the threshold voltage at the time of writing, the larger the first result read using the initial target read voltage will be as well. On that basis, a specific value of the first result corresponding to the initial target read voltage can be used to determine the preset threshold, where the preset threshold indicates a situation of a change (raise) of the valley bottom voltage due to the offset of the threshold voltage of the memory cell.

It is to be noted that although the preset threshold and the near-valley threshold mentioned above are both obtained according to the first result corresponding to the initial target read voltage, there are differences therebetween. When the first result is less than the near-valley threshold, it indicates that a finer adjustment or search can be carried out subsequently; when the first result is less than the preset threshold, it indicates that a stop of the adjustment or search may be taken into consideration, to determine the target valley bottom voltage directly.

In some examples, when the first result is less than the preset threshold, it indicates that the adjusted target read voltage corresponding to the first result at this time may be taken as the target valley bottom voltage.

In some examples, the minimum first result in a plurality of first results corresponding to target read voltages obtained after N second adjustments is taken as a reference value, when the number of first results, among the remaining plurality of first results, having a difference from the reference value that is less than a preset difference is greater than a preset number, stop the adjustments and take an adjusted target read voltage corresponding to the minimum first result in the plurality of first results as the target valley bottom voltage. Here, the preset difference and the preset number can be set jointly according to the actual situation. Typically, if the preset difference is set to be larger, then the preset number is also larger; if the preset difference is set to be smaller, then the preset number is also smaller.

In some examples, the peripheral circuit is configured to: during the N second adjustments on the inflection point voltage with the second step, perform adjustments with the second step in a first direction starting from the inflection point voltage, until a total count of upward trends during the adjustments in the first direction is equal to the preset count; and perform adjustments with the second step in a second direction opposite to the first direction starting from the inflection point voltage, until a total count of upward trends during the adjustments in the second direction is equal to the preset count.

Here, the second adjustments are required to be performed in two directions. The first direction may be a leftward direction (or referred to as a negative direction), and the second direction may be a rightward direction (or referred to as a positive direction); alternatively, the first direction may be a rightward direction (or referred to as a positive direction), and the second direction may be a leftward direction (or referred to as a negative direction). During the M first adjustments, an adjustment order of the first direction and the second direction may be adjusted according to the actual demands.

Here, the second adjustment is stopped when the total count of upward trends during the adjustments in the first direction/second direction is equal to the preset count.

In some examples, the peripheral circuit is configured to: during the adjustments in the first direction, take an adjusted target read voltage corresponding to the case when the total count of upward trends is equal to the preset count as the first boundary voltage, and during the adjustments in the second direction, take an adjusted target read voltage corresponding to the case when the total count of upward trends is equal to the preset count as the second boundary voltage; during the adjustments in the two directions, if the first boundary voltage and the second boundary voltage are determined, acquire a first result corresponding to a read voltage of a last adjustment, where the read voltage of the last adjustment is an average of the first boundary voltage and the second boundary voltage; and take a read voltage corresponding to the minimum first result in a plurality of first results corresponding to all adjusted read voltages as the target valley bottom voltage.

Figure 9B:
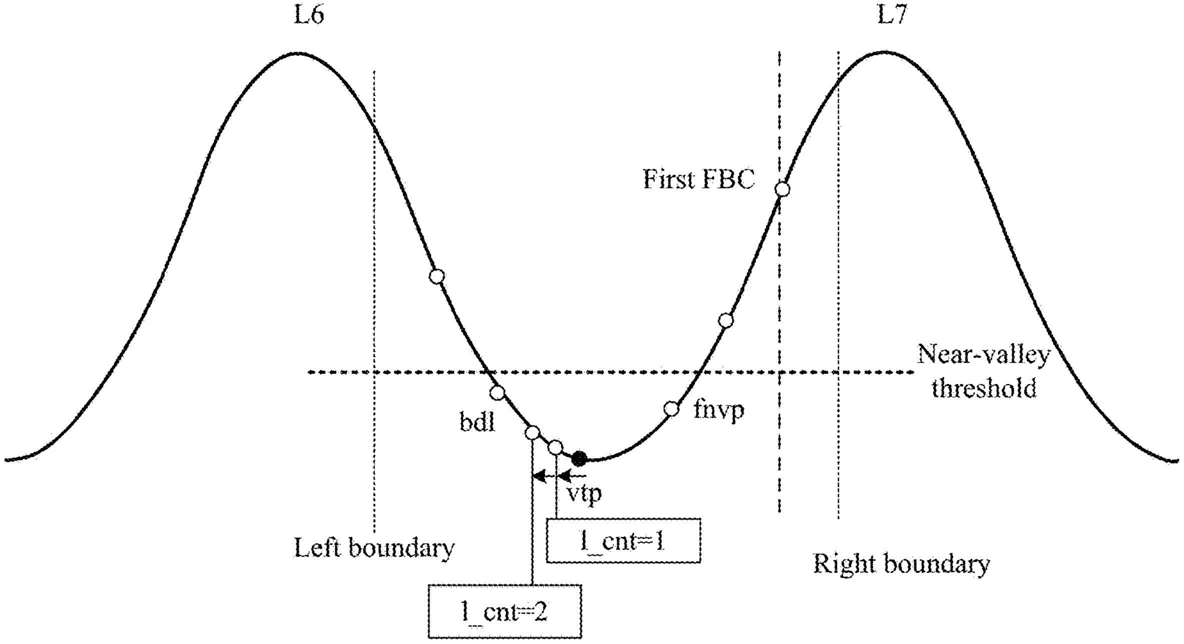
FIG. 9B is a schematic diagram of a statistics situation that trend upward when a second adjustment is made to the left according to an example of the present disclosure.
Figure 9C:
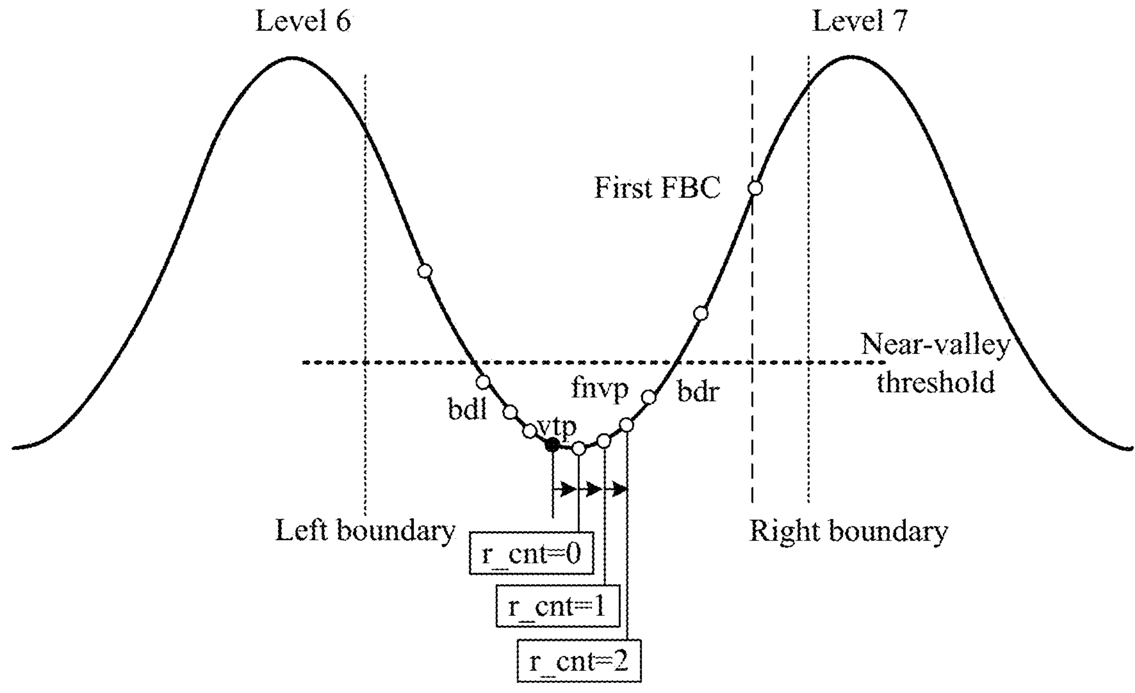
FIG. 9C is a schematic diagram of a statistics situation that trend upward when a second adjustment is made to the right according to an example of the present disclosure.

Here, a boundary corresponding to the first boundary voltage may be a left boundary, and a boundary corresponding to the second boundary voltage may be a right boundary; alternatively, a boundary corresponding to the first boundary voltage may be a right boundary, and a boundary corresponding to the second boundary voltage may be a left boundary. With reference to FIGS. 9A-9C, the read voltage is adjusted in opposite directions, starting from the near-valley point voltage. In some examples, a read voltage determined when adjusting the read voltage from the near-valley point voltage in a first direction is referred to as a left boundary voltage (denoted as "bdl" in FIGS. 9A-9C), and a read voltage determined when adjusting the read voltage from the near-valley point voltage in a second direction opposite to the first direction is referred to as a right boundary voltage (denoted as "bdr" in FIG. 9C).

In an example, as shown in FIG. 9B, after the M first adjustments, a point corresponding to the minimum first result in the M first results corresponding to the M first adjustments is determined to be the inflection point vtp. During the adjustments with the second step in the leftward direction starting from the inflection point vtp, the count of upward trends is performed when the first result corresponding to the target read voltage after the next adjustment is greater than the first result corresponding to the target read voltage after the previous adjustment. In FIG. 9B, two second adjustments in the leftward direction both present upward trends, and thus a total count of upward trends is 2. Then, according to the setting of the preset count, if the preset count is reached, the second adjustments with the second step in the rightward direction may be started; if the preset count is not reached, the second adjustments in the leftward direction may be continued, until the preset count is reached.

In an example, as shown in FIG. 9C, during the adjustments with the second step in the rightward direction starting from the inflection point vtp, the count of upward trends is performed when the first result corresponding to the target read voltage after the next adjustment is greater than the first result corresponding to the target read voltage after the previous adjustment. In FIG. 9C, in three second adjustments in the rightward direction, a first adjustment presents a downward trend, and thus, a total count of upward trends is 0; later two adjustments both present upward trends, and thus a total count of upward trends is 2. Then, according to the setting of the preset count, if the preset count is reached, the second adjustments may be stopped; if the preset count is not reached, the second adjustments in the rightward direction may be continued, and the second adjustments may be stopped when the preset count is reached.

Figure 10:
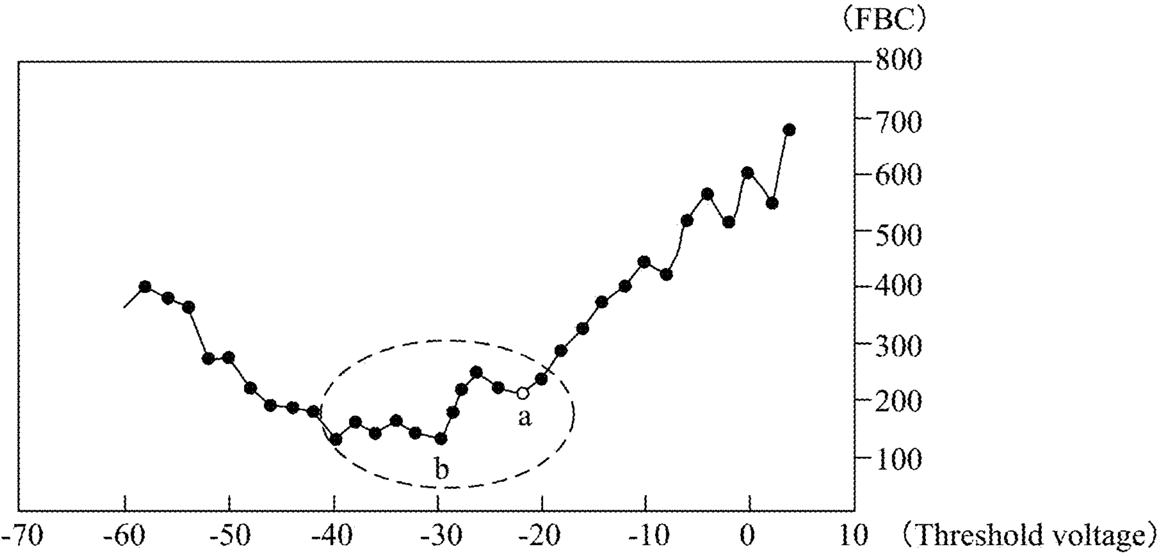
FIG. 10 is a schematic diagram of noisy point filtering according to an example of the present disclosure.

It is to be noted that a point with a downward trend compared to the previous adjustment may be filtered out, to exclude the impact of a noisy point, thereby finding the valley bottom point with a greater degree of accuracy. In an example, as shown in FIG. 10, the horizontal coordinate in FIG. 10 is the threshold voltage, and the vertical coordinate is the FBC. For a hollow circular point in the dashed line box in FIG. 10, if the point is determined to be the inflection point during the plurality of first adjustments, and instead of counting only the upward trends, upward and downward trends are both counted, then when the count in each of the leftward and rightward directions reaches the preset count, e.g., 3, during the plurality of second adjustments, the second adjustments are stopped, in which case the hollow circular point (a) corresponding the minimum FBC during the plurality of second adjustments is taken as the valley bottom point improperly. However, in a mechanism of counting only the upward trends, in the plurality of leftward second adjustments, the first and second adjustments present upward trends, and the count of upward trends is 2; the third to fifth adjustments all present downward trends, and the count of upward trends is maintained at 2; the total count of upward trends does not reach 3 until the sixth adjustment which presents an upward trend again, in which case a solid point b corresponding to the minimum FBC during the plurality of second adjustments is taken as the valley bottom point.

Considering the step of the second adjustments, there may be a case of skipping the valley bottom point if the valley bottom point is between two adjacent ones of the second adjustments. In some examples, if the first boundary voltage and the second boundary voltage are determined, the first result corresponding to the read voltage of the last adjustment is acquired, where the read voltage of the last adjustment is the average of the first boundary voltage and the second boundary voltage; and the read voltage corresponding to the minimum first result in the plurality of first results corresponding to all the adjusted read voltages is taken as the target valley bottom voltage.

Here, the average of the first boundary voltage and the second boundary voltage is exactly intended to compensate for the above possible case of skipping to obtain a more precise valley bottom point, thus obtaining a more precise valley bottom voltage.

Figure 11:
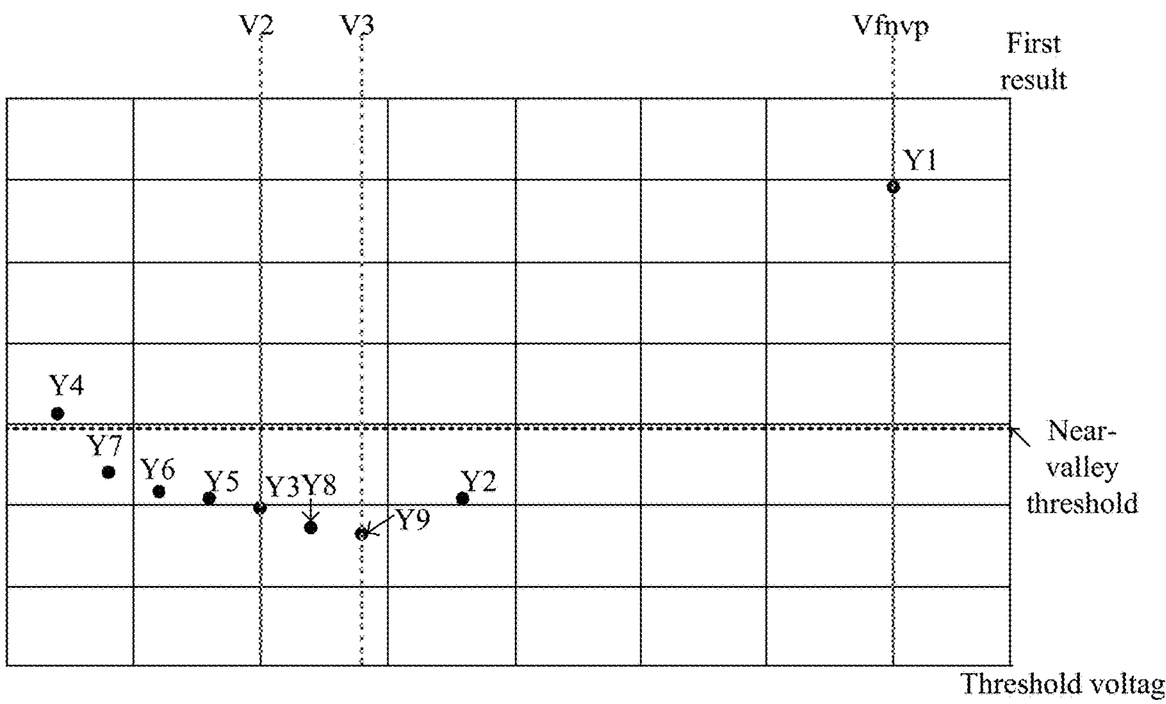
FIG. 11 is a schematic diagram of target valley bottom voltage determination according to an example of the present disclosure.

In some examples, as shown in FIG. 11, the horizontal coordinate in FIG. 11 is the threshold voltage, and the vertical coordinate is the first result. The first result Y1 shown in FIG. 11 is the near-valley point, which can be found using the method shown in FIG. 9A, e.g., acquiring the near-valley threshold according to the first result (the first FBC) corresponding to the initial target read voltage and the first mapping function, and then finding the first result according to the first FBC and the second mapping function (in one or more iterations).

In some examples, in the case that an application scenario is determined for data retention, and it can be inferred that a threshold voltage distribution of the memory cell is offset leftward, the first adjustments may also be performed in only the leftward direction (or referred to as the negative direction). In an example, as shown in FIG. 11, starting from the near-valley point (Y1), the first adjustments is performed with first step on the near-valley point voltage Vfnvp corresponding to the near-valley point in only the leftward direction (or referred to as the negative direction) to obtain first results Y2, Y3, and Y4 corresponding to a plurality of adjusted read voltages, and the adjustments are stopped until the first result Y4 is greater than the near-valley threshold. The minimum first result in the plurality of first results is taken as the inflection point value. As shown in FIG. 11, the first result Y3 is used as the inflection point value, and a read voltage corresponding to the inflection point value Y3 is the inflection point voltage V2.

During the adjustments on the inflection point voltage V2 with the second step in the leftward direction starting from the inflection point (Y3), the count of upward trends is performed when the first result corresponding to the target read voltage after the next adjustment is greater than the first result corresponding to the target read voltage after the previous adjustment. In FIG. 11, three leftward second adjustments all present upward trends, and thus a total count of upward trends is 3. That is, the first result Y3 is less than the first result Y5, the first result Y5 is less than the first result Y6, and the first result Y6 is less than the first result Y7. Then, according to the setting of the preset count, if the preset count is reached, the second adjustments with the second step in the rightward direction may be started; if the preset count is not reached, the second adjustments in the leftward direction may be continued, until the preset count is reached.

In an example, as shown in FIG. 11, during the adjustments with the second step in the rightward direction starting from the inflection point (Y3), the count of upward trends is performed when the first result corresponding to the target read voltage after the next adjustment is greater than the first result corresponding to the target read voltage after the previous adjustment. In FIG. 11, two rightward second adjustments both present downward trends, and thus a total count of upward trends is 0. That is, the first result Y3 is greater than the first result Y8, and the first result Y8 is greater than the first result Y9. Furthermore, if the first result Y9 corresponding to the target read voltage after a second one of the rightward second adjustments is less than a preset threshold (not shown in FIG. 11), the adjustments are stopped, and an adjusted target read voltage V3 corresponding to the minimum first result (Y9) in the plurality of first results is taken as the target valley bottom voltage.

In the case that an application scenario is determined for data retention, and it can be inferred that a threshold voltage distribution of the memory cell is offset leftward, the first adjustments may also be performed in only the leftward direction (or referred to as the negative direction), thereby saving adjustment time of the first adjustments in the rightward direction (or referred to as the positive direction). As such, the direction of the first adjustments may be adjusted flexibly according to the actual application scenario, to reduce the number of cyclic iterations and thus determine the target valley bottom voltage more quickly.

In some examples, the memory cell array includes memory cells with P memory bits, where the P memory bits correspond to P pages respectively, and P bits of data stored in the P-bit memory cell is read via Q levels of read voltages; P and Q are both integers greater than 1, and $Q=2^P-1$.

Figure 12A:
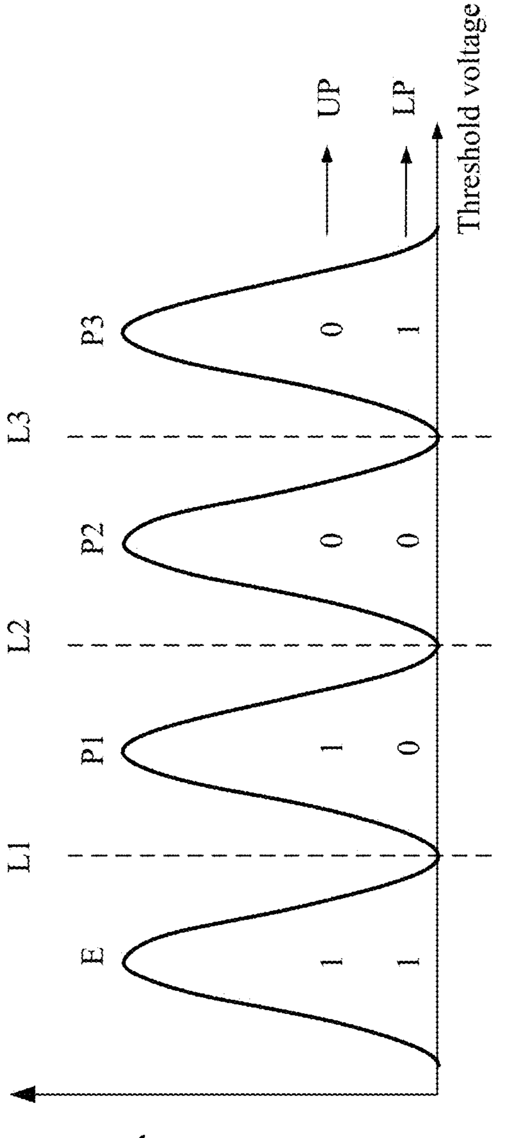
FIG. 12A is a schematic diagram of a threshold voltage distribution corresponding to memory cells each comprising two memory bits according to an example of the present disclosure.
Figure 12A:

In an example, when there are two memory bits in the memory cell, corresponding storage states include zeroth to third states. Referring to FIG. 12A, the four states are a zeroth state (also referred to as an erased state) E, a first state (also referred to as a first storage state) P1, a second state (also referred to as a second storage state) P2, and a third state (also referred to as a third storage state) P3 respectively, and binary data corresponding to the four states are 11, 10, 00, and 01, respectively. Accordingly, the memory device includes two pages, which are a Lower Page (LP) and an Upper Page (UP), respectively.

Taking the memory cell shown in FIG. 12A as an example, the two-bit, four-state data stored in the two-bit memory cell is read through three levels of read voltages (a first-level read voltage L1, a second-level read voltage L2, and a third-level read voltage L3).

In an example, one of the pages corresponds to multi-level read voltages, and the other page corresponds to one level of read voltage. As shown in FIG. 12A, the lower page corresponds to binary data 1001 respectively, and a read of the lower page requires the corresponding first-level read voltage L1 and the third-level read voltage L3. The upper page corresponds to binary data 1100 respectively, and a read of the upper page requires the corresponding second-level read voltage L2.

Figure 12B:
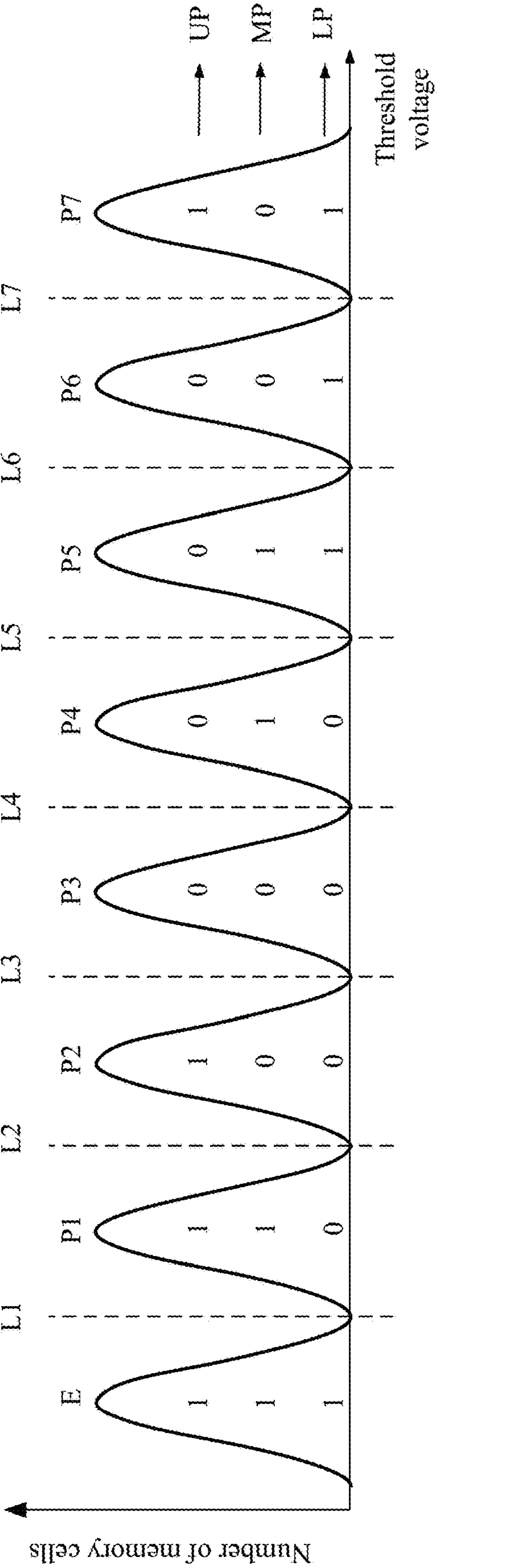
FIG. 12B is a schematic diagram of a threshold voltage distribution corresponding to memory cells each comprising three memory bits according to an example of the present disclosure.

In an example, when there are three memory bits in the memory cell, corresponding storage states include zeroth to seventh states. Referring to FIG. 12B, the eight states are a zeroth state (also referred to as an erased state) E, a first state (also referred to as a first storage state) P1, a second state (also referred to as a second storage state) P2, . . . , and a seventh state (also referred to as a seventh storage state) P7 respectively, and binary data corresponding to the eight states are 111, 110, 100, 000, 010, 011, 001, and 101, respectively. Accordingly, the memory device includes three pages, which are a lower page, a Middle Page (MP) and an upper page, respectively.

Taking the memory cell shown in FIG. 12B as an example, the three-bit, eight-state data stored in the three-bit memory cell is read through seven levels of read voltages (a first-level read voltage L1, a second-level read voltage L2, a third-level read voltage L3, a fourth-level read voltage L4, a fifth-level read voltage L5, a sixth-level read voltage L6, and a seventh-level read voltage L7).

In an example, each of the pages corresponds to multi-level read voltages. As shown in FIG. 12B, the lower page corresponds to binary data 10000111 respectively, and a read of the lower page requires the corresponding first-level read voltage L1 and the fifth-level read voltage L5. The middle page corresponds to binary data 11001100 respectively, and a read of the middle page requires the corresponding second-level read voltage L2, the fourth-level read voltage L4, and the sixth-level read voltage L6. The upper page corresponds to binary data 11100001 respectively, and a read of the upper page requires the corresponding third-level read voltage L3 and the seventh-level read voltage L7.

Figure 12C:
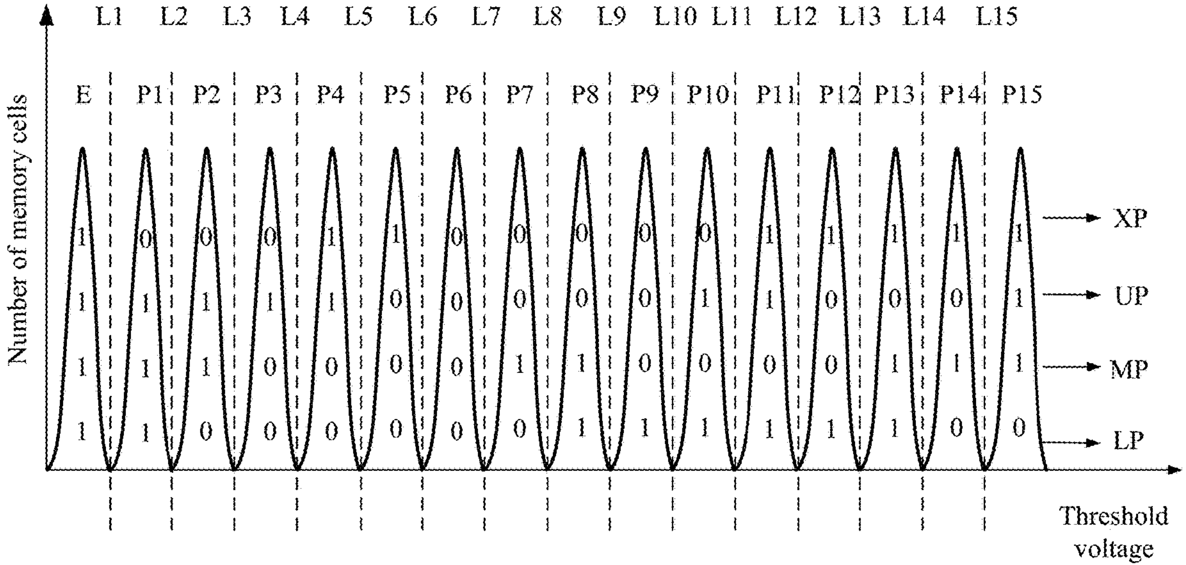
FIG. 12C is a schematic diagram of a threshold voltage distribution corresponding to memory cells each comprising four memory bits according to an example of the present disclosure.

In an example, when there are four memory bits in the memory cell, corresponding storage states include zeroth to fifteenth states. Referring to FIG. 12C, the sixteen states are a zeroth state (also referred to as an erased state) E, a first state (also referred to as a first storage state) P1, a second state (also referred to as a second storage state) P2, . . . , and a fifteenth state (also referred to as a fifteenth storage state) P15 respectively, and binary data corresponding to the sixteen states are 1111, 0111, 0110, . . . , and 1110, respectively. Accordingly, the memory device includes four pages, which are a lower page, a middle page, an upper page, and an Extra Page (XP), respectively. Here, the four memory bits corresponding to the 16 states are stored in the lower page, the middle page, the upper page, and the extra page.

Taking the memory cell shown in FIG. 12C as an example, the four-bit, sixteen-state data stored in the four-bit memory cell is read through fifteen levels of read voltages (a first-level read voltage L1, a second-level read voltage L2, a third-level read voltage L3, a fourth-level read voltage L4, a fifth-level read voltage L5, a sixth-level read voltage L6, a seventh-level read voltage L7, an eighth-level read voltage L8, a ninth-level read voltage L9, a tenth-level read voltage L10, an eleventh-level read voltage L11, a twelfth-level read voltage L12, a thirteenth-level read voltage L13, a fourteenth-level read voltage L14, and a fifteenth-level read voltage L15).

In an example, each of the pages corresponds to multi-level read voltages. As shown in FIG. 12C, the lower page corresponds to binary data 1100000011111100 respectively, and a read of the lower page requires the corresponding second-level read voltage L2, the eighth-level read voltage L8, and the fourteenth-level read voltage L14. The middle page corresponds to binary data 1110000110000111 respectively, and a read of the middle page requires the corresponding third-level read voltage L3, the seventh-level read voltage L7, the ninth-level read voltage L9, and the thirteenth-level read voltage L13. The upper page corresponds to binary data 1111100000110001 respectively, and a read of the upper page requires the corresponding fifth-level read voltage L5, the tenth-level read voltage L10, the twelfth-level read voltage L12, and the fifteenth-level read voltage L15. The extra page corresponds to binary data 1000110000011111 respectively, and a read of the extra page requires the corresponding first-level read voltage L1, the fourth-level read voltage L4, the sixth-level read voltage L6, and the eleventh-level read voltage L11.

In the examples of the present disclosure, a target valley bottom voltage corresponding to each level of read voltage in the multi-level read voltages corresponding to each page is sequentially determined, respectively. The lower page is typically closest to a source/drain, and thus each of the levels of read voltages corresponding to the lower page is determined preferentially, with a fastest access speed and shortest response time, thereby ensuring leveling performance and durability during data access.

It is to be noted that determining each of the levels of read voltages corresponding to the lower page preferentially is merely an example, and is not intended to limit an order of determining each of the levels of read voltages corresponding to at least part of the pages in the examples of the present disclosure.

In some examples, at least part of the pages correspond to multi-order read voltages, and the multi-order read voltages include a read voltage of a first order and a read voltage of a second order, where the read voltage of the second order is less than the read voltage of the first order. In an example, the read voltage of the first order may be understood as a maximum read voltage in the multi-order read voltages corresponding to each page, and the read voltage of the second order may be understood as other read voltage in the multi-order read voltages corresponding to each page that is less than the maximum read voltage.

It is to be noted that, the first order and the second order are used for distinguishing between a high-level read voltage and a low-level read voltage in the multi-order read voltages corresponding to at least part of the pages, where the low-level read voltage is less than the high-level read voltage. For a memory cell including a plurality of memory bits, one page corresponding to one memory bit may include one or more orders, and one order may include one or more levels.

In an example, referring to FIG. 12A, the memory device includes the lower page and the upper page, where the lower page corresponds to a plurality of orders including the first level and the third level, where the first-level read voltage L1 is less than the third-level read voltage L3. Here, the third-level read voltage L3 corresponds to the read voltage of the first order, and the first-level read voltage L1 corresponds to the read voltage of the second order.

In an example, referring to FIG. 12B, the memory device includes the lower page, the middle page, and the upper page, where each page corresponds to a plurality of orders. A plurality of orders corresponding to the lower page include the first level and the fifth level, where the first-level read voltage L1 is less than the fifth-level read voltage L5. A plurality of orders corresponding to the middle page include the second level, the fourth level, and the sixth level, where the second-level read voltage L2 and the fourth-level read voltage L4 are both less than the sixth-level read voltage L6. A plurality of orders corresponding to the upper page include the third level and the seventh level, where the third-level read voltage L3 is less than the seventh-level read voltage L7. Here, the fifth-level read voltage L5, the sixth-level read voltage L6, and the seventh-level read voltage L7 correspond to read voltages of the first order of the lower page, the middle page, and the upper page, respectively; and the first-level read voltage L1, the second-level read voltage L2, the fourth-level read voltage L4, and the third-level read voltage L3 correspond to read voltages of the second order of the lower page, the middle page, and the upper page, respectively.

In an example, referring to FIG. 12C, the memory device includes the lower page, the middle page, the upper page, and the extra page, where each page corresponds to a plurality of orders. A plurality of orders corresponding to the lower page include the second level, the eighth level, and the fourteenth level, where the second-level read voltage L2 and the eighth-level read voltage L8 are both less than the fourteenth-level read voltage L14. A plurality of orders corresponding to the middle page include the third level, the seventh level, the ninth level, and the thirteenth level, where the third-level read voltage L3, the seventh-level read voltage L7, and the ninth-level read voltage L9 are all less than the thirteenth-level read voltage L13. A plurality of orders corresponding to the upper page include the fifth level, the tenth level, the twelfth level, and the fifteenth level, where the fifth-level read voltage L5, the tenth-level read voltage L10, and the twelfth-level read voltage L12 are less than the fifteenth-level read voltage L15. A plurality of orders corresponding to the extra page include the first level, the fourth level, the sixth level, and the eleventh level, where the first-level read voltage L1, the fourth-level read voltage L4, and the sixth-level read voltage L6 are less than the eleventh-level read voltage L11. Here, the fourteenth-level read voltage L14, the thirteenth-level read voltage L13, the fifteenth-level read voltage L15, and the eleventh-level read voltage L11 correspond to read voltages of the first order of the lower page, the middle page, the upper page, and the extra page, respectively; the second-level read voltage L2 and the eighth-level read voltage L8 correspond to read voltages of the second order of the lower page; the third-level read voltage L3, the seventh-level read voltage L7, and the ninth-level read voltage L9 correspond to read voltages of the second order of the middle page; the fifth-level read voltage L5, the tenth-level read voltage L10, and the twelfth-level read voltage L12 correspond to read voltages of the second order of the upper page; the first-level read voltage L1, the fourth-level read voltage L4, and the sixth-level read voltage L6 correspond to read voltages of the second order of the extra page.

In some examples, where the memory cell array includes memory cells with a plurality of memory bits, the plurality of memory bits correspond to a plurality of pages respectively, and at least one of the pages corresponds to a plurality of orders, and the peripheral circuit is configured to: after determining a target valley bottom voltage of the at least one code word at a target order, determine target valley bottom voltages of other orders in the plurality of orders than the target order, respectively.

Here, the target order is one of the plurality of orders (one of a plurality of levels), and in some examples, the target order may be selected first as the above first order or high order.

An example of determining other orders is provided below.

In some examples, the plurality of orders include a first order and a second order, and a read voltage of the second order is less than a read voltage of the first order; the peripheral circuit is configured to: when an order corresponding to the determined target valley bottom voltage belongs to the first order, acquire at least one of a predicted valley bottom voltage of the second order in the plurality of orders or predicted valley bottom voltages of other first orders with lower read voltages according to the determined target valley bottom voltage.

It is to be noted that the predicted valley bottom voltage here may be used directly as the target valley bottom voltage to perform the read operation on the data to be read as required, or be further processed to obtain the target valley bottom voltage. An example method of acquiring the predicted valley bottom voltage will be further described herein below.

Here, the first order and the second order are described above and are no longer repeated here. In the examples of the present disclosure, a target valley bottom voltage/predicted valley bottom voltage of a high order (first order) can be used to obtain a predicted valley bottom voltage of a low order (second order) and the remaining predicted valley bottom voltages of the high order. In an example, the predicted valley bottom voltage of an order to be predicted may be acquired according to the target valley bottom voltage/predicted valley bottom voltage of the high order, the order (the second order or other first order) to be predicted, and a third mapping function. Here, the third mapping function is related to the performance (particularly the offset performance of the threshold voltage of the memory cell) of the memory device, and the third mapping function may be obtained by fitting many experimental results before the memory device leaves the factory and stored in the memory device. Here, the third mapping function is different from both the first mapping function and the second mapping function. The third mapping function does not support cyclic iterations.

According to the first aspect, in each memory device provided by the examples of the present disclosure, transmitting the first result (the size of the first result may be a few bytes), rather than transmitting the at least one code word (for example, the size of the code word may be 4 KB), reduces the amount of transmitted data and reduces transmission time of an output port. The process of acquiring the first result converges inside the memory device, without occupying, for example, a space of the memory controller, and is less dependent on, for example, the memory controller. At the same time, in the examples of the present disclosure, during the adjustments, the coarse adjustment is followed by the fine adjustment, e.g., the large-step adjustment (first adjustment) is performed first, followed by the small-step adjustment (second adjustment). As such, over-adjustment can be avoided during the adjustments, thereby reducing the number of cyclic iterations and determining the target valley bottom voltage more quickly. Furthermore, in the examples of the present disclosure, during the small-step adjustment, the count of the upward trends compared to the previous adjustment is introduced, which can filter out a point with a downward trend compared to the previous adjustment, excluding the impact of a noisy point and thereby finding the valley bottom point more accurately.

Figure 13A:
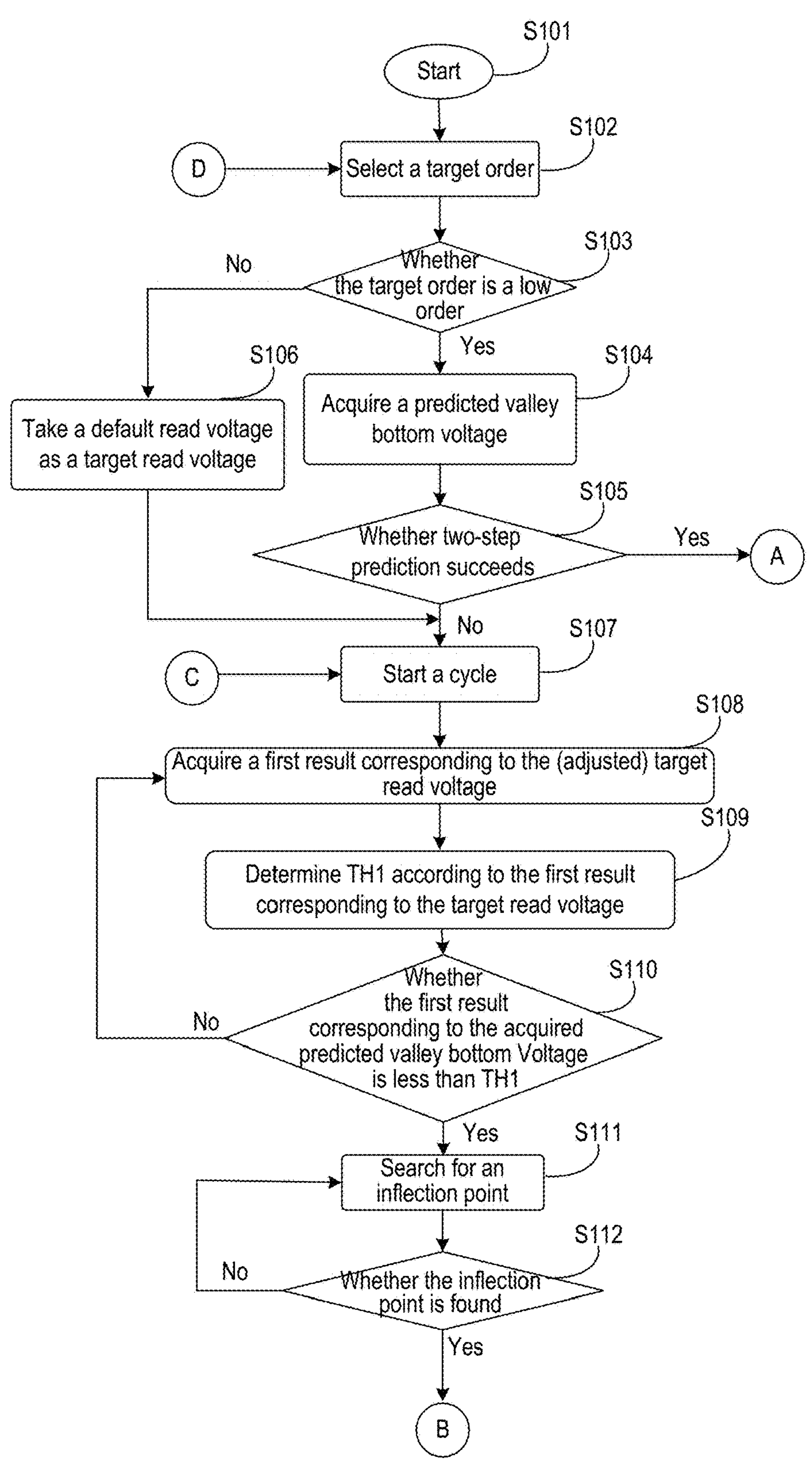
FIGS. 13A and 13B are a flowchart of a method of operating a memory device according to an example of the present disclosure.
Figure 13B:
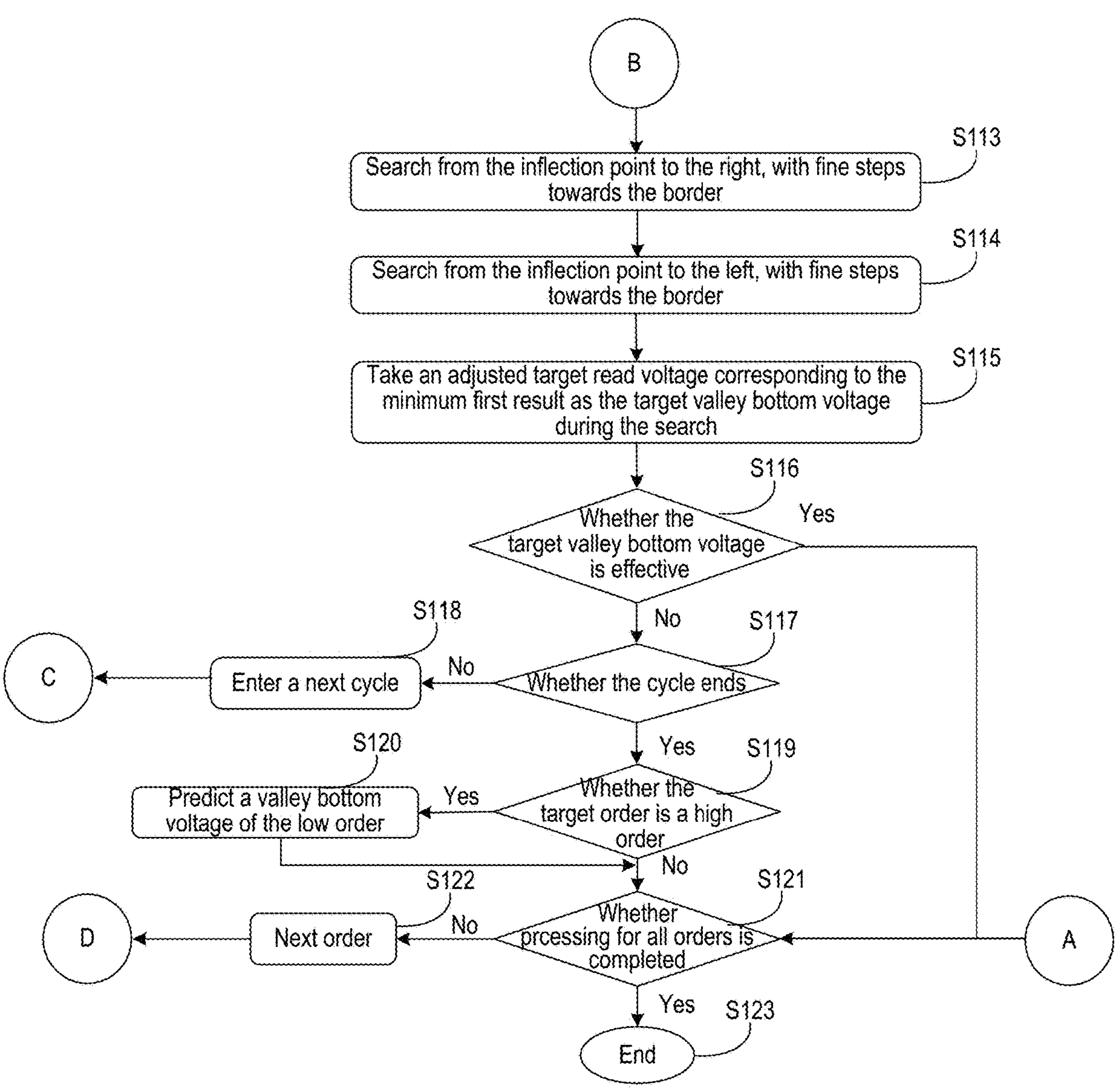

FIGS. 13A and 13B are a flowchart of a method of operating a memory device according to an example of the present disclosure. A detailed process of determining the target valley bottom voltage will be described in detail below through FIGS. 13A and 13B. It is to be noted that here and hereafter, the target valley bottom voltage refers to a voltage used to perform the read operation on the data to be read.

In operation S101, a program for acquiring the target valley bottom voltage is triggered, and a process of acquiring the target valley bottom voltage is started. Then operation S102 is performed.

As set forth above, the memory cell has a plurality of memory bits, the plurality of memory bits correspond to a plurality of pages respectively, and at least one page corresponds to a plurality of orders. During determining of the target valley bottom voltages, the target valley bottom voltages for each of the at least one order of read voltages corresponding to each of the plurality of pages are determined sequentially. In operation S103, one order is selected from the plurality of orders corresponding to one page as the target order, and the target read voltage corresponding to the read voltage of the target order is determined first. In an example, taking TLC as an example, target valley bottom voltages of the first-level read voltage L1 and the fifth-level read voltage L5 corresponding to the lower page are determined first, and one of L1 or L5 may be selected as the target order. Operation S103 is performed after the target order is determined.

Operation S103 is mainly intended to determine a type of the target order. Here, the target order can be divided into two types, the first order (also referred to as the high order) and the second order (also referred to as the low order), where the read voltage of the first order is greater than the read voltage of the second order. In an example, still using the lower page of the TLC as an example, L5 is the first order, and L1 is the second order. If L1 is selected as the target order in operation S103, the target order is the second order, e.g., the low order; if L5 is selected as the target order in operation S104, the target order is the first order, e.g., the high order. If the target order is the low order, operation S104 is performed; if the target order is the high order, operation S106 is performed.

In operation S104, the predicted valley bottom voltage is acquired. Here, as for the predicted valley bottom voltage, the predicted valley bottom voltage corresponding to the low order is acquired according to the target valley bottom voltage corresponding to the high order and a related mapping function. Here and hereafter, the related mapping function may be obtained by fitting many experimental results before the memory device leaves the factory and stored in the memory device. Then operation S105 is performed.

In operation S105, determine whether two-step prediction succeeds. Here, the two-step prediction may include first-step prediction and second-step prediction. The first-step prediction is to acquire the predicted valley bottom voltage of the high order, and more specifically, to acquire the predicted valley bottom voltage of the high order according to the first result corresponding to the target read voltage (a default read voltage), an order of the high order, and a fourth mapping function. The second-step prediction is to acquire the predicted valley bottom voltage of the low order, and more specifically, to acquire the predicted valley bottom voltage of the low order according to the predicted valley bottom voltage of the high order as mentioned above, an order of the low order, and the third mapping function. Furthermore, the two-step prediction is followed by no confirmation of the predicted valley bottom voltage, and the predicted valley bottom voltage of the high order and the predicted valley bottom voltage of the low order are used directly to perform hard decoding. If the hard decoding succeeds, it indicates that the two-step prediction succeeds, in which case the search for the target valley bottom voltage is stopped directly and operation S121 is performed. If the hard decoding fails, it indicates that the two-step prediction fails, in which case the point corresponding to the predicted valley bottom voltage is used as the near-valley point for the subsequent iterations and operation S107 is continued.

It is to be noted that if the hard decoding fails, it indicates that the two-step prediction does not succeed, in which case the target valley bottom voltage is required to be determined by means of searching, or referred to as a cycling (or iteration). Therefore, a cyclic process is entered when the two-step prediction does not succeed, so that when the two-step prediction does not succeed, a search process can be started directly from the beginning of the cycle, e.g., a move to operation S107 from operation S105.

If the target order is the high order, the target valley bottom voltage of the high order is determined by means of the searching or cycling. In operation S106, the default read voltage is taken as the target read voltage. Here, the target read voltage can be used as an initial value for subsequent searching or cycling. In some examples, the default read voltage may be a read voltage in the case where the threshold voltage of the memory cell has not been shifted, such as a read voltage corresponding to the time when the write operation has just been carried out, in which case a corresponding offset is 0 DAC, which is a voltage offset. Operation S107 is performed after operation S106.

It is to be noted that, here and hereafter, a conversion relationship between DAC and mV is 1 DAC=10 mV.

In operation S107, the target valley bottom voltage is determined by means of searching or cycling. Operation S108 is performed after operation S107.

A first time of performing the cyclic process in operation S108 is to acquire the first result corresponding to the target read voltage. It may be understood that subsequent times of performing the cyclic process in operation S108 are to acquire the first result corresponding to the adjusted target read voltage. Operation S109 is performed after operation S108.

In operation S109, a first threshold TH1 is determined or adjusted according to the first result corresponding to the target read voltage. It may be understood that during the read operation, the further the threshold voltage of the memory cell is offset from the threshold voltage at the time of writing, the larger the first result read using the initial target read voltage will be as well. On that basis, a specific value of the first result corresponding to the initial target read voltage can be used to determine the first threshold TH1, where the first threshold TH1 indicates a situation of a change (raise) of the valley bottom voltage due to the offset of the threshold voltage of the memory cell. Operation S110 is performed after operation S109. A further understanding of the first threshold here may be referred to the related description of the preset threshold in the above examples.

It is to be noted that operation S109 is mainly for the first time of performing the cyclic process, and may be skipped for the subsequent times of performing the cyclic process.

In operation S110, the predicted valley bottom voltage is acquired, and whether the corresponding first result corresponding to the predicted valley bottom voltage is less than the first threshold TH1 is determined. A predicted valley bottom voltage of the next adjustment is acquired according to the first result corresponding to the target read voltage after the previous adjustment and a related mapping function (e.g., the above second mapping function), and a first result corresponding to the acquired predicted valley bottom voltage is compared with the magnitude of the first threshold TH1. When a determination result of operation S110 is a "no," it indicates that the first result corresponding to the predicted valley bottom voltage acquired at this time is greater than or equal to the first threshold TH1, and operation S108 of the cycle is continued by adjusting the target read voltage, re-acquiring the predicted valley bottom voltage, and comparing the first result corresponding to each re-acquired predicted valley bottom voltage with the magnitude of the first threshold TH1, until the first result corresponding the acquired predicted valley bottom voltage is less than the first threshold TH1. That is, a prediction iteration is performed using the above prediction formula or related mapping functions, until the first result corresponding the acquired predicted valley bottom voltage is less than TH1. When a determination result of operation S110 is a "yes," it indicates that the first result corresponding to the acquired predicted valley bottom voltage at this time is less than the first threshold TH1, and proceed to the next operation S111.

A search for the inflection point is performed in operation S111. Here, a target read voltage after each adjustment is taken as an horizontal coordinate, the corresponding first result corresponding to the adjusted target read voltage is taken as an vertical coordinate, and the horizontal coordinate and the vertical coordinate form a point. An inflection point may be understood as a point close to a valley bottom. In some examples, the search may be performed with a coarse step (the first step), starting from the near-valley point and proceeding to the left boundary and the right boundary respectively, until the left boundary and the right boundary are reached, where the point corresponding to the minimum first result during the search is taken as the inflection point. Here, the inflection point is a point closer to the valley bottom than the near-valley point, and a point less than the first threshold in preceding operations may be taken as the near-valley point, for example, the near-valley point may be a point less than the first threshold that is present first in the preceding operations. The first step may be a larger step. In some examples, the first step may include 5-15 DAC, and in an example, the first step may include 5 DAC, 10 DAC, or 15 DAC. Operation S112 is performed after operation S111.

Whether the inflection point is found is determined in operation S112. If no inflection point is found, the search is continued by continuing operation S111, until the inflection point is found. Operation S113 is performed after the inflection point is found.

In operations S113 and S114, the search may be performed with a fine step (the second step), starting from the near-valley point and proceeding to the left boundary and the right boundary respectively, until the left boundary and the right boundary are reached or the count of upward trends exceeds the preset count. Here, when the first result corresponding to the target read voltage after the next adjustment is greater than the first result corresponding to the target read voltage after the previous adjustment, the count of upward trends is performed. In some examples, the preset count includes 3, 4, 5, 6, or 7, and in an example, the preset count may include 3, 5, or 7. It is to be noted that operations S113 and S114 may be interchanged. The second step may be a smaller step. In some examples, the second step may include 2-4 DAC, and in an example, the second step may include 2 DAC, 3 DAC, or 4 DAC.

Operation S115 is performed when searches in operations S113 and S114 both satisfy the above condition (reaching boundaries or the count of upward trends exceeding the preset count).

In operation S115, the adjusted target read voltage corresponding to the minimum first result is taken as the target valley bottom voltage. Operation S116 is performed after operation S115.

Whether the target valley bottom voltage is effective is determined in operation S116. Here, a method of determining whether the target valley bottom voltage is effective may be as follows: reading data using the target valley bottom voltage, decoding the read data by the memory controller, and if the decoding succeeds, it indicates that the target valley bottom voltage is effective. Operation S121 is performed when a determination result of operation S116 is a "yes;" and operation S117 is performed when a determination result of operation S116 is a "no."

Whether the cycle ends is determined in operation S117. Operation S119 is performed when a determination result of operation S117 is a "yes;" and operation S118 is performed when a determination result of operation S117 is a "no."

A next cycle is entered in operation S118 to continue the search. Operation S118 may move to operation S107.

Whether the target order is the high order is determined in operation S119. Operation S120 is performed when a determination result of operation S119 is a "yes;" and operation S121 is performed when a determination result of operation S119 is a "no."

In operation S120, the predicted valley bottom voltage of the low order is acquired according to the target valley bottom voltage/predicted valley bottom voltage of the high order. Here, the predicted valley bottom voltage of the low order may be acquired through the target valley bottom voltage/predicted valley bottom voltage of the high order, the order of the low order, and a related mapping function (e.g., the above third mapping function). Operation S121 is performed after operation S120.

Whether respective target valley bottom voltages corresponding to read voltages of all orders included in the page have been determined is determined in operation S121. When a determination result of operation S121 is a "yes," it indicates that the respective target valley bottom voltages corresponding to the read voltages of all the orders included in the page have been determined, in which case operation S123 may be performed. When a determination result of operation S121 is a "no," it indicates that there is an order in the page for which a target valley bottom voltage corresponding to the read voltage thereof has not been determined yet, in which case operation S122 is performed.

In operation S122, the target valley bottom voltage of each order for which the target valley bottom voltage has not been determined is determined sequentially. Operation S122 may move to operation S102.

In operation S123, the process of acquiring the target valley bottom voltage ends. It is to be noted that determining of target valley bottom voltages corresponding to read voltages of all orders of a next page may be started after operation S123.

Figure 14A:
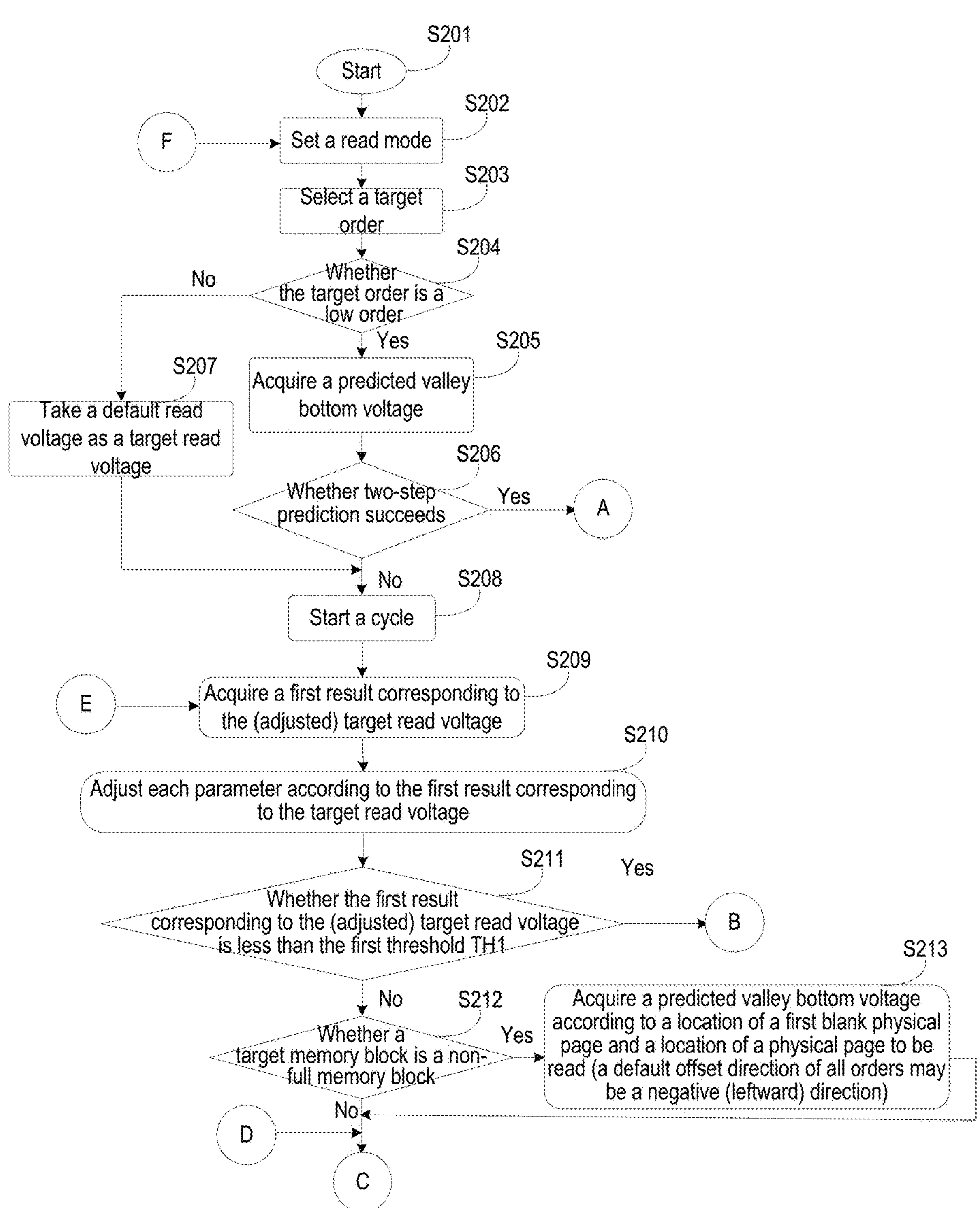
FIGS. 14A-14C are a flowchart of a method of operating a memory device according to an example of the present disclosure.
Figure 14B:
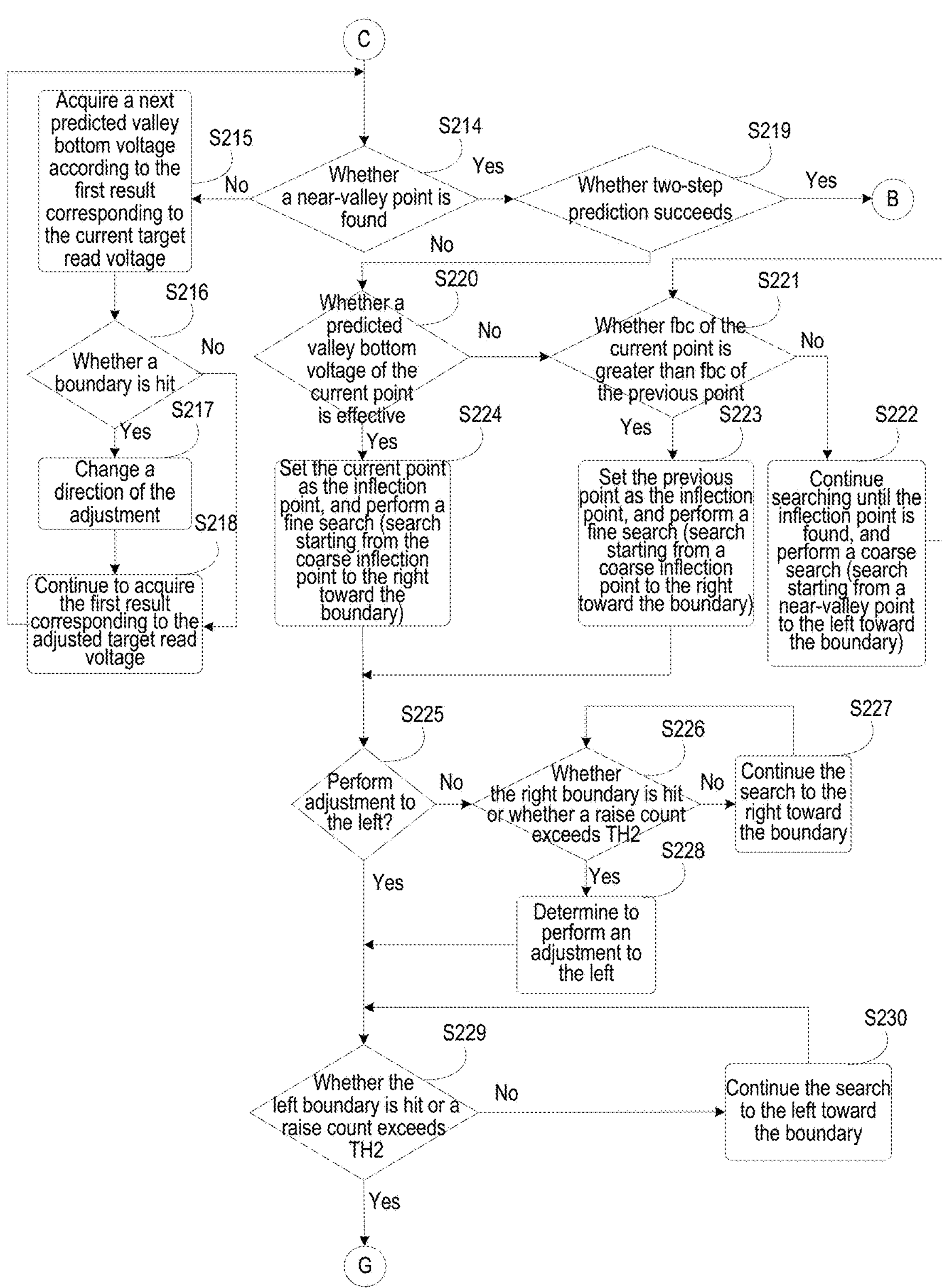
Figure 14C:
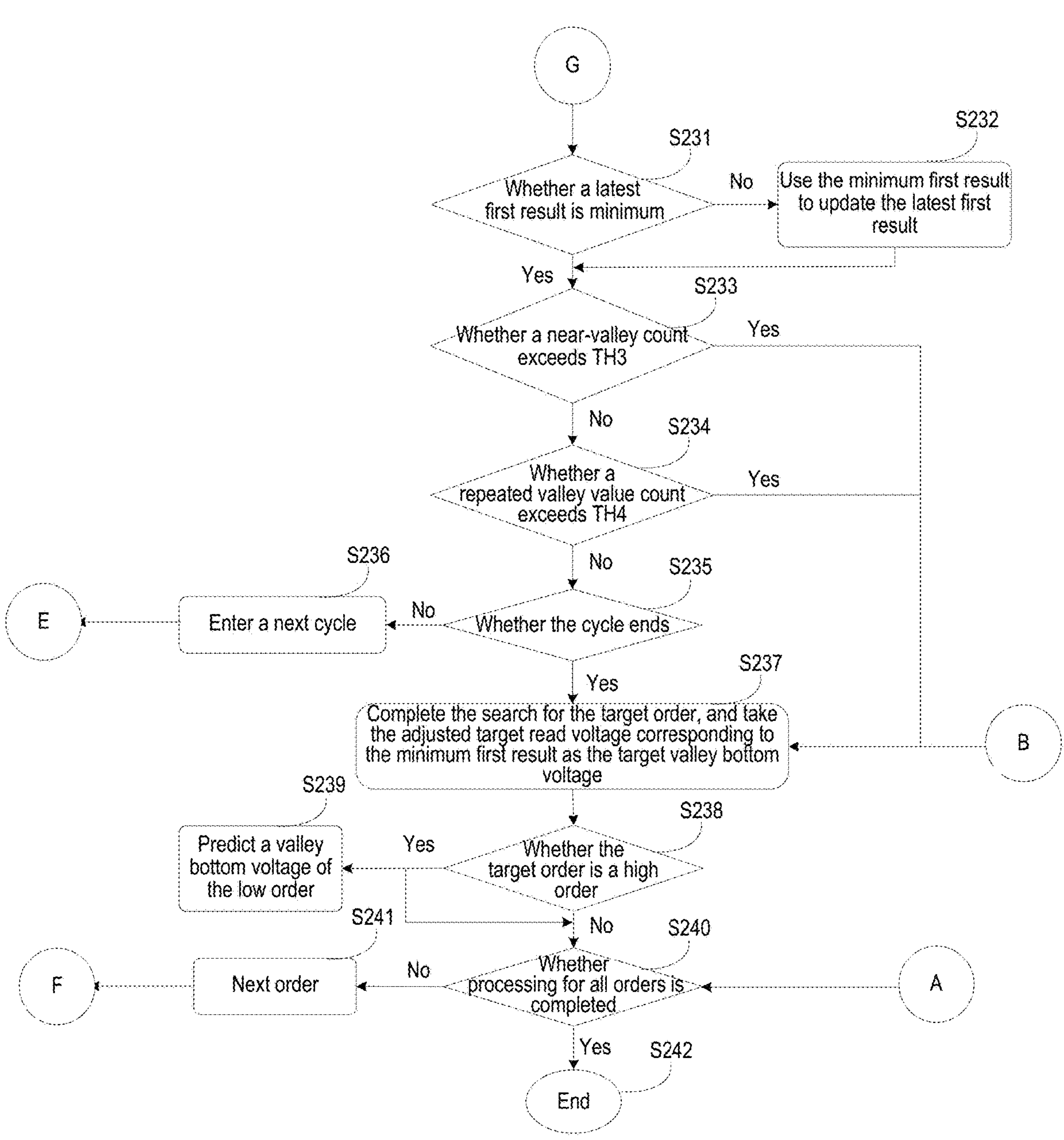

FIGS. 14A-14C are a flowchart of a method of operating a memory device according to an example of the present disclosure. A detailed process of determining the target valley bottom voltage will be described in detail below through FIGS. 14A-14C.

In operation S201, a program for acquiring the target valley bottom voltage is triggered, and a process of acquiring the target valley bottom voltage is started. Then operation S202 is performed.

In operation S202, In some examples, the read mode of the memory device is set to the Single Level Read (SLR) mode, where the single level read mode includes reading at least one bit of data stored in the memory cell with one order of read voltages. Then operation S203 is performed.

As set forth above, the memory cell has a plurality of memory bits, the plurality of memory bits correspond to a plurality of pages respectively, and at least one page corresponds to a plurality of orders. During determining of the target valley bottom voltages, the target valley bottom voltages for each of the at least one order of read voltages corresponding to each of the plurality of pages are determined sequentially. In operation S203, one order is selected from the plurality of orders corresponding to one page as the target order, and the target read voltage corresponding to the read voltage of the target order is determined first. In an example, taking TLC as an example, target valley bottom voltages of the first-level read voltage L1 and the fifth-level read voltage L5 corresponding to the lower page are determined first, and one of L1 or L5 may be selected as the target order. Operation S204 is performed after the target order is determined.

Operation S204 is mainly intended to determine a type of the target order. Here, the target order can be divided into two types, the first order (also referred to as the high order) and the second order (also referred to as the low order), where the read voltage of the first order is greater than the read voltage of the second order. In an example, still using the lower page of the TLC as an example, L5 is the first order, and L1 is the second order. If L1 is selected as the target order in operation S203, the target order is the second order, e.g., the low order; if L5 is selected as the target order in operation S204, the target order is the first order, e.g., the high order. If the target order is the low order, operation S204 is performed; if the target order is the high order, operation S207 is performed.

In operation S205, the predicted valley bottom voltage is acquired. Here, as for the predicted valley bottom voltage, the predicted valley bottom voltage corresponding to the low order is acquired according to the target valley bottom voltage corresponding to the high order and a related mapping function. Here and hereafter, the related mapping function may be obtained by fitting many experimental results before the memory device leaves the factory and stored in the memory device. Then operation S206 is performed.

In operation S206, determine whether two-step prediction succeeds. Here, the two-step prediction may include first-step prediction and second-step prediction. The first-step prediction is to acquire the predicted valley bottom voltage of the high order, and more specifically, to acquire the predicted valley bottom voltage of the high order according to the first result corresponding to the target read voltage (a default read voltage), an order of the high order, and a fourth mapping function. The second-step prediction is to acquire the predicted valley bottom voltage of the low order, and more specifically, to acquire the predicted valley bottom voltage of the low order according to the predicted valley bottom voltage of the high order as mentioned above, an order of the low order, and the third mapping function. Furthermore, the two-step prediction is followed by no confirmation of the predicted valley bottom voltage, and the predicted valley bottom voltage of the high order and the predicted valley bottom voltage of the low order are used directly to perform hard decoding. If the hard decoding succeeds, it indicates that the two-step prediction succeeds, in which case the search for the target valley bottom voltage is stopped directly and operation S245 is performed. If the hard decoding fails, it indicates that the two-step prediction fails, in which case the point corresponding to the predicted valley bottom voltage is used as the near-valley point for the subsequent iterations and operation S220 is continued. S220 will be detailed in the following description.

It is to be noted that if the hard decoding fails, it indicates that the two-step prediction does not succeed, in which case the target valley bottom voltage is required to be determined by means of searching, or referred to as a cycling (or iteration). Therefore, a cyclic process is entered when the two-step prediction does not succeed, so that when the two-step prediction does not succeed, a search process can be started directly from the beginning of the cycle, e.g., a move to operation S208 from operation S206; or the point corresponding to the predicted valley bottom voltage may be used directly as the near-valley point for the subsequent iterations, e.g., a move to operation S220 from operation S206 (S219).

If the target order is the high order, the target valley bottom voltage of the high order is determined by means of the searching or cycling. In operation S207, the default read voltage is taken as the target read voltage. Here, the target read voltage can be used as an initial value for subsequent searching or cycling. In some examples, the default read voltage may be a read voltage in the case where the threshold voltage of the memory cell has not been shifted, such as a read voltage corresponding to the time when the write operation has just been carried out, in which case a corresponding offset is 0 DAC. Operation S208 is performed after operation S207.

In operation S208, the target valley bottom voltage is determined by means of searching or cycling. Operation S209 is performed after operation S208.

A first time of performing the cyclic process in operation S209 is to acquire the first result corresponding to the target read voltage. It may be understood that subsequent times of performing the cyclic process in operation S209 are to acquire the first result corresponding to the adjusted target read voltage. Operation S210 is performed after operation S209.

In operation S210, each parameter is determined or adjusted according to the first result corresponding to the target read voltage, where each parameter here may include at least the first threshold, the first boundary voltage (a location corresponding to the first boundary voltage is referred to as the left boundary), and the second boundary voltage (a location corresponding to the second boundary voltage is referred to as the right boundary). It may be understood that during the read operation, the further the threshold voltage of the memory cell is offset from the threshold voltage at the time of writing, the larger the first result read using the initial target read voltage will be as well. On that basis, a specific value of the first result corresponding to the default target read voltage can be used to determine the first threshold, where the first threshold indicates a situation of a change (raise) of the valley bottom voltage due to the offset of the threshold voltage of the memory cell. Here, an initial first boundary voltage and an initial second boundary voltage may be set according to empirical values, among others. For example, the initial first boundary voltage and the initial second boundary voltage may be set within a relatively large range, and then the initial first boundary voltage and the initial second boundary voltage are adjusted according to the first result corresponding to the target read voltage, e.g., narrowing ranges of the first boundary voltage and the second boundary voltage to obtain the first boundary voltage and the second boundary voltages. Operation S211 is performed after operation S210.

It is to be noted that operation S210 is mainly for the first time of performing the cyclic process, and may be skipped for the subsequent times of performing the cyclic process.

A first time of performing the cyclic process in operation S211 is to determine whether the first result corresponding to the target read voltage is less than the first threshold. It may be understood that subsequent times of performing the cyclic process in operation S211 are to determine whether the first result corresponding to the adjusted target read voltage is less than the first threshold. When a determination result of operation S211 is a "yes," the first result corresponding to the adjusted target read voltage may be considered as being able to satisfy a requirement for read data decoding substantially. Then move to S242, the cycle ends, and a corresponding target valley bottom voltage is output. When a determination result of operation S211 is a "no," operation S212 of the cycle is continued.

Whether a target memory block is a non-full memory block is determined in operation S212. Here, the target memory block is a memory block where the at least one code word on which the read operation to be performed is located. The non-full memory block includes a memory block having two data states: a programmed state and an erased state. Operation S213 is performed when a determination result of operation S212 is a "yes;" and operation S214 is performed when a determination result of operation S212 is a "no."

It is to be noted that operation S212 is mainly for the first time of performing the cyclic process, and may be skipped for the subsequent times of performing the cyclic process. Operation S214 is continued after the above operation is skipped.

In operation S213, it is considered the fact that an offset of the threshold voltage of the memory cell in the non-full memory block is more complex, compared to an offset of the threshold voltage of the memory cell in a full memory block (the full memory block may be understood as a memory block in the same application scenario as the non-full memory block and having a difference in writing moments from the non-full memory block that is less than a preset duration). Compared to the full memory block, the offset of the threshold voltage of the memory cell in the non-full memory block is also related to a location of a first blank physical page (the first blank physical page may be understood as a first physical page having all the data states thereof being erased states in the non-full memory block, in an order of programming) in the non-full memory block and a location of a physical page to be read (a physical page where the at least one code word to be read is located). On that basis, the predicted valley bottom voltage may be acquired according to a first offset corresponding to the full memory block, a second offset corresponding to the location of the first blank physical page in the non-full memory block, and a third offset corresponding to the location of the physical page to be read, and then proceed to operation S214. It may be understood that the acquired predicted valley bottom voltage is more targeted compared to that obtained through the blind adjustments on the target read voltage, shortening a search duration to a certain extent and thereby determining the target valley bottom voltage more quickly.

Whether the inflection point is found is determined in operation S214. Here, a target read voltage after each adjustment is taken as a horizontal coordinate, the corresponding first result corresponding to the adjusted target read voltage is taken as an vertical coordinate, and the horizontal coordinate and the vertical coordinate form a point. During a plurality of adjustments on the target read voltage, a point corresponding to a first result being less than the near-valley threshold for the first time among the plurality of first results corresponding to the plurality of adjusted target read voltages may be taken as the near-valley point. The near-valley threshold is used to represent the maximum of the corresponding first results near the target valley bottom voltage. It is to be noted that there are differences between the near-valley threshold and the first threshold. When the first result is less than the near-valley threshold, it indicates that a finer search can be carried out subsequently; when the first result is less than the first threshold, it indicates that a stop of the search may be taken into consideration. Operation S219 is performed when a determination result of operation S214 is a "yes;" and operation S215 is performed when a determination result of operation S214 is a "no."

Operation S215 is performed when no near-valley point is found in operation S215, where a predicted read voltage after the next adjustment is acquired according to the first result corresponding to the target read voltage after the previous adjustment and a related mapping function (e.g., the above second mapping function). That is, a prediction iteration is performed using the above prediction formula or mapping function. Operation S216 is performed after operation S215.

Whether the acquired predicted read voltage after the next adjustment hits a boundary is determined in operation S216. The boundary here may be one of the above left boundary or right boundary, and hitting the boundary may be understood as being located right on or crossing the boundary. Operation S217 is performed when a determination result of operation S216 is a "yes;" and operation S218 is performed when a determination result of operation S216 is a "no."

An adjustment direction is changed in operation S217. Here, there are two adjustment directions during the adjustments on the target read voltage, e.g., a positive (rightward) direction and a negative (leftward) direction. An adjustment on an offset direction may be understood as changing a previous rightward adjustment into a leftward adjustment upon hitting the right boundary; alternatively, changing a previous leftward adjustment into a rightward adjustment upon hitting the left boundary. Operation S218 is performed after operation S217.

The first result corresponding to the adjusted target read voltage is acquired in operation S218. Operation S214 is performed after operation S218. That is, after each adjustment of the target voltage and acquisition of the corresponding first result, the determining is continued to determine whether a latest adjustment point is the near-valley point. Here, one or more adjustments are performed until the near-valley point is found.

It is to be noted that operations S215 to S218 may be skipped if the next cycle is entered because a subsequent condition is not met during operations after the near-valley point is found.

In operation S219, referring to the description of operation S206, the cyclic process may be entered when the two-step prediction does not succeed, so that when the two-step prediction does not succeed, the point corresponding to the predicted valley bottom voltage may be used directly as the near-valley point for the subsequent iterations, e.g., jump from operation S219 to S220.

Whether a predicted valley bottom voltage (the latest adjusted target read voltage) of a current point is effective is determined in operation S220. In some examples, the predicted valley bottom voltage may be determined to be effective if the first result corresponding to the latest adjusted target read voltage is less than the first threshold. It is to be noted that, operation S212 and subsequent operations are performed when the first result corresponding to the (adjusted) target read voltage is not less than the first threshold in operation S211; however, at least one adjustment on the target read voltage is carried out before the determination result of S214 is a "yes," so that there may be a situation that a newly adjusted target read voltage is less than the first threshold at this time. Operation S224 is performed when a determination result of operation S220 is a "yes;" and operation S221 is performed when a determination result of operation S220 is a no.

Whether a first result FBC of the current point is greater than FBC of a previous point is determined in operation S221. Here, during a leftward coarse search for the inflection point after finding the near-valley point, a general change in the magnitude of FBC is a decrease followed by an increase. When the first result FBC of the current point is larger than FBC of the previous point, it indicates that FBC further increases in a subsequent leftward adjustment, and that the previous point is a point with a smaller value, in which case the previous point is set as the inflection point. In some examples, a step used for the coarse search may be a larger step, which may include, for example, 5-15 DAC, and in particular, may include 5 DAC, 10 DAC, or 15 DAC. Operation S223 is performed when a determination result of operation S221 is a "yes;" and operation S222 is performed when a determination result of operation S221 is a "no."

In operation S222, the leftward coarse search is started from the near-valley point, and after each search, FBC is compared with that of a previous search, until a point where the decrease stops and the increase starts is found. Upon finding the point, it indicates that operation S222 is completed and moves to operation S223.

In operation S223, the previous point (e.g., the point where the decrease stops and the increase starts) is set as the inflection point, and a rightward fine search is performed starting from the inflection point. In some examples, a step used for the fine search may be a smaller step, which may include, for example, 1-4 DAC, and in particular, may include 2 DAC or 3 DAC. Operation S225 is performed after operation S223.

In operation S224, the current point is set as the inflection point, and the rightward fine search is performed starting from the inflection point. In some examples, a step used for the fine search may be referred to as that in operation S223. Operation S225 is performed after operation S224.

Whether to perform a leftward adjustment on the target read voltage is determined in operation S225. Operation S229 is performed when a determination result of operation S225 is a "yes;" and operation S226 is performed when a determination result of operation S225 is a "no."

In operation S226, a rightward adjustment on the target read voltage is performed, and during the rightward adjustment on the target read voltage, whether the right boundary is hit or whether a raise count (or referred to as a count of upward trends, where the count of upward trends is performed when the first result corresponding to the target read voltage after the next adjustment is greater than the first result corresponding to the target read voltage after the previous adjustment) exceeds the preset count TH2 is determined. In some examples, the preset count includes 3, 4, 5, 6, or 7, and in an example, the preset count may include 3, 5, or 7. Operation S228 is performed when a determination result of operation S226 is a "yes;" and operation S227 is performed when a determination result of operation S226 is a "no."

In operation S227, when the right boundary is not hit or the raise count does not exceed the preset count TH2, the search toward the right boundary is continued, and the determination is performed after each search, until the right boundary is hit or the raise count exceeds the preset count TH2. That is, the operations may move to operation S228 after operation S227.

A leftward adjustment on the target read voltage is started in operation S228.

In operation S229, during the leftward adjustment on the target read voltage, whether the left boundary is hit or a raise count exceeds the preset count is determined. The raise count here may be understood with reference to that in operation S226. The thresholds for the left and right raise count are set to the same value. Operation S231 is performed when a determination result of operation S229 is a "yes;" and operation S230 is performed when a determination result of operation S229 is a "no."

In operation S230, when the left boundary is not hit or the raise count does not exceed the preset count TH2, the search toward the left boundary is continued, and the determination is performed after each search, until the left boundary is hit or the raise count exceeds the preset count TH2. That is, the operations may move to operation S231 after operation S230.

Whether a latest first result is the minimum is determined in operation S231. Here, whether the latest first result is the minimum refers to whether the first result corresponding to the adjusted target read voltage after the last target read voltage adjustment is the minimum. At this time, traversal of at least all the points found in the current cycle is required to find the adjusted target read voltage corresponding to the point with the minimum first result. Operation S233 is performed when a determination result of operation S231 is a "yes;" and operation S232 is performed when a determination result of operation S231 is a "no."

The found minimum first result is used to update the latest first result in operation S232. Operation S233 is performed after operation S232.

Whether a near-valley count exceeds a preset count TH3 is determined in operation S233. Here, taking the minimum first result in a plurality of first results corresponding to target read voltages obtained after a plurality of adjustments as a reference value, when a number of first results, among the remaining plurality of first results, each having a difference from the reference value that is less than the second threshold (equivalent to the above preset difference) is greater than a preset number, the search is stopped, and the target read voltage corresponding to the minimum first result in the plurality of first results is used as the target valley bottom voltage. In some examples, the second threshold (equivalent to the above preset difference) and the preset number can be set jointly according to the actual situation. Typically, if the second threshold (equivalent to the above preset difference) is set to be larger, then the preset number is also larger; if the second threshold (equivalent to the above preset difference) is set to be smaller, then the preset number is also smaller. When a determination result of operation S233 is a "yes," the search is stopped and operation S237 is performed; and when a determination result of operation S233 is a "no," a determination for the next time and operation S234 is performed.

Whether a repeated valley value count exceeds a preset count TH4 is determined in operation S234. Here, during the plurality of adjustments on the target read voltage, different adjustment methods may be used to perform the adjustments. If more than a preset number of adjustment methods among the different adjustment methods correspond to the same adjusted target read voltage and the first result corresponding to this same target read voltage is the minimum among all the first results, the same target read voltage is taken as the target valley bottom voltage. In some examples, the preset count include 2-4, and in an example, the preset count may include 2, 3, or 4. When a determination result of operation S234 is a "yes," the search is stopped and operation S237 is performed; and when a determination result of operation S234 is a "no," a determination for the next time and operation S235 is performed.

It is to be noted that operations S233 and S234 belong to different determining methods, and are interchangeable in a positional relationship. That is, the determination of the repeated valley value count may be performed first, and the determination of the near-valley count is performed when the repeated valley value count does not satisfy the condition. It may be understood that other types of determining may be performed here to determine whether the cycle ends.

Whether the cycle ends is determined in operation S235. Operation S237 is performed when a determination result of operation S235 is a "yes;" and operation S236 is performed when a determination result of operation S235 is a "no."

A next cycle is entered in operation S236 to continue the search. Operation S236 may move to operation S209.

In operation S237, a search for the target order is completed, and the adjusted target read voltage corresponding to the minimum first result is taken as the target valley bottom voltage. Operation S238 is performed after operation S237.

Whether the target order is the high order is determined in operation S238. Operation S239 is performed when a determination result of operation S238 is a "yes;" and operation S240 is performed when a determination result of operation S238 is a "no."

In operation S239, the predicted valley bottom voltage of the low order is acquired according to the target valley bottom voltage of the high order. Here, the predicted valley bottom voltage of the low order may be acquired through the target valley bottom voltage of the high order, the order of the low order, and a related mapping function (e.g., the above third mapping function). Operation S240 is performed after operation S239.

Whether respective target valley bottom voltages corresponding to read voltages of all orders included in the page have been determined is determined in operation S240. When a determination result of operation S240 is a "yes," it indicates that the respective target valley bottom voltages corresponding to the read voltages of all the orders included in the page have been determined, in which case operation S242 may be performed. When a determination result of operation S240 is a "no," it indicates that there is an order in the page for which a target valley bottom voltage corresponding to the read voltage thereof has not been determined yet, in which case operation S241 is performed.

In operation S241, the target valley bottom voltage of each order for which the target valley bottom voltage has not been determined is determined sequentially. Operation S236 may move to operation S202.

In operation S242, the process of acquiring the target valley bottom voltage ends. It is to be noted that determination of target valley bottom voltages corresponding to read voltages of all orders of a next page may be started after operation S242.

It is to be noted that the methods disclosed in the examples of the present disclosure can solve many problems in the read-retry operation, but are not used to limit application scenarios in the examples of the present disclosure, and the methods disclosed in the examples of the present disclosure are also applicable to a conventional read operation.

It is to be noted that an executive body of a particular example process of each operation in FIGS. 13A and 13B and 14A-14C may be the peripheral circuit or the memory controller.

Figure 15:
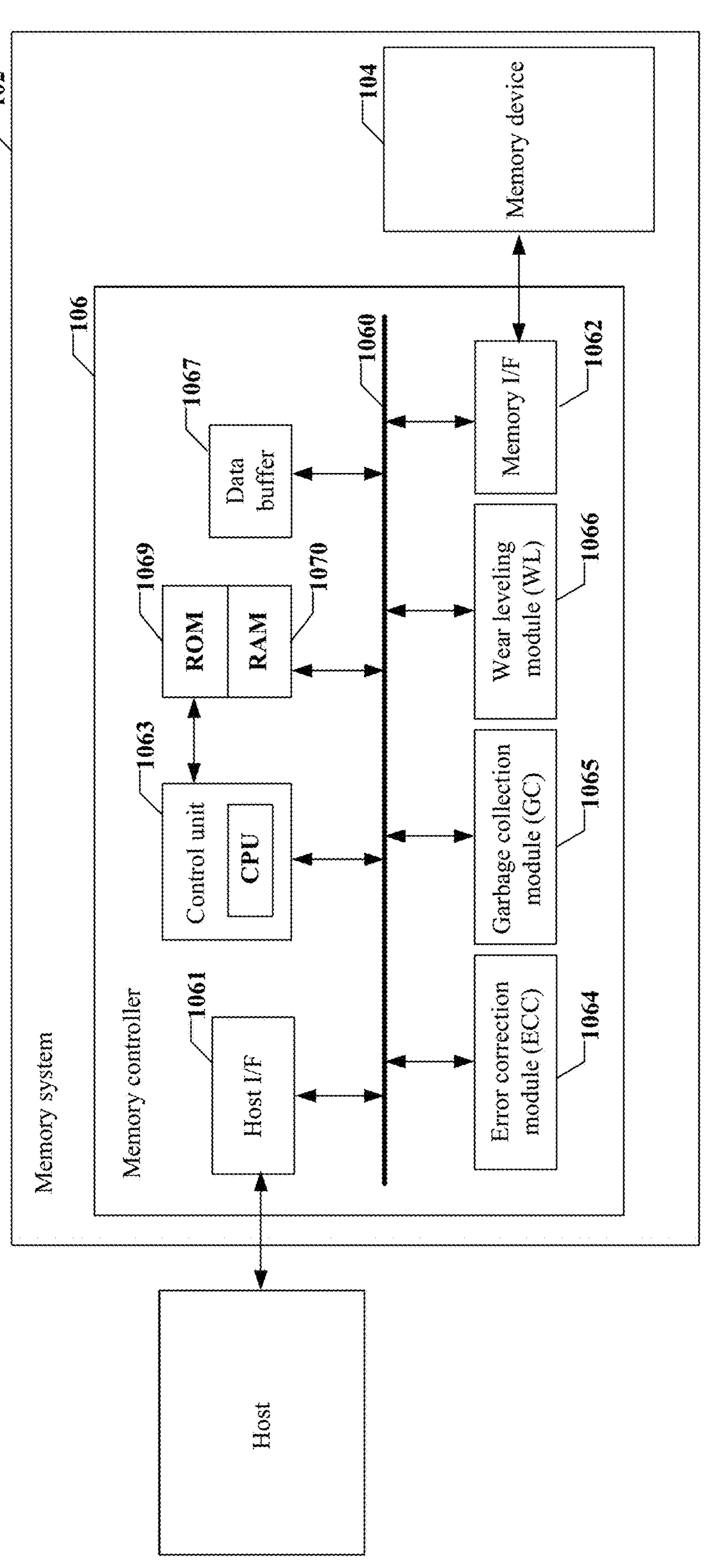
FIG. 15 is a schematic diagram of an example constituent structure having a memory system according to an example of the present disclosure.
Figure 16:
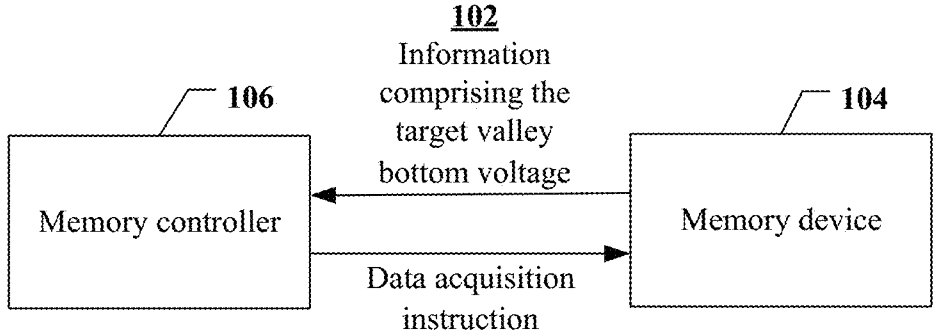
FIG. 16 is a block diagram of a memory system according to an example of the present disclosure.

In a second aspect, examples of the present disclosure provide a memory system. As shown in FIGS. 15 and 16, the memory system 102 includes: one or more memory devices 104 in the first aspect; and a memory controller 106 coupled with the memory devices 104 and configured to control the memory devices 104.

As shown in FIG. 15, In some examples, the memory system 102 is coupled with a host, and performs various types of feedback in response to instructions of the host. The memory system 102 may include the memory controller 106 and the memory devices 104. The memory controller 106 is configured to control the memory devices 104 to perform operations such as read, write, erase, etc. The memory controller 106 may also be coupled with the memory devices 104 in any appropriate methods.

The memory controller 106 may include a host interface (I/F) 1061, a memory interface (I/F) 1062, a control unit 1063, a Read-Only Memory (ROM) 1069, a Random Access Memory (RAM) 1070, an error correction module 1064, a garbage collection module 1065, a wear leveling module 1066, a data buffer 1067, and a bus 1060. The host interface 1061 is a connection interface that connects the host 108 and the memory controller 106. The host interface 1061 allows the host and the memory controller to communicate according to a specific protocol, send a read request and a write request, and perform other operations. The memory interface 1062 is a connection interface between the memory controller 106 and the memory device 104. The memory interface 1062 is configured to implement data transmission between the memory controller 106 and the memory device 104. The control unit 1063 is configured to control the memory system 102 integrally. The above particular operations performed by the memory controller are mainly performed and completed by the control unit 1063 here. In some specific examples, the control unit 1063 is, for example, a central processing unit (CPU), a microcontroller unit (MCU), etc. The ROM 1069 typically includes firmware or firmware program codes of the memory controller 106. These codes are used to initialize and operate various components of the memory controller, and the RAM 1070 is typically configured to buffer data. The error correction module 1064 may further include a coding unit and a decoding unit. The coding unit is used to code data to be stored to obtain check data; the decoding unit is used to decode the check data, to detect and correct possible error data during the data transmission.

The garbage collection module 1065 is configured to: after a storage space of the memory device reaches a certain threshold, read valid data from some memory blocks, rewrite and then label these memory blocks to obtain new spare memory blocks. A general example of garbage collection may include three operations: selecting a source memory block with a small amount of valid data; finding the valid data from the source memory block; and writing the valid data to a target memory block. In this case, all data in the source memory block becomes invalid data, and the source memory block is labeled and may be used as a new spare memory block. The wear leveling module 1066 is configured to keep wear (erase count) of all the memory blocks in the memory system leveled through data statistics and algorithms. A general example of wear leveling may include two operations: selecting a source memory block in which cold data is located; and reading valid data in the source memory block and writing the valid data to a memory block with a large erase count. In this case, the valid data in the source memory block becomes invalid data, and the source memory block is labeled. The buffer 1067 is configured to buffer data.

In some examples, the memory controller 106 is configured to: control the memory device 104 to perform a read operation on at least one code word.

In some examples, the memory device 104 includes: a memory cell array including a plurality of memory cells, a preset number of the memory cells forming a code word; and a peripheral circuit of the memory device 104, which is coupled with the memory cell array and configured to: perform M first adjustments on a target read voltage of at least one code word with a first step, and acquire M first results corresponding to M read voltages obtained after the M first adjustments respectively, where each of the first results indicates the number of flipped bits of the at least one code word in two read results corresponding to a first read voltage and a second read voltage, and a difference between the first read voltage and the second read voltage is less than a preset voltage; take the minimum first result in the M first results as an inflection point value, where a read voltage corresponding to the inflection point value is an inflection point voltage; perform N second adjustments on the inflection point voltage with a second step, and acquire N first results corresponding to N read voltages obtained after the N second adjustments respectively, where the second step is less than the first step; and determine a target valley bottom voltage according to the acquired N first results, where the target valley bottom voltage is taken as a read voltage for a read operation performed on the at least one code word, where M and N are both positive integers greater than 1.

In some examples, the peripheral circuit of the memory device 104 is configured to: before performing the M first adjustments on the target read voltage of the at least one code word with the first step, determine a near-valley threshold according to a first result corresponding to an initial target read voltage of the at least one code word, where the near-valley threshold indicates the maximum of the corresponding first results near the target valley bottom voltage; before performing the M first adjustments on the target read voltage of the at least one code word with the first step, perform a plurality of adjustments on the initial target read voltage, until a first result corresponding to an adjusted target read voltage is less than the near-valley threshold; and take the adjusted target read voltage corresponding to the first result less than the near-valley threshold as the target read voltage, and perform the M first adjustments on the target read voltage with the first step.

In some examples, the peripheral circuit of the memory device 104 is configured to: before performing the M first adjustments on the target read voltage of the at least one code word with the first step, during the plurality of adjustments on the initial target read voltage, when the first result corresponding to the adjusted target read voltage is greater than or equal to the near-valley threshold, acquire a target read voltage after a next adjustment based on a first result corresponding to a target read voltage after a previous adjustment; take the adjusted target read voltage corresponding to a first result being less than the near-valley point threshold for the first time among the plurality of first results corresponding to the adjusted target read voltages as a near-valley point voltage; and during the M first adjustments on the target read voltage with the first step, perform adjustments with the first step in two opposite directions respectively starting from the near-valley point voltage, until first results corresponding to adjusted read voltages in the two directions are both greater than the near-valley threshold.

In some examples, the peripheral circuit of the memory device 104 is configured to: during the M first adjustments on the near-valley point voltage with the first step, perform adjustments with the first step in a first direction starting from the near-valley point voltage, until a first result corresponding to an adjusted target read voltage in the first direction is greater than the near-valley threshold; and perform adjustments with the first step in a second direction opposite to the first direction starting from the near-valley point voltage, until a first result corresponding to an adjusted target read voltage in the second direction is greater than the near-valley threshold.

In some examples, the peripheral circuit of the memory device 104 is configured to: acquire the near-valley threshold according to the first result corresponding to the target read voltage and a first mapping function, where the first mapping function indicates a relationship between the near-valley threshold and the first result corresponding to the target read voltage; and acquire the target read voltage after the next adjustment according to the first result corresponding to the target read voltage after the previous adjustment and a second mapping function, where the second mapping function indicates a relationship between the first result corresponding to the target read voltage after the previous adjustment and a predicted read voltage after the next adjustment.

In some examples, the peripheral circuit of the memory device 104 is configured to: during the N second adjustments on the inflection point voltage with the second step, perform adjustments with the second step in two opposite directions respectively starting from the inflection point voltage; during adjustments in each direction, perform a count of upward trends when a first result corresponding to a target read voltage after a next adjustment is greater than a first result corresponding to a target read voltage after a previous adjustment, and determine a first boundary voltage and a second boundary voltage according to a total count is greater than or equal to a preset count; and during the adjustments in the two directions, if a first result corresponding to a target read voltage after one adjustment is lower than a preset threshold, or the minimum first result in a plurality of first results corresponding to target read voltages after a plurality of adjustments is taken as a reference value, when the number of first results, among the remaining plurality of first results, having a difference from the reference value that is less than a preset difference is greater than a preset number, stop the adjustments and take an adjusted target read voltage corresponding to the minimum first result in the plurality of first results as the target valley bottom voltage.

In some examples, the peripheral circuit of the memory device 104 is configured to: during the N second adjustments on the inflection point voltage with the second step, perform adjustments with the second step in a first direction starting from the inflection point voltage, until a total count of upward trends during the adjustments in the first direction is equal to the preset count; and perform adjustments with the second step in a second direction opposite to the first direction starting from the inflection point voltage, until a total count of upward trends during the adjustments in the second direction is equal to the preset count.

In some examples, the peripheral circuit of the memory device 104 is configured to: during the adjustments in the first direction, take an adjusted target read voltage corresponding to the case when the total count of upward trends is equal to the preset count as the first boundary voltage, and during the adjustments in the second direction, take an adjusted target read voltage corresponding to the case when the total count of upward trends is equal to the preset count as the second boundary voltage; during the adjustments in the two directions, if the first boundary voltage and the second boundary voltage are determined, acquire a first result corresponding to a read voltage of a last adjustment, where the read voltage of the last adjustment is an average of the first boundary voltage and the second boundary voltage; and take a read voltage corresponding to the minimum first result in a plurality of first results corresponding to all adjusted read voltages as the target valley bottom voltage.

In some examples, the memory cell array includes memory cells with a plurality of memory bits, the plurality of memory bits correspond to a plurality of pages respectively, and at least one of the pages corresponds to a plurality of orders; the peripheral circuit of the memory device 104 is configured to: after determining a target valley bottom voltage of the at least one code word at a target order, determine target valley bottom voltages of other orders in the plurality of orders than the target order, respectively.

In some examples, the plurality of orders include a first order and a second order, and a read voltage of the second order is less than a read voltage of the first order; the peripheral circuit of the memory device 104 is configured to: when an order corresponding to the determined target valley bottom voltage belongs to the first order, acquire at least one of a predicted valley bottom voltage of the second order in the plurality of orders or predicted valley bottom voltages of other first orders with lower read voltages according to the determined target valley bottom voltage.

In some examples, the peripheral circuit of the memory device 104 is configured to: read data stored in the at least one code word with the first read voltage to obtain a second result; perform a third adjustment on the first read voltage with a third step to obtain the second read voltage, and read data stored in the at least one code word with the second read voltage to obtain a third result; perform a logic operation on the second result and the third result to obtain a fourth result; and count the number of bits in the fourth result that indicate flips of the third result compared to the second result to obtain the first result.

In some examples, the peripheral circuit of the memory device 104 includes: a first latch configured to store the second result; a second latch configured to store the third result; and a third latch configured to store the fourth result.

In some examples, the memory controller 106 is configured to: send a data acquisition instruction, where the data acquisition instruction is to instruct acquisition of the target valley bottom voltage; the memory device 104 is configured to: receive the data acquisition instruction, acquire the target valley bottom voltage, and send information including the target valley bottom voltage to the memory controller 106; and the memory controller 106 is further configured to: perform a read operation on data stored in the memory device 104 according to the target valley bottom voltage in the information.

In some examples, the memory controller 106 is further configured to: perform an error correction code decoding operation on a read result of the read operation. In some examples, the error correction code decoding operation includes a hard decoding operation using a Low Density Parity Check Code (LDPC).

In some examples, the memory controller 106 is configured to: send a mode setting command, where the mode setting command is to instruct setting a read mode of the memory device to the single level read mode, where the single level read mode includes reading at least one bit of data stored in the memory cell with one level of read voltage. The memory device 104 is configured to: enter the single level read mode in response to the mode setting command, and acquire the first result of the at least one code word corresponding to the target read voltage in the single level read mode.

According to the second aspect, in each memory system provided by the examples of the present disclosure, transmitting the first result (the size of the first result may be a few bytes), rather than transmitting the at least one code word (for example, the size of the code word may be 4 KB), reduces the amount of transmitted data and reduces transmission time of an output port. The process of acquiring the first result converges inside the memory device, without occupying, for example, a space of the memory controller, and is less dependent on, for example, the memory controller. At the same time, in the examples of the present disclosure, during the adjustments, the coarse adjustment is followed by the fine adjustment, e.g., the large-step adjustment (first adjustment) is performed first, followed by the small-step adjustment (second adjustment). As such, over-adjustment can be avoided during the adjustments, thereby reducing the number of cyclic iterations and determining the target valley bottom voltage more quickly. Furthermore, in the examples of the present disclosure, during the small-step adjustment, the count of the upward trends compared to the previous adjustment is introduced, which can filter out a point with a downward trend compared to the previous adjustment, excluding the impact of a noisy point and thereby finding the valley bottom point more accurately.

In a third aspect, examples of the present disclosure provide a memory controller, coupled with at least one memory device, where the memory device includes a plurality of memory cells, a preset number of the memory cells form a code word, and the memory controller includes: a control unit configured to: perform M first adjustments on a target read voltage of at least one code word with a first step, and acquire M first results corresponding to M read voltages obtained after the M first adjustments respectively, where each of the first results indicates the number of flipped bits of the at least one code word in two read results corresponding to a first read voltage and a second read voltage, and a difference between the first read voltage and the second read voltage is less than a preset voltage; take the minimum first result in the M first results as an inflection point value, where a read voltage corresponding to the inflection point value is an inflection point voltage; perform N second adjustments on the inflection point voltage with a second step, and acquire N first results corresponding to N read voltages obtained after the N second adjustments respectively, where the second step is less than the first step; and determine a target valley bottom voltage according to the acquired N first results, where the target valley bottom voltage is taken as a read voltage for a read operation performed on the at least one code word, where M and N are both positive integers greater than 1.

In some examples, the control unit is configured to: before performing the M first adjustments on the target read voltage of the at least one code word with the first step, determine a near-valley threshold according to a first result corresponding to an initial target read voltage of the at least one code word, where the near-valley threshold indicates the maximum of the corresponding first results near the target valley bottom voltage; before performing the M first adjustments on the target read voltage of the at least one code word with the first step, perform a plurality of adjustments on the initial target read voltage, until a first result corresponding to an adjusted target read voltage is less than the near-valley threshold; and take the adjusted target read voltage corresponding to the first result less than the near-valley threshold as the target read voltage, and perform the M first adjustments on the target read voltage with the first step.

In some examples, the control unit is configured to: before performing the M first adjustments on the target read voltage of the at least one code word with the first step, during the plurality of adjustments on the initial target read voltage, when the first result corresponding to the adjusted target read voltage is greater than or equal to the near-valley threshold, acquire a target read voltage after a next adjustment based on a first result corresponding to a target read voltage after a previous adjustment; take the adjusted target read voltage corresponding to a first result being less than the near-valley point threshold for the first time among the plurality of first results corresponding to the adjusted target read voltages as a near-valley point voltage; and during the M first adjustments on the target read voltage with the first step, perform adjustments with the first step in two opposite directions respectively starting from the near-valley point voltage, until first results corresponding to adjusted read voltages in the two directions are both greater than the near-valley threshold.

In some examples, the control unit is configured to: during the M first adjustments on the near-valley point voltage with the first step, perform adjustments with the first step in a first direction starting from the near-valley point voltage, until a first result corresponding to an adjusted target read voltage in the first direction is greater than the near-valley threshold; and perform adjustments with the first step in a second direction opposite to the first direction starting from the near-valley point voltage, until a first result corresponding to an adjusted target read voltage in the second direction is greater than the near-valley threshold.

In some examples, the control unit is configured to: acquire the near-valley threshold according to the first result corresponding to the target read voltage and a first mapping function, where the first mapping function indicates a relationship between the near-valley threshold and the first result corresponding to the target read voltage; and acquire the target read voltage after the next adjustment according to the first result corresponding to the target read voltage after the previous adjustment and a second mapping function, where the second mapping function indicates a relationship between the first result corresponding to the target read voltage after the previous adjustment and a predicted read voltage after the next adjustment.

In some examples, the control unit is configured to: during the N second adjustments on the inflection point voltage with the second step, perform adjustments with the second step in two opposite directions respectively starting from the inflection point voltage; during adjustments in each direction, perform a count of upward trends when a first result corresponding to a target read voltage after a next adjustment is greater than a first result corresponding to a target read voltage after a previous adjustment, and determine a first boundary voltage and a second boundary voltage according to a total count is greater than or equal to a preset count; and during the adjustments in the two directions, if a first result corresponding to a target read voltage after one adjustment is lower than a preset threshold, or the minimum first result in a plurality of first results corresponding to target read voltages after a plurality of adjustments is taken as a reference value, when the number of first results, among the remaining plurality of first results, having a difference from the reference value that is less than a preset difference is greater than a preset number, stop the adjustments and take an adjusted target read voltage corresponding to the minimum first result in the plurality of first results as the target valley bottom voltage.

In some examples, the control unit is configured to: during the N second adjustments on the inflection point voltage with the second step, perform adjustments with the second step in a first direction starting from the inflection point voltage, until a total count of upward trends during the adjustments in the first direction is equal to the preset count; and perform adjustments with the second step in a second direction opposite to the first direction starting from the inflection point voltage, until a total count of upward trends during the adjustments in the second direction is equal to the preset count.

In some examples, the control unit is configured to: during the adjustments in the first direction, take an adjusted target read voltage corresponding to the case when the total count of upward trends is equal to the preset count as the first boundary voltage, and during the adjustments in the second direction, take an adjusted target read voltage corresponding to the case when the total count of upward trends is equal to the preset count as the second boundary voltage; during the adjustments in the two directions, if the first boundary voltage and the second boundary voltage are determined, acquire a first result corresponding to a read voltage of a last adjustment, where the read voltage of the last adjustment is an average of the first boundary voltage and the second boundary voltage; and take a read voltage corresponding to the minimum first result in a plurality of first results corresponding to all adjusted read voltages as the target valley bottom voltage.

In some examples, the memory cell array includes memory cells with a plurality of memory bits, the plurality of memory bits correspond to a plurality of pages respectively, and at least one of the pages corresponds to a plurality of orders, and the control unit is configured to: after determining a target valley bottom voltage of the at least one code word at a target order, determine target valley bottom voltages of other orders in the plurality of orders than the target order, respectively.

In some examples, the plurality of orders include a first order and a second order, and a read voltage of the second order is less than a read voltage of the first order, and the control unit is configured to: when an order corresponding to the determined target valley bottom voltage belongs to the first order, acquire at least one of a predicted valley bottom voltage of the second order in the plurality of orders or predicted valley bottom voltages of other first orders with lower read voltages according to the determined target valley bottom voltage.

Here, the control unit may be understood in connection with the control unit illustrated in FIG. 15. It is to be noted that in this example of the present disclosure, the executive body is changed from the above peripheral circuit into the control unit in the memory controller. That is, in this example of the present disclosure, at least one first result is acquired by the memory device; at the same time, the control unit performs analysis and processing using the at least one first result, and determines the target valley bottom voltage according to analysis and processing situations.

It is to be noted that an executive body of a particular example process in FIGS. 13A and 13B and 14A-14C may be the control unit in the memory controller.

According to the third aspect, in the memory controller provided by the examples of the present disclosure, transmitting the first result (the size of the first result may be a few bytes), rather than transmitting the at least one code word (for example, the size of the code word may be 4 KB), reduces the amount of transmitted data and reduces transmission time of an output port. The process of acquiring the first result converges inside the memory device, without occupying, for example, a space of the memory controller, and is less dependent on, for example, the memory controller. At the same time, in the examples of the present disclosure, during the adjustments, the coarse adjustment is followed by the fine adjustment, e.g., the large-step adjustment (first adjustment) is performed first, followed by the small-step adjustment (second adjustment). As such, over-adjustment can be avoided during the adjustments, thereby reducing the number of cyclic iterations and determining the target valley bottom voltage more quickly. Furthermore, in the examples of the present disclosure, during the small-step adjustment, the count of the upward trends compared to the previous adjustment is introduced, which can filter out a point with a downward trend compared to the previous adjustment, excluding the impact of a noisy point and thereby finding the valley bottom point more accurately.

In a fourth aspect, examples of the present disclosure provide a method of operating a memory device, including: performing M first adjustments on a target read voltage of at least one code word with a first step, and acquiring M first results corresponding to M read voltages obtained after the M first adjustments respectively, where each of the first results indicates the number of flipped bits of a code word in two read results corresponding to a first read voltage and a second read voltage, and a difference between the first read voltage and the second read voltage is less than a preset voltage, where the code word is formed by a preset number of memory cells in at least one memory device; taking the minimum first result in the M first results as an inflection point value, where a read voltage corresponding to the inflection point value is an inflection point voltage; performing N second adjustments on the inflection point voltage with a second step, and acquiring N first results corresponding to N read voltages obtained after the N second adjustments respectively, where the second step is less than the first step; and determining a target valley bottom voltage according to the acquired N first results, where the target valley bottom voltage is taken as a read voltage for a read operation performed on the at least one code word, where M and N are both positive integers greater than 1.

In some examples, the operation method of the memory device includes: before performing the M first adjustments on the target read voltage of the at least one code word with the first step, determining a near-valley threshold according to a first result corresponding to an initial target read voltage of the at least one code word, where the near-valley threshold indicates the maximum of the corresponding first results near the target valley bottom voltage; before performing the M first adjustments on the target read voltage of the at least one code word with the first step, performing a plurality of adjustments on the initial target read voltage, until a first result corresponding to an adjusted target read voltage is less than the near-valley threshold; and taking the adjusted target read voltage corresponding to the first result less than the near-valley threshold as the target read voltage, and performing the M first adjustments on the target read voltage with the first step.

In some examples, the operation method of the memory device includes: before performing the M first adjustments on the target read voltage of the at least one code word with the first step, during the plurality of adjustments on the initial target read voltage, when the first result corresponding to the adjusted target read voltage is greater than or equal to the near-valley threshold, acquiring a target read voltage after a next adjustment based on a first result corresponding to a target read voltage after a previous adjustment; taking the adjusted target read voltage corresponding to a first result being less than the near-valley point threshold for the first time among the plurality of first results corresponding to the adjusted target read voltages as a near-valley point voltage; and during the M first adjustments on the target read voltage with the first step, performing adjustments with the first step in two opposite directions respectively starting from the near-valley point voltage, until first results corresponding to adjusted read voltages in the two directions are both greater than the near-valley threshold.

In some examples, the operation method of the memory device includes: during the M first adjustments on the near-valley point voltage with the first step, performing adjustments with the first step in a first direction starting from the near-valley point voltage, until a first result corresponding to an adjusted target read voltage in the first direction is greater than the near-valley threshold; and performing adjustments with the first step in a second direction opposite to the first direction starting from the near-valley point voltage, until a first result corresponding to an adjusted target read voltage in the second direction is greater than the near-valley threshold.

In some examples, the operation method of the memory device includes: acquiring the near-valley threshold according to the first result corresponding to the target read voltage and a first mapping function, where the first mapping function indicates a relationship between the near-valley threshold and the first result corresponding to the target read voltage; and acquiring the target read voltage after the next adjustment according to the first result corresponding to the target read voltage after the previous adjustment and a second mapping function, where the second mapping function indicates a relationship between the first result corresponding to the target read voltage after the previous adjustment and a predicted read voltage after the next adjustment.

In some examples, the operation method of the memory device includes: during the N second adjustments on the inflection point voltage with the second step, performing adjustments with the second step in two opposite directions respectively starting from the inflection point voltage; during adjustments in each direction, performing a count of upward trends when a first result corresponding to a target read voltage after a next adjustment is greater than a first result corresponding to a target read voltage after a previous adjustment, and determining a first boundary voltage and a second boundary voltage according to a total count is greater than or equal to a preset count; and during the adjustments in the two directions, if a first result corresponding to a target read voltage after one adjustment is lower than a preset threshold, or the minimum first result in a plurality of first results corresponding to target read voltages after a plurality of adjustments is taken as a reference value, when the number of first results, among the remaining plurality of first results, having a difference from the reference value that is less than a preset difference is greater than a preset number, stopping the adjustments and taking an adjusted target read voltage corresponding to the minimum first result in the plurality of first results as the target valley bottom voltage.

In some examples, the operation method of the memory device includes: during the N second adjustments on the inflection point voltage with the second step, performing adjustments with the second step in a first direction starting from the inflection point voltage, until a total count of upward trends during the adjustments in the first direction is equal to the preset count; and performing adjustments with the second step in a second direction opposite to the first direction starting from the inflection point voltage, until a total count of upward trends during the adjustments in the second direction is equal to the preset count.

In some examples, the operation method of the memory device includes: during the adjustments in the first direction, taking an adjusted target read voltage corresponding to the case when the total count of upward trends is equal to the preset count as the first boundary voltage, and during the adjustments in the second direction, taking an adjusted target read voltage corresponding to the case when the total count of upward trends is equal to the preset count as the second boundary voltage; during the adjustments in the two directions, if the first boundary voltage and the second boundary voltage are determined, acquiring a first result corresponding to a read voltage of a last adjustment, where the read voltage of the last adjustment is an average of the first boundary voltage and the second boundary voltage; and taking a read voltage corresponding to the minimum first result in a plurality of first results corresponding to all adjusted read voltages as the target valley bottom voltage.

In some examples, the memory cell array includes memory cells with a plurality of memory bits, the plurality of memory bits correspond to a plurality of pages respectively, and at least one of the pages corresponds to a plurality of orders; the operation method of the memory device includes: after determining a target valley bottom voltage of the at least one code word at a target order, determining target valley bottom voltages of other orders in the plurality of orders than the target order, respectively.

In some examples, the plurality of orders include a first order and a second order, and a read voltage of the second order is less than a read voltage of the first order; the operation method of the memory device includes: when an order corresponding to the determined target valley bottom voltage belongs to the first order, acquiring at least one of a predicted valley bottom voltage of the second order in the plurality of orders or predicted valley bottom voltages of other first orders with lower read voltages according to the determined target valley bottom voltage.

In some examples, the operation method of the memory device includes: reading data stored in the at least one code word with the first read voltage to obtain a second result; performing a third adjustment on the first read voltage with a third step to obtain the second read voltage, and reading data stored in the at least one code word with the second read voltage to obtain a third result; performing a logic operation on the second result and the third result to obtain a fourth result; and counting the number of bits in the fourth result that indicate flips of the third result compared to the second result to obtain the first result.

In some examples, the operation method of the memory device includes: a first latch configured to store the second result; a second latch configured to store the third result; and a third latch configured to store the fourth result.

In a fifth aspect, examples of the present disclosure provide a method of operating a memory system, including: sending, by a memory controller in the memory system, a data acquisition instruction, where the data acquisition instruction is to instruct acquisition of a target valley bottom voltage; receiving, by a memory device in the memory system, the data acquisition instruction, acquiring the target valley bottom voltage according to the operation method of the memory device in the fourth aspect, and sending information including the target valley bottom voltage to the memory controller; and performing, by the memory controller, a read operation on data stored in the memory device according to the target valley bottom voltage in the information.

In some examples, the memory device in the memory system includes: a memory cell array including a plurality of memory cells, a preset number of the memory cells forming a code word. The operation method of the memory system includes: performing M first adjustments on a target read voltage of at least one code word with a first step, and acquiring M first results corresponding to M read voltages obtained after the M first adjustments respectively, where each of the first results indicates the number of flipped bits of the at least one code word in two read results corresponding to a first read voltage and a second read voltage, and a difference between the first read voltage and the second read voltage is less than a preset voltage; taking the minimum first result in the M first results as an inflection point value, where a read voltage corresponding to the inflection point value is an inflection point voltage; performing N second adjustments on the inflection point voltage with a second step, and acquiring N first results corresponding to N read voltages obtained after the N second adjustments respectively, where the second step is less than the first step; and determining a target valley bottom voltage according to the acquired N first results, where the target valley bottom voltage is taken as a read voltage for a read operation performed on the at least one code word, where M and N are both positive integers greater than 1.

In a sixth aspect, examples of the present disclosure provide a method of operating a memory controller, including: performing M first adjustments on a target read voltage of at least one code word with a first step, and acquiring M first results corresponding to M read voltages obtained after the M first adjustments respectively, where each of the first results indicates the number of flipped bits of a code word in two read results corresponding to a first read voltage and a second read voltage, and a difference between the first read voltage and the second read voltage is less than a preset voltage, where the code word is formed by a preset number of memory cells in at least one memory device; taking the minimum first result in the M first results as an inflection point value, where a read voltage corresponding to the inflection point value is an inflection point voltage; performing N second adjustments on the inflection point voltage with a second step, and acquiring N first results corresponding to N read voltages obtained after the N second adjustments respectively, where the second step is less than the first step; and determining a target valley bottom voltage according to the acquired N first results, where the target valley bottom voltage is taken as a read voltage for a read operation performed on the at least one code word, where M and N are both positive integers greater than 1.

In some examples, the operation method of the memory controller includes: before performing the M first adjustments on the target read voltage of the at least one code word with the first step, determining a near-valley threshold according to a first result corresponding to an initial target read voltage of the at least one code word, where the near-valley threshold indicates the maximum of the corresponding first results near the target valley bottom voltage; before performing the M first adjustments on the target read voltage of the at least one code word with the first step, performing a plurality of adjustments on the initial target read voltage, until a first result corresponding to an adjusted target read voltage is less than the near-valley threshold; and taking the adjusted target read voltage corresponding to the first result less than the near-valley threshold as the target read voltage, and performing the M first adjustments on the target read voltage with the first step.

In some examples, the operation method of the memory controller includes: before performing the M first adjustments on the target read voltage of the at least one code word with the first step, during the plurality of adjustments on the initial target read voltage, when the first result corresponding to the adjusted target read voltage is greater than or equal to the near-valley threshold, acquiring a target read voltage after a next adjustment based on a first result corresponding to a target read voltage after a previous adjustment; taking the adjusted target read voltage corresponding to a first result being less than the near-valley point threshold for the first time among the plurality of first results corresponding to the adjusted target read voltages as a near-valley point voltage; and during the M first adjustments on the target read voltage with the first step, performing adjustments with the first step in two opposite directions respectively starting from the near-valley point voltage, until first results corresponding to adjusted read voltages in the two directions are both greater than the near-valley threshold.

In some examples, the operation method of the memory controller includes: during the M first adjustments on the near-valley point voltage with the first step, performing adjustments with the first step in a first direction starting from the near-valley point voltage, until a first result corresponding to an adjusted target read voltage in the first direction is greater than the near-valley threshold; and performing adjustments with the first step in a second direction opposite to the first direction starting from the near-valley point voltage, until a first result corresponding to an adjusted target read voltage in the second direction is greater than the near-valley threshold.

In some examples, the operation method of the memory controller includes: acquiring the near-valley threshold according to the first result corresponding to the target read voltage and a first mapping function, where the first mapping function indicates a relationship between the near-valley threshold and the first result corresponding to the target read voltage; and acquiring the target read voltage after the next adjustment according to the first result corresponding to the target read voltage after the previous adjustment and a second mapping function, where the second mapping function indicates a relationship between the first result corresponding to the target read voltage after the previous adjustment and a predicted read voltage after the next adjustment.

In some examples, the operation method of the memory controller includes: during the N second adjustments on the inflection point voltage with the second step, performing adjustments with the second step in two opposite directions respectively starting from the inflection point voltage; during adjustments in each direction, performing a count of upward trends when a first result corresponding to a target read voltage after a next adjustment is greater than a first result corresponding to a target read voltage after a previous adjustment, and determining a first boundary voltage and a second boundary voltage according to a total count is greater than or equal to a preset count; and during the adjustments in the two directions, if a first result corresponding to a target read voltage after one adjustment is lower than a preset threshold, or the minimum first result in a plurality of first results corresponding to target read voltages after a plurality of adjustments is taken as a reference value, when the number of first results, among the remaining plurality of first results, having a difference from the reference value that is less than a preset difference is greater than a preset number, stopping the adjustments and taking an adjusted target read voltage corresponding to the minimum first result in the plurality of first results as the target valley bottom voltage.

In some examples, the operation method of the memory controller includes: during the N second adjustments on the inflection point voltage with the second step, performing adjustments with the second step in a first direction starting from the inflection point voltage, until a total count of upward trends during the adjustments in the first direction is equal to the preset count; and performing adjustments with the second step in a second direction opposite to the first direction starting from the inflection point voltage, until a total count of upward trends during the adjustments in the second direction is equal to the preset count.

In some examples, the operation method of the memory controller includes: during the adjustments in the first direction, taking an adjusted target read voltage corresponding to the case when the total count of upward trends is equal to the preset count as the first boundary voltage, and during the adjustments in the second direction, taking an adjusted target read voltage corresponding to the case when the total count of upward trends is equal to the preset count as the second boundary voltage; during the adjustments in the two directions, if the first boundary voltage and the second boundary voltage are determined, acquiring a first result corresponding to a read voltage of a last adjustment, where the read voltage of the last adjustment is an average of the first boundary voltage and the second boundary voltage; and taking a read voltage corresponding to the minimum first result in a plurality of first results corresponding to all adjusted read voltages as the target valley bottom voltage.

In some examples, the memory cell array includes memory cells with a plurality of memory bits, the plurality of memory bits correspond to a plurality of pages respectively, and at least one of the pages corresponds to a plurality of orders; the operation method of the memory controller includes: after determining a target valley bottom voltage of the at least one code word at a target order, determining target valley bottom voltages of other orders in the plurality of orders than the target order, respectively.

In some examples, the plurality of orders include a first order and a second order, and a read voltage of the second order is less than a read voltage of the first order; the operation method of the memory controller includes: when an order corresponding to the determined target valley bottom voltage belongs to the first order, acquiring at least one of a predicted valley bottom voltage of the second order in the plurality of orders or predicted valley bottom voltages of other first orders with lower read voltages according to the determined target valley bottom voltage.

Figure 17:
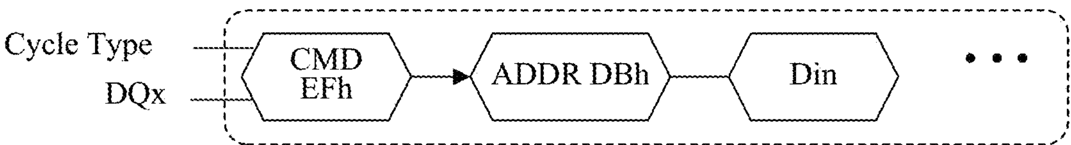
FIG. 17 is a timing diagram of an example start-up single level read mode operation according to the present disclosure.

FIG. 17 is a timing diagram of an example start-up single level read mode operation according to the present disclosure. DQx may represent a data bus signal, and Cycle Type may represent a type of the data bus signal.

As shown in FIG. 17, a function setup command may include, for example, a subcommand (e.g., EFh). In an example, the memory device initiates the single level read mode upon receiving the subcommand EFh. In the single level read mode, the memory device transmits addresses ADDR (e.g., two column addresses C1-C2 and three row addresses R1-R3) of data to be read between received subcommands 00h and 30h. During read time, the corresponding data DATA (e.g., Dn) in a page of the received addresses can be buffered in the page buffer, and then the data DATA is read as required. It is to be noted that in the above examples, frequent transmission (Din/Dout) of data (e.g., Dn) corresponding to one physical page between the memory device and the memory controller is required during the read-retry operation, and thus the transmission of the data takes a long time.

Figure 18:
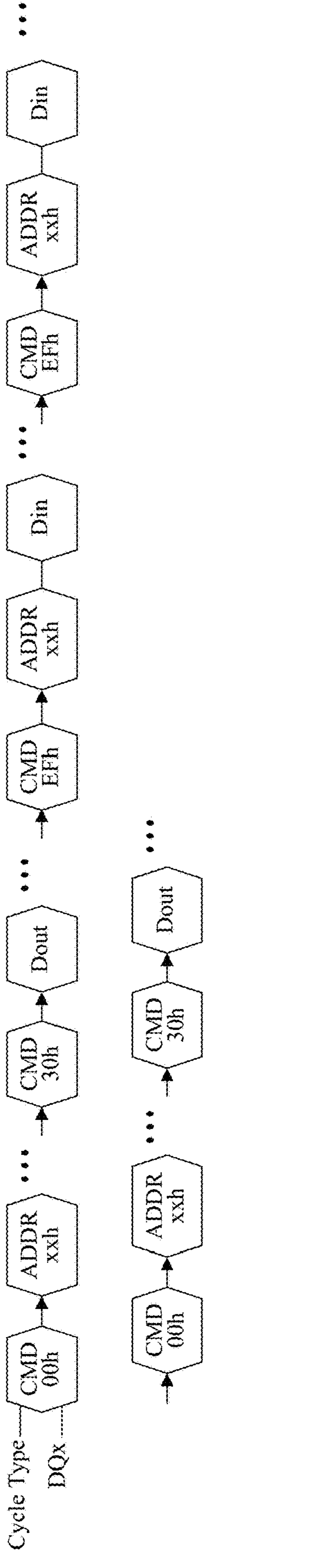
FIG. 18 is a timing diagram of target valley bottom voltage determination and read operation execution according to an example of the present disclosure.

FIG. 18 is a timing diagram of target valley bottom voltage determination and read operation execution according to an example of the present disclosure. As shown in FIG. 18, the read command may include, for example, two subcommands (e.g., 00h and 30h). In an example, the memory device transmits addresses ADDR (e.g., two column addresses C1-C2 and three row addresses R1-R3) of data to be read between the received subcommands 00h and 30h. After receiving the subcommand 30h, during read time, the memory device may buffer corresponding data DATA (e.g., Dn) in a page of the received addresses in the page buffer, and then read the data DATA as required.

In an example, the memory device 104 transmits addresses ADDR (e.g., two column addresses C1-C2 and three row addresses R1-R3) of data to be read between the received subcommands 00h and 30h. After receiving the subcommand 30h, the memory device 104 receives subcommands EFh and xxh of the data acquisition instruction, and the memory device 104 acquires the first result of the code word corresponding to the respective read voltage upon instruction of the data acquisition instruction, and sends the acquired first result to the memory controller. The memory controller determines the target valley bottom voltage according to the plurality of first results corresponding to the plurality of different read voltages respectively received from the memory device, and performs the read operation on the data stored in the memory device according to the target valley bottom voltage.

It is to be noted that the data acquisition instruction provided in the examples of the present disclosure is merely an example and does not unduly limit the protection scope of the present disclosure.

In some examples, a data amount of the first result is less than a preset data amount threshold. For example, the data amount of the first result ranges from 1 byte to 4 bytes, so that during determination of the target valley bottom voltage, data is transmitted between the memory device and the memory controller with a small amount and a fast speed, which is favorable to improvement of an overall speed of the read operation.

Examples of the present disclosure also provide a storage medium storing thereon executable instructions that, when executed, can implement operations of the operation method described in the above examples of the present disclosure.

In some examples, the storage medium may be memories such as Ferromagnetic Random Access Memory (FRAM), Read Only Memory (ROM), or Programmable Read-Only Memory (PROM), Erasable Programmable Read-Only Memory (EPROM), Electrically Erasable Programmable Read-Only Memory (EEPROM), Flash Memory, magnetic surface memory, optical disc, or Compact Disc Read-Only Memory (CD-ROM); alternatively, it may be various devices including one of the above memory devices or any combination thereof.

In some examples, executable instructions may in the form of a program, software, software module, script, or code, written in any form of programming language, including compiled or interpreted languages, or declarative or procedural languages, and may be deployed in any form, including deployed as a stand-alone program or deployed as a module, component, subroutine, or other means suitable for use in a computing environment.

As an example, executable instructions may, but do not necessarily correspond to, files in a file system and may be stored as part of a file holding other programs or data, for example, stored in one or more scripts in a Hyper Text Markup Language (HTML) document, stored in a single file that is specific to the program in question, or, stored in multiple collaborative files (for example, a file that stores one or more modules, subroutines, or portions of code).

As an example, the executable instruction may be deployed on an electronic apparatus for execution, or on a plurality of electronic apparatuses at one site for execution, or distributed on a plurality of electronic apparatuses interconnected through a communication network at a plurality of sites for execution.

Figure 19:
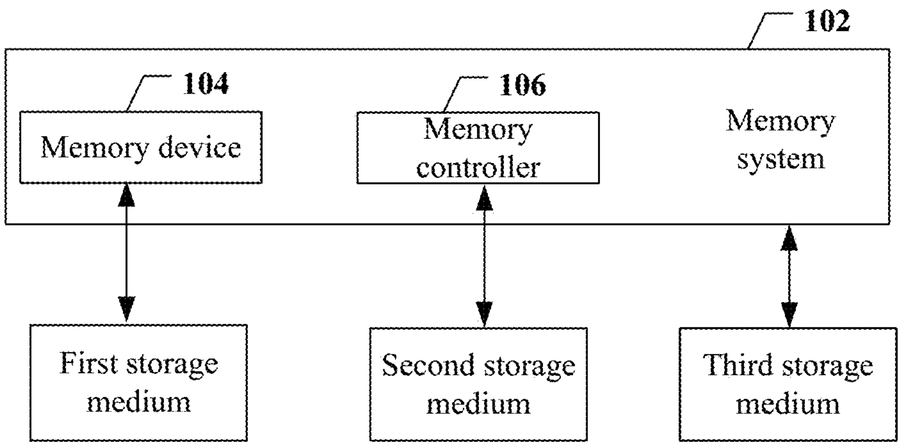
FIG. 19 is a schematic diagram of a constituent structure of a storage medium according to an example of the present disclosure.

In some examples, referring to FIG. 19, FIG. 19 is a schematic diagram of a constituent structure of a storage medium according to examples of the present disclosure. The storage medium includes a first storage medium corresponding to the memory device 104, a second storage medium corresponding to the memory controller 106, and a third storage medium corresponding to the memory system 102. When the executable instructions are executed by the memory device, the first storage medium may be used to implement operations of the operation method of the memory device in the above examples of the present disclosure. When the executable instructions are executed by the memory controller, the second storage medium may be used to implement operations of the operation method of the memory controller in the above examples of the present disclosure. When the executable instructions are executed by the memory system, the third storage medium may be used to implement operations of the operation method of the memory system in the above examples of the present disclosure.

It should be understood that references to "one example" or "an example" throughout this specification mean that particular features, structures, or characteristics related to the example are included in at least one example of the present disclosure. Therefore, "in one example" or "in an example" presented throughout this specification does not necessarily refer to the same example. Furthermore, these particular features, structures, or characteristics may be incorporated in one or more examples in any suitable manner. It is to be understood that, in various examples of the present disclosure, sequence numbers of the above processes do not indicate an execution order, and an execution order of various processes shall be determined by functionalities and intrinsic logics thereof, and shall constitute no limitation on an implementation process of the examples of the present disclosure. The above sequence numbers of the examples of the present disclosure are only for description, and do not represent advantages or disadvantages of the examples.

The above descriptions are merely examples of the present disclosure, and not intended to limit the patent scope of the present disclosure. Equivalent structure transformation made using the contents of the specification and the drawings of the present disclosure under the inventive concept of the present disclosure, or direct/indirect application to other related technical fields are both encompassed within the patent protection scope of the present disclosure.

What is claimed is:

1. A memory device, comprising:

a memory cell array comprising a plurality of memory cells, wherein a preset number of the memory cells form a respective code word, the plurality of memory cells corresponding to one or more code words; and a peripheral circuit coupled with the memory cell array and configured to:

perform M first adjustments on a target read voltage of at least one of the one or more code words with a first step, and acquire M first results corresponding to M read voltages obtained after the M first adjustments respectively, wherein each of the M first results indicates a number of flipped bits of the at least one of the one or more code words in two read results corresponding to a first read voltage and a second read voltage, and a difference between the first read voltage and the second read voltage is less than a preset voltage;

take a minimum first result in the M first results as an inflection point value, wherein a read voltage corresponding to the inflection point value is an inflection point voltage;

perform N second adjustments on the inflection point voltage with a second step, and acquire N first results corresponding to N read voltages obtained after the N second adjustments respectively, wherein the second step is less than the first step, and the N first results are acquired independently of the M first results; and determine a target valley bottom voltage according to the acquired N first results, wherein the target valley bottom voltage is taken as a read voltage for a read operation performed on the at least one of the one or more code words, wherein M and N are both positive integers greater than 1.

2. The memory device of claim 1, wherein the peripheral circuit is configured to:

before performing the M first adjustments on the target read voltage of the at least one of the one or more code words with the first step, determine a near-valley threshold according to a first result corresponding to the at least one of the code words at an initial target read voltage, wherein the near-valley threshold indicates a maximum first result near the target valley bottom voltage;

before performing the M first adjustments on the target read voltage of the at least one of the one or more code words with the first step, perform a plurality of adjustments on the initial target read voltage to obtain adjusted target read voltages each corresponding to a first result, until a first result of the first results corresponding to an adjusted target read voltage is less than the near-valley threshold; and take the adjusted target read voltage corresponding to the first result less than the near-valley threshold as the target read voltage, and perform the M first adjustments on the target read voltage with the first step.

3. The memory device of claim 2, wherein the peripheral circuit is configured to:

before performing the M first adjustments on the target read voltage of the at least one of the one or more code words with the first step, during the plurality of adjustments on the initial target read voltage, when the first result corresponding to the adjusted target read voltage is greater than or equal to the near-valley threshold, acquire the target read voltage after a next adjustment based on a first result corresponding to the target read voltage after a previous adjustment;

take the adjusted target read voltage corresponding to a first result being less than the near-valley threshold for a first time among a plurality of first results corresponding to the adjusted target read voltages as a near-valley point voltage; and during the M first adjustments on the target read voltage with the first step, perform adjustments with the first step in two opposite directions respectively starting from the near-valley point voltage, until first results corresponding to adjusted read voltages in the two opposite directions are both greater than the near-valley threshold.

4. The memory device of claim 3, wherein the peripheral circuit is configured to:

during the M first adjustments on the near-valley point voltage with the first step, perform adjustments with the first step in a first direction starting from the near-valley point voltage, until a first result corresponding to an adjusted target read voltage in the first direction is greater than the near-valley threshold; and perform adjustments with the first step in a second direction opposite to the first direction starting from the near-valley point voltage, until a first result corresponding to an adjusted target read voltage in the second direction is greater than the near-valley threshold.

5. The memory device of claim 3, wherein the peripheral circuit is configured to:

acquire the near-valley threshold according to the first result corresponding to the target read voltage and a first mapping function, wherein the first mapping function indicates a relationship between the near-valley threshold and the first result corresponding to the target read voltage; and acquire the target read voltage after the next adjustment according to the first result corresponding to the target read voltage after the previous adjustment and a second mapping function, wherein the second mapping function indicates a relationship between the first result corresponding to the target read voltage after the previous adjustment and a predicted read voltage after the next adjustment.

6. The memory device of claim 1, wherein the peripheral circuit is configured to:

during the N second adjustments on the inflection point voltage with the second step, perform adjustments with the second step in two opposite directions respectively starting from the inflection point voltage;

during the adjustments in each direction, perform a count of upward trends when a first result corresponding to the target read voltage after a next adjustment is greater than a first result corresponding to the target read voltage after a previous adjustment, and determine a first boundary voltage and a second boundary voltage according to a total count being greater than or equal to a preset count; and during the adjustments in the two opposite directions, when a first result corresponding to the target read voltage after one adjustment is lower than a preset threshold, or a minimum first result in a plurality of first results corresponding to target read voltages after a plurality of adjustments is taken as a reference value, and when a number of first results, among a remaining plurality of first results, having a difference from the reference value that is less than a preset difference is greater than a preset number, stop the adjustments and take an adjusted target read voltage corresponding to the minimum first result in the plurality of first results, corresponding to the target read voltages after the plurality of adjustments, as the target valley bottom voltage.

7. The memory device of claim 6, wherein the peripheral circuit is configured to:

during the N second adjustments on the inflection point voltage with the second step, perform adjustments with the second step in a first direction starting from the inflection point voltage, until a total count of upward trends during the adjustments in the first direction is equal to the preset count; and perform adjustments with the second step in a second direction opposite to the first direction starting from the inflection point voltage, until a total count of upward trends during the adjustments in the second direction is equal to the preset count.

8. The memory device of claim 7, wherein the peripheral circuit is configured to:

during the adjustments in the first direction, take an adjusted target read voltage when the total count of upward trends is equal to the preset count as the first boundary voltage, and during the adjustments in the second direction, take an adjusted target read voltage when the total count of upward trends is equal to the preset count as the second boundary voltage;

during the adjustments in the two opposite directions, when the first boundary voltage and the second boundary voltage are determined, acquire a first result corresponding to a read voltage of a last adjustment, wherein the read voltage of the last adjustment is an average of the first boundary voltage and the second boundary voltage; and take a read voltage corresponding to the minimum first result in a plurality of first results corresponding to all adjusted read voltages as the target valley bottom voltage.

9. The memory device of claim 1, wherein the memory cell array comprises memory cells with a plurality of memory bits, the plurality of memory bits correspond to a plurality of pages respectively, and at least one of the pages corresponds to a plurality of orders, and the peripheral circuit is configured to:

after determining the target valley bottom voltage of the at least one of the one or more code words at a target order, determine target valley bottom voltages of other orders in the plurality of orders than the target order, respectively.

10. The memory device of claim 9, wherein the plurality of orders comprise a first order and a second order, and a read voltage of the second order is less than a read voltage of the first order, and the peripheral circuit is configured to:

when an order corresponding to the determined target valley bottom voltage belongs to the first order, acquire at least one of a predicted valley bottom voltage of the second order in the plurality of orders or predicted valley bottom voltages of other first orders with lower read voltages according to the determined target valley bottom voltage.

11. The memory device of claim 1, wherein the peripheral circuit is configured to:

read data stored in the at least one of the one or more code words with the first read voltage to obtain a second result;

perform a third adjustment on the first read voltage with a third step to obtain the second read voltage, and read data stored in the at least one of the one or more code words with the second read voltage to obtain a third result;

perform a logic operation on the second result and the third result to obtain a fourth result; and count the number of bits in the fourth result that indicate flips of the third result compared to the second result to obtain the first result.

12. The memory device of claim 11, wherein the peripheral circuit comprises:

a first latch configured to store the second result;

a second latch configured to store the third result; and a third latch configured to store the fourth result.

13. A memory system, comprising:

one or more memory devices, wherein each of the memory devices comprises:

a memory cell array comprising a plurality of memory cells, wherein a preset number of the memory cells form a respective code word, the plurality of memory cells corresponding to one or more code words; and a peripheral circuit coupled with the memory cell array and configured to:

perform M first adjustments on a target read voltage of at least one of the one or more code words with a first step, and acquire M first results corresponding to M read voltages obtained after the M first adjustments respectively, wherein each of the M first results indicates a number of flipped bits of the at least one of the one or more code words in two read results corresponding to a first read voltage and a second read voltage, and a difference between the first read voltage and the second read voltage is less than a preset voltage;

take a minimum first result in the M first results as an inflection point value, wherein a read voltage corresponding to the inflection point value is an inflection point voltage;

perform N second adjustments on the inflection point voltage with a second step, and acquire N first results corresponding to N read voltages obtained after the N second adjustments respectively, wherein the second step is less than the first step, and the N first results are acquired independently of the M first results; and determine a target valley bottom voltage according to the acquired N first results, wherein the target valley bottom voltage is taken as a read voltage for a read operation performed on the at least one of the one or more code words, wherein M and N are both positive integers greater than 1; and a memory controller coupled with the one or more memory devices and configured to control the one or more memory devices.

14. The memory system of claim 13, wherein the memory controller is configured to: send a data acquisition instruction, wherein the data acquisition instruction is to instruct acquisition of the target valley bottom voltage;

the one or more memory devices are configured to: receive the data acquisition instruction, acquire the target valley bottom voltage, and send information comprising the target valley bottom voltage to the memory controller; and the memory controller is further configured to: perform a read operation on data stored in the one or more memory devices according to the target valley bottom voltage in the information.

15. The memory system of claim 14, wherein the memory controller is further configured to:

perform an error correction code decoding operation on a read result of the read operation.

16. A memory controller, comprising:

a control unit configured to:

perform M first adjustments on a target read voltage of at least one code word with a first step, and acquire M first results corresponding to M read voltages obtained after the M first adjustments respectively, wherein each of the M first results indicates a number of flipped bits of the at least one code word in two read results corresponding to a first read voltage and a second read voltage, wherein a difference between the first read voltage and the second read voltage is less than a preset voltage, wherein the memory controller is coupled with at least one memory device, wherein the at least one memory device comprises a plurality of memory cells, and wherein a preset number of the memory cells form a respective code word of the at least one code word;

take a minimum first result in the M first results as an inflection point value, wherein a read voltage corresponding to the inflection point value is an inflection point voltage;

perform N second adjustments on the inflection point voltage with a second step, and acquire N first results corresponding to N read voltages obtained after the N second adjustments respectively, wherein the second step is less than the first step, and the N first results are acquired independently of the M first results; and determine a target valley bottom voltage according to the acquired N first results, wherein the target valley bottom voltage is taken as a read voltage for a read operation performed on the at least one code word, wherein M and N are both positive integers greater than 1.

17. The memory controller of claim 16, wherein the control unit is configured to:

before performing the M first adjustments on the target read voltage of the at least one code word with the first step, determine a near-valley threshold according to a first result corresponding to an initial target read voltage of the at least one code word, wherein the near-valley threshold indicates a maximum first result near the target valley bottom voltage;

before performing the M first adjustments on the target read voltage of the at least one code word with the first step, perform a plurality of adjustments on the initial target read voltage to obtain adjusted target read voltages each corresponding to a first result, until a first result of the first results corresponding to an adjusted target read voltage is less than the near-valley threshold; and take the adjusted target read voltage corresponding to the first result less than the near-valley threshold as the target read voltage, and perform the M first adjustments on the target read voltage with the first step.

18. The memory controller of claim 17, wherein the control unit is configured to:

before performing the M first adjustments on the target read voltage of the at least one code word with the first step, during the plurality of adjustments on the initial target read voltage, when the first result corresponding to the adjusted target read voltage is greater than or equal to the near-valley threshold, acquire the target read voltage after a next adjustment based on a first result corresponding to the target read voltage after a previous adjustment;

take the adjusted target read voltage corresponding to a first result being less than the near-valley threshold for a first time among a plurality of first results corresponding to the adjusted target read voltages as a near-valley point voltage; and during the M first adjustments on the target read voltage with the first step, perform adjustments with the first step in two opposite directions respectively starting from the near-valley point voltage, until first results corresponding to adjusted read voltages in the two opposite directions are both greater than the near-valley threshold.

19. The memory controller of claim 18, wherein the control unit is configured to:

during the M first adjustments on the near-valley point voltage with the first step, perform adjustments with the first step in a first direction starting from the near-valley point voltage, until a first result of the first results corresponding to an adjusted target read voltage in the first direction is greater than the near-valley threshold; and perform adjustments with the first step in a second direction opposite to the first direction starting from the near-valley point voltage, until a first result of the first results corresponding to an adjusted target read voltage in the second direction is greater than the near-valley threshold.

20. The memory controller of claim 18, wherein the control unit is configured to:

acquire the near-valley threshold according to the first result corresponding to the target read voltage and a first mapping function, wherein the first mapping function indicates a relationship between the near-valley threshold and the first result corresponding to the target read voltage; and acquire the target read voltage after the next adjustment according to the first result corresponding to the target read voltage after the previous adjustment and a second mapping function, wherein the second mapping function indicates a relationship between the first result corresponding to the target read voltage after the previous adjustment and a predicted read voltage after the next adjustment.

* * * * *